US005966377A

United States Patent [19]
Murai

[11] Patent Number: 5,966,377
[45] Date of Patent: Oct. 12, 1999

[54] SPREAD SPECTRUM COMMUNICATION SYSTEM

[75] Inventor: Hideshi Murai, Tokyo, Japan

[73] Assignee: Mitsubishi Denki Kabushiki Kaisha, Tokyo, Japan

[21] Appl. No.: 08/770,155

[22] Filed: Dec. 19, 1996

[30] Foreign Application Priority Data

May 20, 1996 [JP] Japan ................................. 8-149996

[51] Int. Cl.$^6$ ................................. H04B 7/216
[52] U.S. Cl. ..................... 370/342; 375/200; 375/206
[58] Field of Search ................................. 370/324, 320, 370/106, 335, 441, 522, 208; 375/200, 206, 343, 202

[56] References Cited

U.S. PATENT DOCUMENTS

| | | | |
|---|---|---|---|
| 4,740,963 | 4/1988 | Eckley | 370/522 |
| 5,237,586 | 8/1993 | Bottomley | 370/522 |
| 5,414,728 | 5/1995 | Zehavi | 370/206 |
| 5,825,807 | 10/1998 | Kumar | 375/200 |

FOREIGN PATENT DOCUMENTS

| | | |
|---|---|---|
| 5-506763 | 9/1993 | Japan . |
| 7303090 | 11/1995 | Japan . |

OTHER PUBLICATIONS

Future CDMA Cellular Mobile Systems Supporting Multi–Service Operation, A.H. Aghvami et al, Department of Electronic & Engineering Communications REsearch Group, King's College (London), Strand WC2R 2LS, London UK, IEEE/ICCC, pp. 1276–1279.

IEEE Transactions on Vehicular Technology, vol. 40. No. 2, May 1991. On the Capacity of a Cellular CDMA System, Klein S. Gilhousen, et al.

The Institute of Electronics Information and Communication Engineers, Technical Report of IEICE, SST95–58, SAT95–45 (1995–09), A Study of Soft Decision Viterbi Decoding Method for Parallel COmbinatory CDMA under Multipath Rayleigh–fading Interferenc et al.

Binary Nonlinear Spreading Sequences, JinKang Zhu, Univ. Scie. & Tec. of China, pp. 37–42.

Spectrum Diffusion Communication System, Yokoyam, 1988, Kagaku Syuppann–Sya (Science Publisher in Japan).

Spread Spectrum Access Methods for Wireless Communications, IEEE Communications Magazine Jan. 1995, Ryuji Kohno et al, pp. 58–67.

*Primary Examiner*—Melvin Marcelo

[57] ABSTRACT

Low rate data and middle rate data are time division multiplexed independently according to their rates by a time division multiplexer so that their rates match the rate of high rate data which are not passed through the time division multiplexer. Subsequently, the entire data are converted into biorthogonal signals by biorthogonal signal generators (BORTs), and code division multiplexed by a code division multiplexer. The code division multiplexed signal undergoes modulation by a spreading modulator and a carrier modulator, and transmitted.

47 Claims, 31 Drawing Sheets

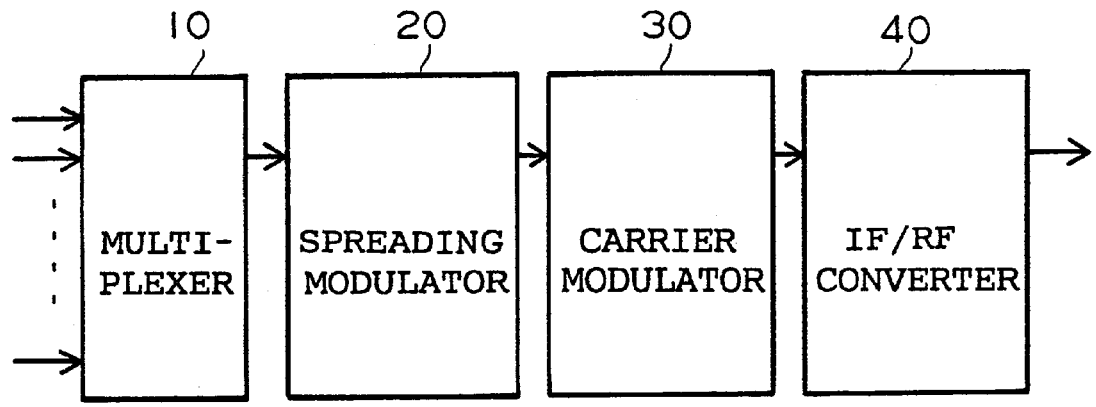
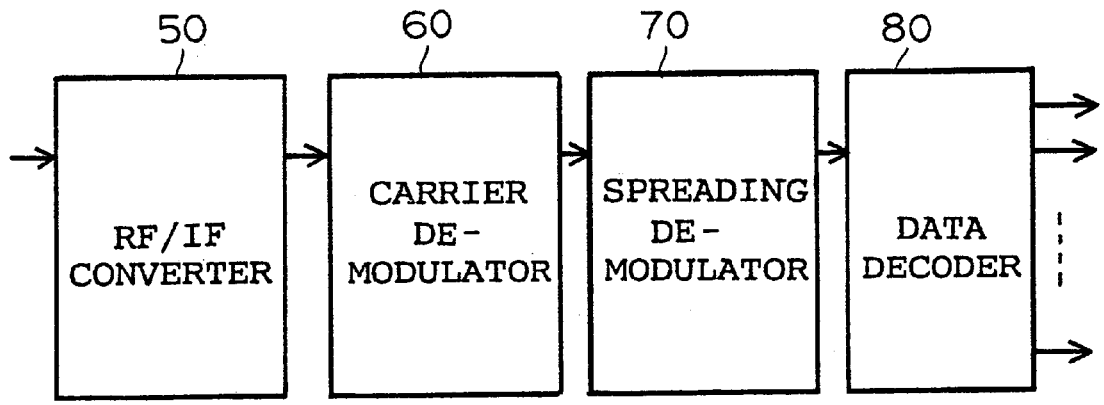

FIG.6A
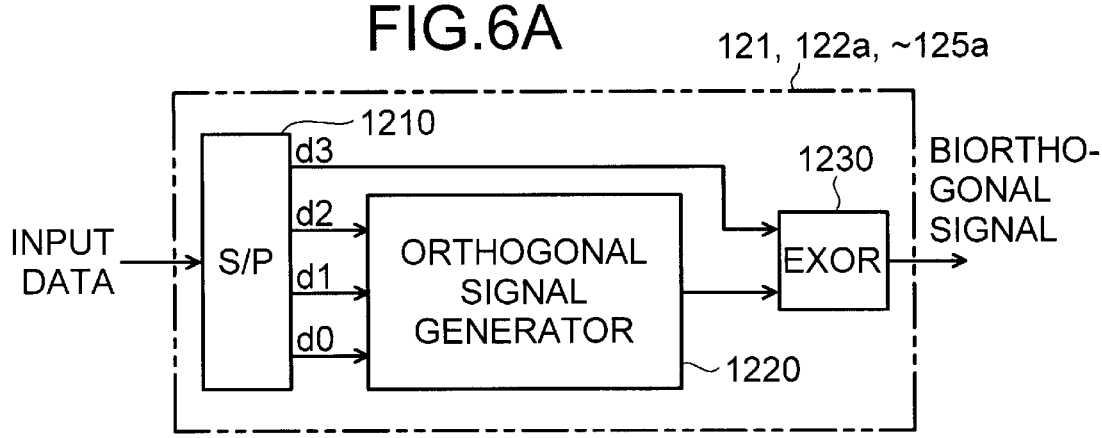
FIG.6B
| d3 | d2 | d1 | d0 | CORD SEQ. | |
|---|---|---|---|---|---|
| 0 | 0 | 0 | 0 | W8(0) | 00000000 |
| 0 | 0 | 0 | 1 | W8(1) | 01010101 |
| 0 | 0 | 1 | 0 | W8(2) | 00110011 |
| 0 | 0 | 1 | 1 | W8(3) | 01100110 |
| 0 | 1 | 0 | 0 | W8(4) | 00001111 |
| 0 | 1 | 0 | 1 | W8(5) | 01011010 |
| 0 | 1 | 1 | 0 | W8(6) | 00111100 |
| 0 | 1 | 1 | 1 | W8(7) | 01101001 |
| 1 | 0 | 0 | 0 | -W8(0) | 11111111 |
| 1 | 0 | 0 | 1 | -W8(1) | 10101010 |
| 1 | 0 | 1 | 0 | -W8(2) | 11001100 |
| 1 | 0 | 1 | 1 | -W8(3) | 10011001 |
| 1 | 1 | 0 | 0 | -W8(4) | 11110000 |
| 1 | 1 | 0 | 1 | -W8(5) | 10100101 |
| 1 | 1 | 1 | 0 | -W8(6) | 11000011 |
| 1 | 1 | 1 | 1 | -W8(7) | 10010110 |
FIG.6C
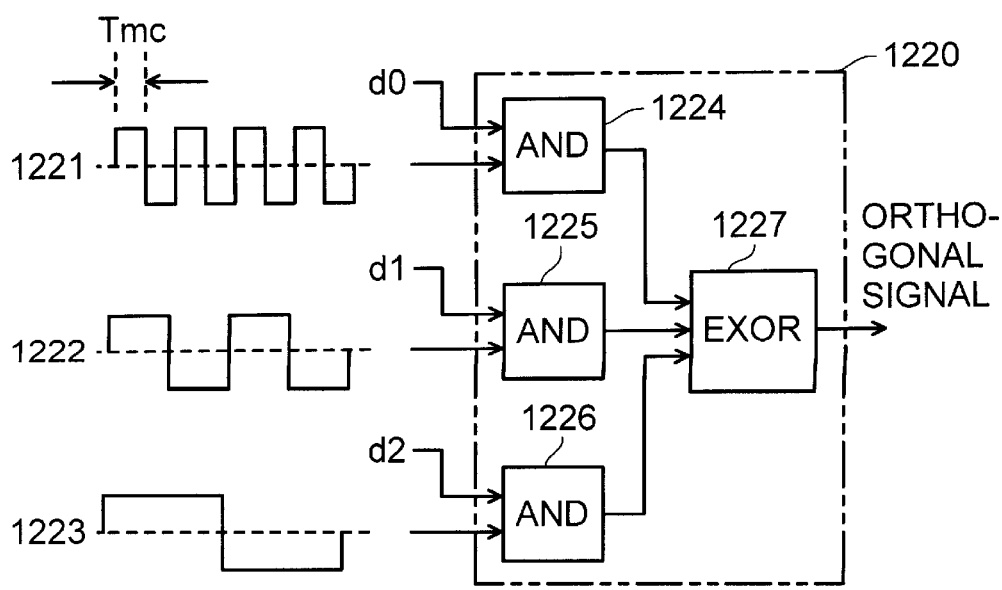

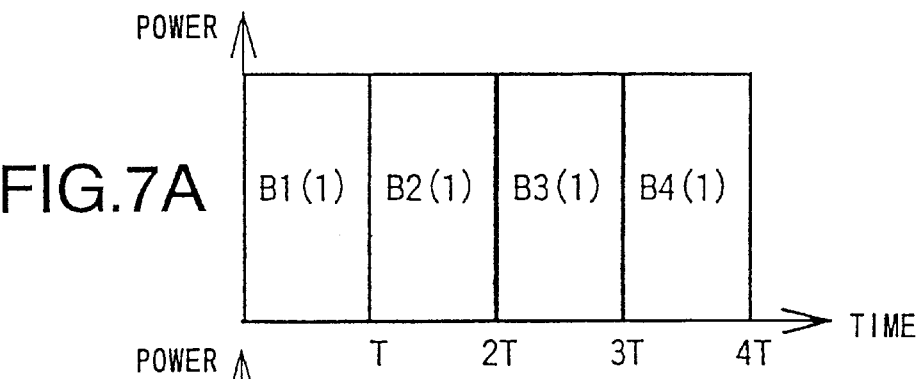
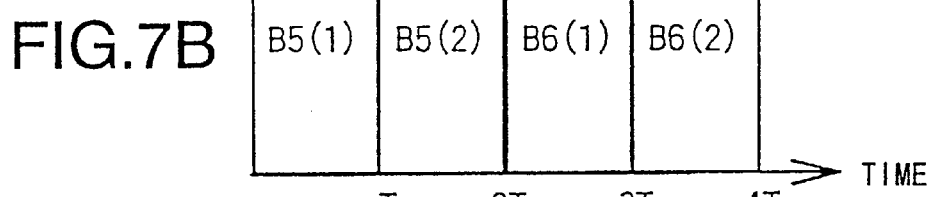
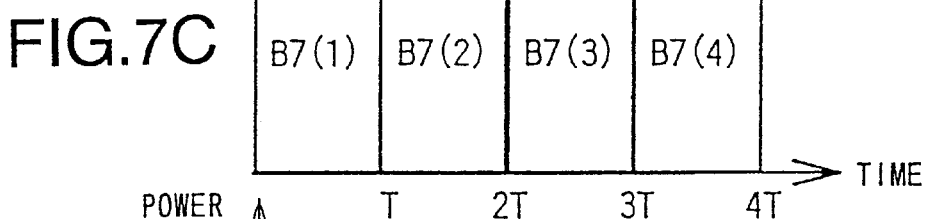
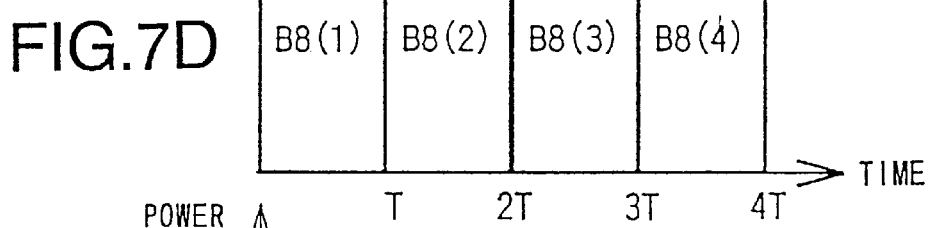
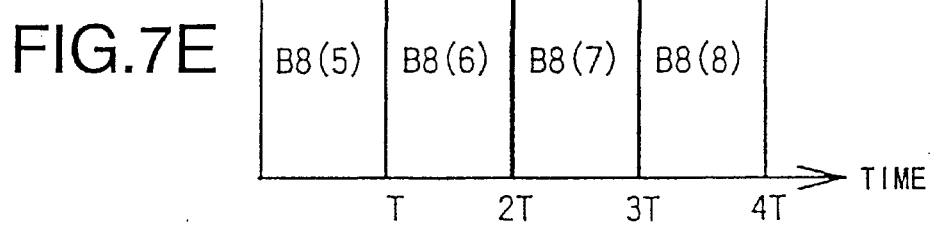

FIG.37
(PRIOR ART)

| C5 | | A | | | | |
|---|---|---|---|---|---|---|
| C4  B | | C6  G | C8  H | | C8  P | C8  S |
| | | | C7  I | C7  M | C7  Q | |
| C3  C | | | C3  J | C3  N | C3  R | C3  J |
| C1  D | C2  F | | C1  K | C1  O | | C1  T |
| C0  E | | | C0  L | | | |
| S0 | S1 | S2 | S3 | S4 | S5 | S6 |

5,966,377

SPREAD SPECTRUM COMMUNICATION SYSTEM

BACKGROUND OF THE INVENTION

1. Field of the Invention

The present invention relates to a spread spectrum communication system.

2. Description of Related Art

Spread spectrum communications is a method in which the spectrum of an information signal is spread into much wider bandwidth by multiplying the information signal by a spreading code, thereby transmitting the information with much wider bandwidth than that of the original information signal, and has characteristics such as communication secrecy, anti-interference, anti-multipath fading, and multiple access capability. The term multiple access refers to a communication system in which a plurality of mobile stations communicate simultaneously with a base station. The performance of the spread spectrum communications depends on a spreading factor which is defined as a ratio of the bandwidth of transmission to that of the information signal, that is, a ratio of the rate of the spreading code to that of the information transmission. The spreading factor, represented in terms of dB, is called the processing gain. For example, if the rate of the information transmission is 10 kbps, and that of the spreading code is 1 Mcps, the spreading factor becomes 100, and the processing gain 20 dB.

The multiple access using the spread spectrum communications is termed CDMA (Code Division Multiple Access). In the CDMA system, each one of the users or channels uses a different spreading code so that they are distinguished by the spreading codes.

Although the CDMA system has been considered to be inferior to the other multiple access Systems such as TDMA (Time Division Multiple Access) in channel capacity (the number of channels in a particular bandwidth), Gilhousen, et al, report that it is superior to the TDMA system when applied to a cellular telephone system, as disclosed in Gilhousen et al, "On the Capacity of a Cellular CDMA Systems", IEEE Transactions on Vehicular Technology vol. 40, No. 2, May 1991.

FIG. 28 shows a transmitter of a base station in a cellular mobile communication system disclosed in the above-mentioned paper. To transmit information to a plurality of users at the same time, the base station makes a multiplexed signal from respective users' signals and then transmits them. In FIG. 28, the reference numerals 2801-280N denote digital processors of the signals to individual users (user #1–user #N) whose output signals are multiplexed and carrier modulated by a digital linear combiner and QPSK modulator 2810. Its output is fed to a transmitter 2811, and undergoes frequency conversion and power amplification to be transmitted to mobile stations. The QPSK (Quadrature Phase Shift Keying) is usually called quadrature digital phase modulation.

Although interference amounts between users are kept low in a CDMA system because of employing different spreading codes, the total interference amount increases with the number of users. The total interference amount and allowable received signal quality decide the channel capacity.

A base station can multiplex signals with each signal being synchronized. In this case, using orthogonal codes as spreading codes makes it possible to reduce to zero the interference among mobile stations receiving the signals transmitted from the same base station. Thus using the orthogonal codes enables the interference to be reduced, and is very preferable for the CDMA system, although transmitted signals from other base stations or multipath fading signals with different received timings even from the same base station cause interference between signals.

The conventional techniques described below use multiplex transmission employing orthogonal codes in the transmission from a base station to mobile stations except for the cases otherwise specified.

FIGS. 29 and 30 illustrate a multiplex transmission method of a base station disclosed in U.S. Pat. No. 5,103,459, for example. The apparatus shown in FIG. 29 corresponds to one of the transmitted signal digital processors 2801-280N as shown in FIG. 28, and the apparatus shown in FIG. 30 correspond to the linear combiner and QPSK modulator 2810 and the transmitter 2811 as shown in FIG. 28.

In FIG. 29, voice channel data 2901 is error correcting encoded by an error correcting encoder 2902, interleaved by an interleaver 2903, and then input to a data scrambler 2904. The data scrambler 2904 carries out exclusive OR operation between the input and another input, a PN code generated by a PN code generator 2905, thus being data scrambled. Since only the data scramble rather than spectrum spreading is intended here, the code rate of the PN code generated by the PN code generator 2905 is the same as the bit rate of the output of the interleaver 2903.

The output of the data scrambler 2904 is converted by an orthogonal encoder 2906 into orthogonal codes by using Walsh functions provided by a Walsh generator 2907. The Walsh functions are orthogonal code sequences generated on the basis of an Hadamard matrix, such that different Walsh functions are assigned to respective users. In the example as shown in FIG. 29, the orthogonal encoding is carried out at a code rate 64 times faster than the bit rate of the data output from the scrambler 2904.

The output of the orthogonal encoder 2906 is fed to two spread spectrum modulators (EXORs) 2908 and 2909 to be spectrum spread by different PN sequences generated by two PN code generators 2910 and 2911. The PN codes generated by the PN code generators 2910 and 2911 are common to the entire users, and are used to reduce interference between signals transmitted from different base stations. The rate of the PN codes are the same as that of the Walsh functions.

The output of the spread spectrum modulators 2908 and 2909 undergo waveform shaping (band limitation) by FIR (Finite Impulse Response) filters 2912 and 2913, gain adjusted by gain adjusters 2914 and 2915, and then input to the linear combiner and QPSK modulator as shown in FIG. 30. To the linear combiner and QPSK modulator, spread spectrum signals are fed which have been orthogonal encoded using orthogonal codes having the same structure with but different patterns from those as used in FIG. 29 (that is, Walsh functions of different numbers).

The orthogonal encoded spread spectrum signals are converted into analog signals by digital-to-analog (DA) converters 3011-30N2, and are input to an adder ($\Sigma$I) 3030 and an adder ($\Sigma$Q) 3031 to be added, respectively, thereby being output as multiplexed signals. The multiplexed signals are multiplied by two orthogonal carriers, $\sin(2\pi ft)$ and $\cos(2\pi ft)$, in multipliers 3032 and 3033, respectively, and then combined by an adder ($\Sigma$) 3034, thereby QPSK modulated.

In this case, since the same information of each user is halved to undergo the spectrum spreading by different PN code sequences and subsequently the QPSK modulation, the information modulation is BPSK modulation (binary PSK or binary digital phase modulation) and the spreading modulation is QPSK (quadrature digital phase modulation).

The QPSK modulated multiplexed signal is multiplied in a multiplexer 3035 by a sine wave provided from a frequency synthesizer, and the fundamental wave component of its output is extracted through a bandpass filter (BPF) 3036. The output of the filter is power amplified by an RF amplifier (RF AMP) 3037, and is led to an antenna.

In the CDMA system, larger channel capacity is achieved when the total interference power is reduced. In the voice communications, as there are soundless intervals, the channel capacity can be increased by an amount corresponding to suppression of information transmission during the soundless intervals.

In the example as shown in FIGS. 29 and 30, the rate of the voice encoders is permitted to be set at one of four steps (full rate, ½, ¼ and ⅛) in response to the voice communication state so as to increase the channel capacity, and the transmission power is set in accordance with the rates. More that is, although each encoder outputs data at the same rate, it repeats the contents of the output by the number corresponding to the rates, so that the transmission power can be reduced in accordance with the number of repetition.

For example, since the number of bits per particular time period becomes ½ of the full rate when transmitted at ½ rate, the duration of the output from the encoder also becomes ½. Thus, the encoder repeats the same contents twice, and the transmission power is set at ½. Likewise, background noise is encoded at ⅛ rate during the soundless interval, so that the error correcting encoder continually outputs the same encoded data eight times, enabling the transmission to be carried out with the transmission power reduced to ⅛.

Thus, the example as shown in FIGS. 29 and 30 discloses a means for reducing generation of the interference by using the orthogonal codes with the signals transmitted from the same base station, or a means for reducing the transmission power by switching the information rate in response to the voice communication state. This system, however, is a low transmission rate system assuming a cellular telephone system, and hence the maximum rate of the voice channel data 2901 shown in FIG. 29 is limited to 9.6 kbps. Accordingly, other means are required to transmit higher rate data such as image or computer data rather than voice data.

FIG. 31 shows an apparatus for transmitting higher rate data disclosed in JP-T 5/506763, and corresponds to the apparatus shown in FIGS. 29 and 30. The apparatus shown in FIG. 31 differs from that shown in FIGS. 29 and 30 in that its controller 3101 keeps constant the spreading code rate, that is, the transmission bandwidth by optimally controlling the encoding factor of the error correcting encoder, interleave size, and the code length of the Walsh functions in response to the input data rate, thereby flexibly adjusting itself to various transmission rates. In JP-T 5/506763, Table I is shown as an example of the parameters of the controller 3101 of the encoding factor rate and the code length of the Walsh functions in accordance with the input data.

TABLE 1

| Spreading code rate (M chips/s) | Input data rate(k bits/s) | Total spreading factor | Encoding factor | Walsh function factor |
|---|---|---|---|---|
| 1.2288 | 9.6 | 128 | 2 | 64 |
| 1.2288 | 4.8 | 256 | 4 | 64 |
| 1.2288 | 19.2 | 64 | 2 | 32 |
| 1.2288 | 16 | 76.8 | 2.4 | 32 |

In Table I, the spreading code rate is given as a product of the input data rate and the total spreading factor, where the spreading factor is the product of the encoding factor and the Walsh function factor. For example, in the case where the input data rate is 9.6 kbps, the error correcting code (convolutional code) with an encoding factor of two (=coding rate of ½) is used, the encoded symbol rate becomes 19.2 kbps (=9.6 kbps×2) after the error correcting encoding, and the spreading code rate becomes 1.2288M chips/s (=19.2 kbps×64) by multiplying each encoded bit by the Walsh function with a code length of 64. With the other transmission rates, they can be calculated in the same manner. Incidentally, the encoding factor means the ratio of the bit number of the output of the error correcting encoder to that of the input information. In other words, the encoding factor is the inverse number of the coding rate.

The above-mentioned setting method is expected to make optimum use of the available transmission band by utilizing the fact that the Walsh function factors have the powers of two owing to their structure, and the upper limit of the spreading code rate is limited to 1.2288M chips/s. This is achieved by adjusting the encoding factor and Walsh function factor when the input data rate is an integer multiple of 9.6 kbps, or by making the encoding factor different from the integer multiple and setting the Walsh function factor appropriately when the input data rate is not the integer multiple. To achieve this, a technique called punctured encoding is used for the encoding method in addition to the convolutional encoding.

Thus, the example as shown in FIG. 31 handles the increase in the transmission rate by varying the encoding factor and the Walsh function factor. A further increase in the transmission rate will require a decrease in the encoding factor or the Walsh function factor.

The decrease in the encoding factor, however, results in the reduction of the error correcting performance, and this will prevent the required transmission quality from being achieved. In the example as shown in FIG. 31, to achieve the transmission quality matching that of the data transmission of 9.6 kbps, the encoding factor of two or more is needed.

The reduction in the Walsh function factor, on the other hand, results in a decrease in the code length of PN-I and PN-Q to be multiplied, which in turn results in a decrease in the spreading factor (spreading code rate/data transmission rate), and this will reduce the characteristics of the spread spectrum communications such as multiple access, antijamming, anti-interference, thereby limiting its spreading factor. For example, Ryuji KOHNO et al. reported that the processing gain (that is, the spreading factor) was limited to about 100–1000, considering the multipath fading resistance and system uniformity, in Ryuji KOHNO, et al. "Spread Spectrum Access Methods for Wireless Communications", IEEE Communications Magazine, pp. 58–67, January 1995) (the upper limit is restricted by hardware implementation and frequency band assignment, and so on).

Thus, it is necessary to employ other measures to carry out communications at a data rate exceeding 19.2 kbps in the example as shown in FIG. 31. FIGS. 32–36 are diagrams showing CDMA systems capable of handling various services, which were disclosed in A. H. Aghvami, "FUTURE CDMA CELLULAR MOBILE SYSTEMS SUPPORTING MULTI-SERVICE OPERATION", 5th IEEE International Symposium on Personal Indoor and Mobile Radio Communication, 1994.

FIG. 32 is a diagram illustrating a method in which signals of various data rates, such as data, image and voice, are each spread over the entire assigned frequency band. In this case, since the data rates differ while the code rate of the spreading codes is identical, the processing gain (spreading factor) varies in accordance with the data rates. The spreading codes and the transmission power also depend on the transmission quality required.

When the data rates differ from each other in the CDMA system, energy per data bit is usually adopted as a criterion to equalize the transmission quality. For example, high rate data (computer data, for instance) demands larger power because of shorter data interval, and low rate data (voice, for instance) requires smaller power because of longer data interval. Although this method is simple, it still has a problem similar to that of the system as shown in FIG. 31 in that it reduces the characteristics of the CDMA because its spreading factor decreases with an increase of the data rate.

FIG. 33 illustrates a method in which the entire frequency band is divided into sub-bands of different widths so that low rate signals (voice) are assigned to a smaller sub-band, middle rate signals (video) are assigned to a larger sub-band, and a high rate signal is assigned to the entire band. The smaller sub-band and the larger sub-band are used separately or repeatedly.

Although this method has an advantage that the processing gain (spreading factor) can be set within a certain range when the transmission rate is below a particular value, it also has a problem in that it reduces the characteristics of the CDMA as the systems shown in FIGS. 31 and 32 because the spreading factor decreases when the transmission rate exceeds the particular value. Furthermore, since the low rate signals and the middle rate signals use different frequencies, a control mechanism for assigning the frequency is required in addition to multiple frequency generators. Moreover, it has a problem in that both the transmitter and receiver become larger because of a plurality of analog sections (filters, for example) for matching various transmission bands corresponding to the rates.

FIG. 34 illustrates a method in which a time frame is divided into sub-slots of different length so that low rate signals (voice) are assigned to a smaller time slot, and middle rate signals (video) are assigned to a larger time slot, and a high rate signal is assigned to the entire time slot, thus using the time slots separately or repeatedly.

Although this method also has an advantage that the processing gain (spreading factor) can be set within a certain range when the transmission rate is below a particular value, it also has a problem in that it reduces the characteristics of the CDMA as the systems shown in FIGS. 31, 32 and 33 because the spreading factor decreases when the transmission rate exceeds the particular value.

Furthermore, since the data interval reduces with the spreading factor as the transmission rate increases in the methods shown in FIGS. 32–34, the discrimination performance is lost for delay waves with a delay corresponding to the data interval when periodic spreading codes are used. This presents a new problem in that it causes co-channel interference.

FIG. 35 illustrates a multicode system in which a plurality of spreading codes are assigned to middle rate signals and high rate signals. The middle rate signals and high rate signals undergo serial-to-parallel conversion in accordance with their rates so that resultant low rate signals are multiplexed after orthogonal encoded using orthogonal codes. This enables the various rate data to be spread at the same spreading factor, thereby providing measures against the reduction in the processing gain (spreading factor) and co-channel interference, the problems involved in the methods as shown in FIGS. 32–34. The variation in the amplitude due to the multiplexing can be solved by spreading the data using PN codes, after obtaining binary sequences from multilevel signal using a multi-values to binary conversion. The Aghvami paper discloses the application of orthogonal modulation, in which one of orthogonal codes like Walsh functions is selected, for the multilevel binary conversion (or for the multi-values to binary conversion).

The multilevel binary conversion, however, has a problem in that the frequency efficiency rapidly reduces with an increase of the multiplexed number. The reason for this is as follows. The code length of the orthogonal functions are given by $2^N$, where N is the multiplexed number. Accordingly, when the transmission is carried out under the same processing gain (spreading factor) and the same spreading code rate, the bandwidth increases by a factor of $2^N$ as compared with the transmission using multi-valued levels.

In addition, a normal multilevel binary conversion without using the orthogonal modulation usually performs parallel-to-serial conversion, which demands N times the bandwidth as compared with the transmission using the multivalued levels as long as the processing gain (spreading factor) and the spreading code rate are fixed. Thus, the problem of the frequency efficiency reduction remains unsolved.

FIG. 36 illustrates a method combining the methods as shown in FIGS. 32–35. This method combines the systems as shown in FIGS. 32–35 in accordance with services offered or the propagation environment of electromagnetic waves. Although this method makes it possible to take optimum measures depending on the state of voice, image, or data, it has a problem in that the system control becomes exceedingly complicated, and assigning control becomes complex.

Figure 37:
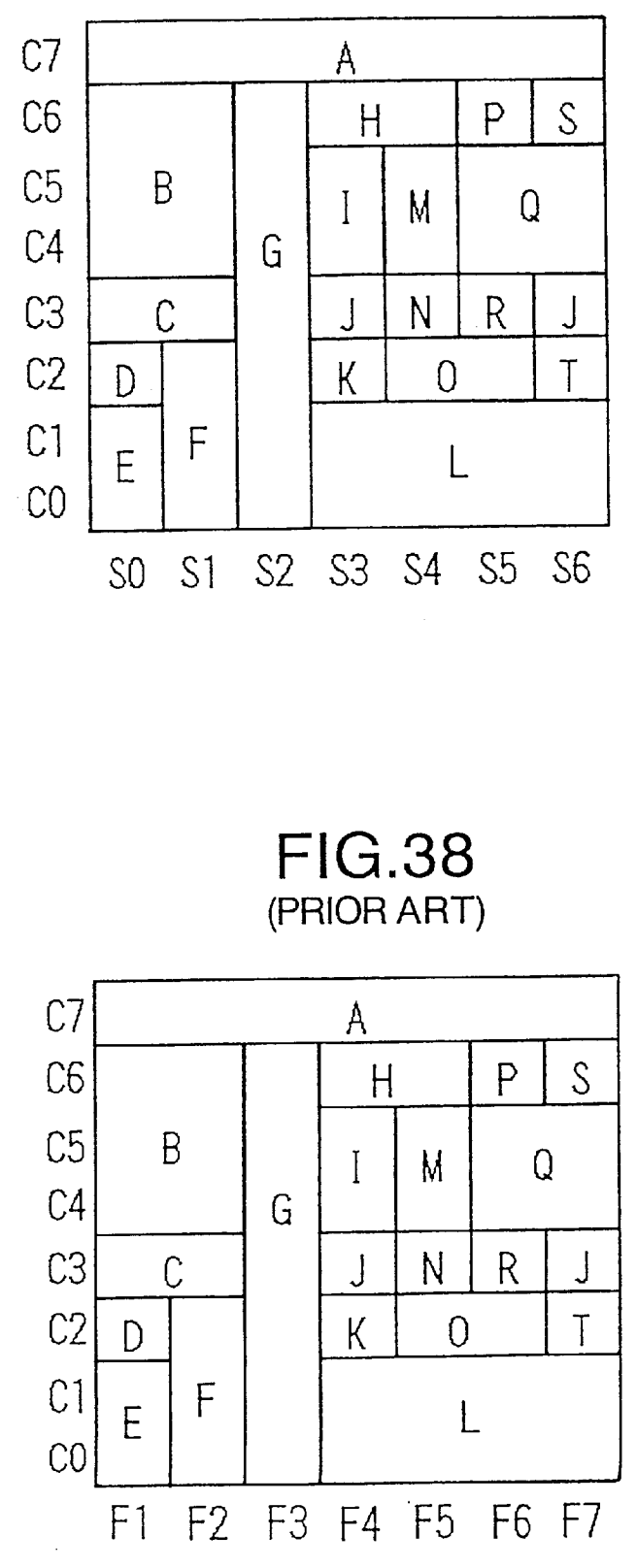

FIGS. 37–40 illustrate optimum systems of spectrum using, which are disclosed in JP-A 7/303090, in which the spectrum is optimized for high rate users (A, B, G and L), middle rate users (C, E, F, H, I, J, M, O and Q) and low rate users (D, K, N, P, R, S and T).

The method as shown in FIG. 37 assigns slot numbers and code numbers to users with different rates. It differs from the method as shown in FIG. 34 in that it assigns a plurality of spreading codes besides the slot numbers. The method as shown in FIG. 37 enables the high rate transmission to carry out the multicode transmission to keep the processing gain (spreading factor) greater than a fixed value. The method, however, has a problem in that the system becomes complicated. For example, although user F can obtain the desired processing gain (spreading factor) by using only a single code, it actually performs transmission using multicodes consisting of three codes C0, C1 and C3. This requires the receiver to prepare a plurality of correlators, thereby making the system complicated.

The method as shown in FIG. 38 assigns sub-frequency bands and codes to users of different rates, that is, to high rate users (A, B, G and L), middle rate users (C, E, F, H, I, J, M, O and Q) and low rate users (D, K, N, P, R, S and T). It differs from the method as shown in FIG. 33 in that it assigns a plurality of spreading codes besides the subfrequency bands. The method as shown in FIG. 38 enables the high rate transmission to carry out the multicode transmission to keep the processing gain (spreading factor) greater than a fixed value. This method, however, has a problem in that the system becomes complicated. For example, although user F can obtain the desired processing gain (spreading factor) by using only a single code, it performs transmission using multicodes consisting of three codes C0, C1 and C3. This requires the receiver to prepare a plurality of correlators, thereby making the system complicated. Furthermore, it has another problem in that complicated control must be performed such as frequency assignment and code assignment. Moreover, it has a problem in that both the transmitter and receiver become large because a plurality of analog sections must be prepared which include multiple transmission bands and frequency synthesizers corresponding to a plurality of transmitting and receiving frequencies and frequency bands.

The method as shown in FIG. 39 assigns both slots and codes to users of different rates, that is, to high rate users (A, B, G and L), middle rate users (C, E, F, H, I, J, M, O and Q) and low rate users (D, K, N, P, R, S and T). The codes are not multicodes but single codes with different code lengths. The high rate users can achieve high rate transmission by occupying a small code C5 over a long time period in the code space as denoted by A in this figure, or by occupying a large code G for a short time in the code space as denoted by G in this figure.

The method as shown in FIG. 39 assigns only one code to each user, thus allowing the receiver to prepare only one correlator for each corresponding code. It is necessary for the receiver, however, to increase the code rate when a large code space is assigned, and this requires the receiver to prepare a plurality of spreading code generators and correlators so that it can cope with the code rate corresponding to the large code space. Furthermore, either analog sections including a plurality of transmission bands must be prepared, or wideband filters must be prepared allowing the degradation of characteristics. The former presents a problem in that the size of the transmitter and receiver increases, and the latter has a problem in that the transmission quality is degraded.

FIG. 40 shows a method in which the slots, frequencies and codes as shown in FIGS. 38 and 39 are combined to achieve optimum results with the users of different rates, that is, high rate users (F, G and H), middle rate users (A, B, C and E) and low rate users (D, H, I, K and L). This method has an advantage that the frequency, time and code space can be efficiently utilized. The method, however, has a problem in that complicated control is required to assign the frequency, time and codes. In addition, since it is necessary for both the transmitter and receiver to prepare a plurality of correlators corresponding to the multiple codes, and analog sections corresponding to the plurality of transmission bands, a new problem arises that the circuit scale increases.

The methods as shown in FIGS. 37 and 38 do not take steps for the multivalued signal levels due to multicode multiplexing. Accordingly, the demand grows severe for linearity of the power amplifier used in the transmitter in accordance with the multivalues of the signal levels. This presents a further problem in that this prevents a reduction of a circuit size and a power consumption of a circuit.

Generally speaking, the number of simultaneously communicatable channels is less than that of assignable channels (that is, the number of codes). This is because the multiplex transmission from a base station to mobile stations using orthogonal codes is subjected to interference due to multipath fading and base stations of neighboring cells, and such interference increases with the number of multiplexed channels, and hence an required error rate comes to be unachievable. The reverse link transmission from mobile stations to the base station has greater interference than the forward link transmission from the base station to the mobile stations because it is difficult for the mobile stations to synchronize transmission timings among them.

In the foregoing paper of Gilhousen et al, "On the Capacity of a Cellular CDMA Systems", IEEE Transactions on Vehicular Technology vol. 40, No. 2, May 1991, Gilhousen et al. reports that although the number of assignable channels to the base station is 64 in the system as shown in FIGS. 29 and 30, the number of simultaneously communicatable channels falls about 36. The number is an ideal one considering channel the increasing effect of channels due to reduction of rates in response to the state of voices, and assuming the best conditions of transmission power control and sectoring gain, and therefore the actual number of simultaneously communicatable channels is further reduced. In other words, the actual number of practically usable channels will be reduce to only about half the assignable channels. This is true with the conventional methods of FIGS. 31–40.

One possible method to make effective use of the assignable channels would be to limit the multiplexed number (Walsh function factor) to 32 out of 64 as shown in the following Table 2, and to increase the error correcting power of the error correcting codes. This method corresponds to set the encoding factor at a high value.

TABLE 2

| Spreading code rate (M chips/s) | Input data rate (k bits/s) | Total spreading factor | Encoding factor | Walsh function factor |
|---|---|---|---|---|
| 1.2288 | 9.6 | 128 | 4 | 32 |

Although adopting such a method will increase the communication quality because of the improved error correcting performance, it presents a problem in that the amount of processing involved in decoding becomes enormous, and the scale of hardware increases. More that is, when adopting convolutional codes as the error correcting codes as already described in connection with the conventional techniques, Viterbi decoding is often employed as a decoding method, whose processing amount depends on the encoding factor $1/r$ and the constraint length K, and is proportional to $(1/r)^K$, where r is the encoding rate. Thus, if the encoding factor is doubled from two to four for example, the processing amount is increased from $2^K$ to $4^K$. As for the constraint length K, the conventional techniques usually use a value from seven to nine, and hence the processing amount of decoding increases in proportion to $2^7$ or $4^7$.

In addition, it is preferable to take some steps for carrying out multi-valued levels of signals due to multicode multiplexing.

FIG. 41 is a system block diagram of a parallel combination system proposed in "Consideration on Soft Decision Viterbi Decoding Characteristics under Multipath Rayleigh Fading in PC-CDMA (Parallel Combination Code Division Multiplex Access)" by Katsura, et al, Technical Report of the Institute of Electronics, Information and Communication Engineers of Japan SST95-58 (1995-09), pp. 79–83.

In FIG. 41, the information data undergoes the error correcting encoding by convolutional codes with a rate of ½, followed by the interleaver, and is divided in parallel into 128 encoded) bits. The 128 encoded bits undergo multicode multiplexed transmission by every four encoded bits in 32 groups. The orthogonal codes for multicode multiplexing are called orthogonal Gold codes and prepared total of 256. However, since the multiplexed number is 32, the 256 orthogonal Gold codes are divided into 32 groups each consisting of eight Gold codes, one of which is selected from each group. The code to be selected is decided by the four encoded bits. That is, three encoded bits decides which one of the eight orthogonal codes is to be selected, and the remaining one bit decides the polarity of the selected orthogonal code. The orthogonal Gold codes are described in Shu et al. "On Nonlinear Binary Spreading Sequences", pp. 37–42 of Technical Report of the Institute of Electronics, Information and Communication Engineers of Japan, IT90-7, May 1990.

At the receiving side, the four encoded bits per group can be decoded by detecting which code is transmitted in which polarity. In the case, it is necessary for the receiver to perform coherent detection to detect the polarity. The system as shown in FIG. 41 effectively carries out the coherent detection by simultaneously transmitting multiplexing orthogonal codes for a pilot channel, and by extracting the carrier phase by demodulating the pilot channel at the receiving side.

This method is called biorthogonal signal transmission method, and its characteristics were reported in M. Yokoyama, "Spread Spectrum Communication System", 1988, Science and Technology Publishing Company Inc. in Japan. The biorthogonal signal transmission method has an advantage of reducing the error rate over the common signal transmission method. In addition, it provides an advantage of mitigating the requirement for the linearity of an amplifier because the multiplexed number is reduced to ¼ since one orthogonal code corresponds to four encoding bits.

The system as shown in FIG. 41, however, has a problem in that the size of both the transmitter and receiver is increased because the transmitter must prepare the entire orthogonal codes, and the receiver must calculate the correlations between the entire orthogonal codes and the received signal. In addition, it lacks flexibility with low rate transmission whose bit number differs from an integer multiple of the four encoding bits. Furthermore, since the receiver must be provided with individual correlators for respective channels as the rate of data increases, thereby increasing a hardware scale of or a circuit size of a communication system.

SUMMARY OF THE INVENTION

To solve the foregoing problems, the object of the present invention is to provide a spread spectrum communication system which can perform effective variable rate transmission or different rate transmission, and limit the increase in the hardware scale to a minimum without complicated assignment of slots, codes and frequencies.

The spread spectrum communication system as a preferred embodiment of the present invention comprises: the following (A), (B) and (C), wherein (A) being one of the following (a), (b) and (c), wherein (a) first time division multiplexing means for time division multiplexing low rate data and middle rate data, biorthogonal signal generating means for converting into biorthogonal signals from time division multiplexed data and high rate data which have not time division multiplexed, and first code division multiplexing means for code division multiplexing the biorthogonal signals; (b) second code division multiplexing means for code division multiplexing only low rate data, second time division multiplexing means for time division multiplexing only middle rate data, biorthogonal signal generating means for converting time division multiplexed data and high rate data into biorthogonal signals, and first code division multiplexing means for code division multiplexing code division multiplexed signal and the biorthogonal signals; and (c) third time division multiplexing means for time division multiplexing low rate data and middle rate data independently in accordance with their rates, third code division multiplexing means for code division multiplexing time division multiplexed low rate data, biorthogonal signal enerating means for converting into biorthogonal signals from time division multiplexed middle rate data and high rate data which have not time division multiplexed, and first code division multiplexing means for code division multiplexing code division multiplexed signals and the biorthogonal signals; (B) spreading modulation means for performing spreading modulation, by using a spreading code sequence, a multiplexed signal obtained by the first code division multiplexing means; and (C) carrier modulation means for performing carrier modulation using a spreading modulated signal by the spreading modulation means, wherein a signal obtained by the carrier modulation executed by the carrier modulation means is transmitted.

In the spread spectrum communication system as another preferred embodiment of the present invention, the biorthogonal signal generating means uses Walsh functions as orthogonal signals, and the first code division multiplexing means uses Walsh functions as multiplexing orthogonal codes; or the biorthogonal signal generating means uses Walsh functions as orthogonal signals, and the first code division multiplexing means uses Walsh functions as multiplexing orthogonal codes, or the first and second code division multiplexed means uses Walsh functions as the multiplexing orthogonal codes.

In the spread spectrum communication system as another embodiment of the present invention, the spreading code sequence used in the spreading modulation has a code sequence period much longer than a data period.

In the spread spectrum communication system as another embodiment of the present invention, the spreading modulation carries out binary phase modulation on the multiplexed signal, and the carrier modulation is binary modulation; the spreading modulation carries out quadrature phase modulation on the multiplexed signal, and the carrier modulation is quadrature modulation; the spreading modulation carries out binary phase modulation on two multiplexed signals, and the carrier modulation is quadrature modulation; or the spreading modulation carries out quadrature phase modulation on two multiplexed signals, and the carrier modulation is quadrature modulation.

In the spread spectrum communication system as another preferred embodiment of the present invention, the biorthogonal signal generating means comprises a plurality of AND circuits each for performing AND operation between a bit of input data and a clock signal obtained by stepwise halving a clock signal whose code rate corresponds to orthogonal functions; and a first exclusive OR circuit inputting a plurality of outputs of the plurality of AND circuits for performing exclusive OR operation of them to output its result as an orthogonal signal, wherein one of orthogonal functions is selected in accordance with the input data, and outputting selected one as the orthogonal signal.

In the spread spectrum communication system as another preferred embodiment of the present invention, the biorthogonal signal generating means comprises a plurality of AND circuits each for performing AND operation between a bit of input data and a clock signal obtained by stepwise halving a clock signal whose code rate corresponds to orthogonal functions; a first exclusive OR circuit inputting a plurality of outputs of the plurality of AND circuits for performing exclusive OR operation of them to output its result as an orthogonal signal; and a second exclusive OR circuit for performing exclusive OR operation between a further one bit of the input data and the orthogonal signal output from the first exclusive OR circuit to output a biorthogonal signal, wherein the biorthogonal signal generating means performs polarity operation and outputs the orthogonal signal.

In the spread spectrum communication system as another preferred embodiment of the present invention, the first code division multiplexing means comprises a plurality of exclusive OR circuits each for performing exclusive OR operation of one of all possible combinations of a logically significant level and a plurality of clock signals obtained by stepwise halving a clock signal whose code rate corresponds to orthogonal codes, and an orthogonal code generators for simultaneously outputting a plurality of orthogonal codes which are orthogonal to each other.

Further scope of applicability of the present invention will become apparent from the detailed description given hereinafter. However, it should be understood that the detailed description and specific examples, while indicating preferred embodiments of the invention, are given by way of illustration only, since various changes and modificatios within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 2A and 2B are block diagrams showing the entire configuration of spread spectrum communication systems of embodiments 1–3 in accordance with the present invention;

FIGS. 6A–6C are diagrams showing details of a biorthogonal signal generator in the spread spectrum communication systems in accordance with the embodiments 1–3 of the present invention;

FIGS. 7A–7E are diagrams illustrating the outputs the biorthogonal signal generator in the spread spectrum communication system in accordance with the embodiment 1 of the present invention;

FIG. 37 is a diagram illustrating a conventional method for assigning the number of slots and the number of codes to users of different rates;

FIG. 38 is a diagram illustrating a conventional method for assigning the partial frequency bands and codes to users of different rates;

DETAILED DESCRIPTION OF THE PREFERRED EMBODIMENTS

Figure 1:
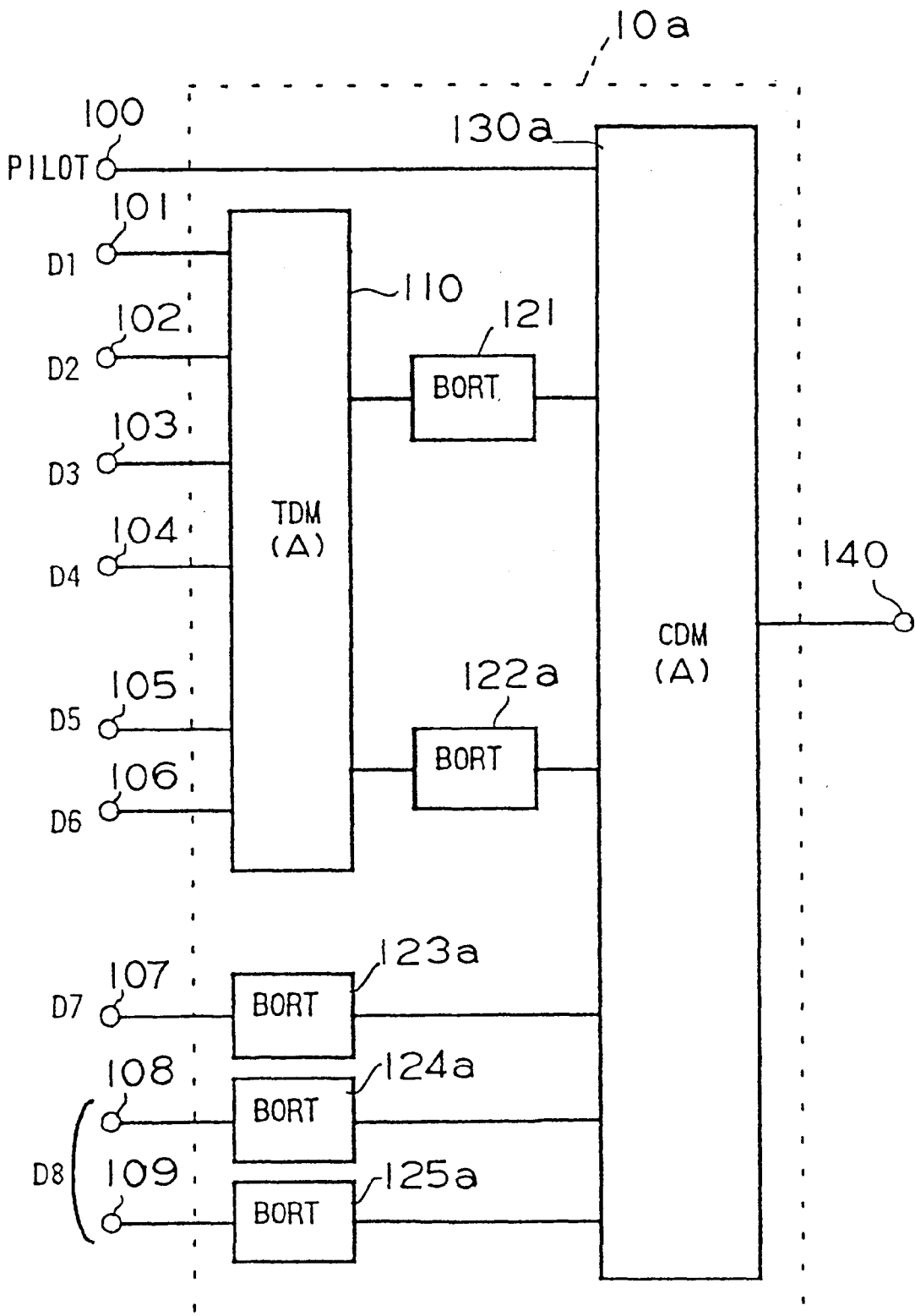
FIG. 1 is a block diagram showing a multiplexer in a spread spectrum communication system in accordance with an embodiment 1 of the present invention.
Figure 3A:
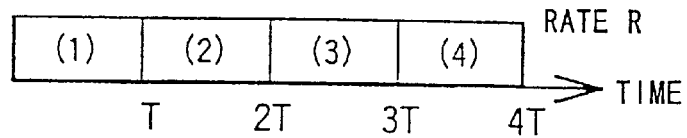
FIGS. 3A–3I are diagrams illustrating relationships of the rates of input data to the multiplexer of the embodiment 1 of the present invention.
Figure 3B:
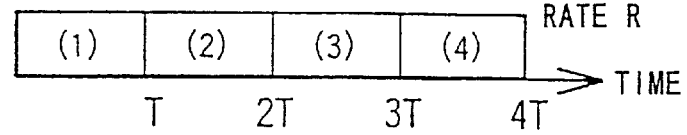
Figure 3C:
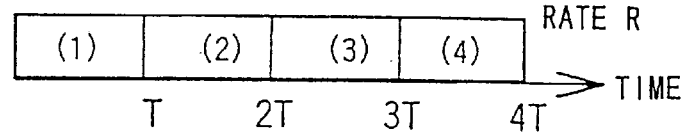
Figure 3D:
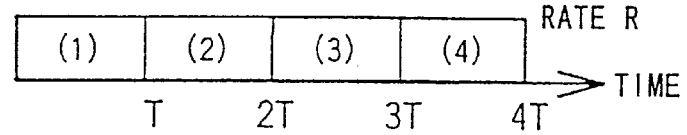
Figure 3E:
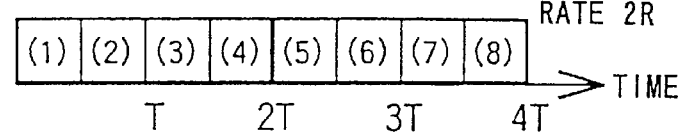
Figure 3F:
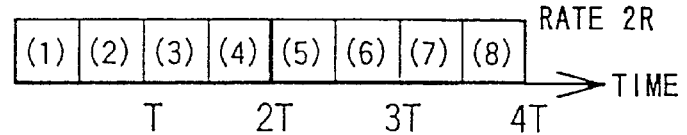
Figure 3G:
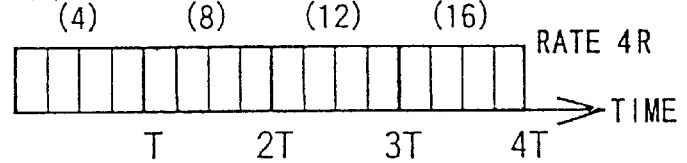
Figure 3H:
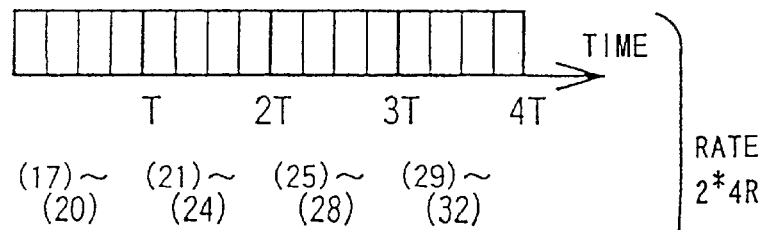
Figure 3I:
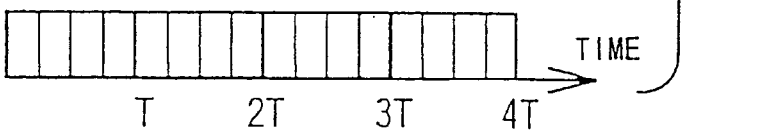

Preferred embodiments of the spread spectrum communication system in accordance with the invention will now be described with reference to the accompanying drawings.

BASIC CONFIGURATION OF THE ENTIRE SYSTEM

FIGS. 2A and 2B are block diagrams showing the entire configuration of a spread spectrum communication system, wherein FIG. 2A shows a transmitter and FIG. 2B shows a receiver. In the transmitter as shown in FIG. 2A, the reference numeral 10 designates a multiplexer, 20 designates a spreading modulator, 30 designates a carrier modulator, and 40 designates an IF/RF converter. In the receiver as shown in FIG. 2B, the reference numeral 50 designates an RF/IF converter, 60 designates a carrier demodulator, 70 designates a spreading demodulator, and 80 designates a data decoder. Although not shown in FIGS. 2A and 2B, an antenna diversity portion can be added as necessary.

When the transmitter as shown in FIG. 2A is used as a base station, and the receiver as shown in FIG. 2B is employed as a mobile station, control data and transmitted data of multiple users are input to the multiplexer 10. Assigning a plurality of traffic channels to a high rate user makes it possible to accommodate from high rate users to low rate users to a common transmission link.

In the case where the transmitter as shown in FIG. 2A is a base station, and the receiver as shown in FIG. 2B is a mobile station, and where the transmitted data consists of only low rate data, only one channel information data is input to the multiplexer, and control data is also input as necessary.

In such a case where no multiplexing is required because only one channel information data is input, the multiplexer 10 can be omitted. On the other hand, high rate data is transmitted through a plurality of traffic channels in accordance with its rate.

In FIG. 2A, the input information data is multiplexed by the multiplexer 10, and then spectrum spread by the spreading modulator 20. Thus dividing the function of the multiplexer 10 and spreading modulator 20 omits random spectrum spreading with wideband at the multiplexing stage, thereby enabling the system to be implemented in a simple configuration because the spreading modulation performed on the multiplexed signals can eliminate redundant processing.

The spectrum spread data by the spreading modulator 20 undergoes carrier modulation by the carrier modulator 30, and frequency conversion and amplification by the IF/RF converter 40, and is output to an antenna (not shown). Although not shown in this figure, the information data input to the multiplexer 10 is usually encoded data which has already undergone error correction encoding and interleaving. The error correction encoding and interleaving are normally carried out on the batransmittames formed by dividing the transmitted data, in which case the input data can be seen as the data forming frames or slots.

In FIG. 2B, the signal received by an antenna (not shown) undergoes amplification and frequency conversion by the RF/IF converter 50, is demodulated to a baseband signal by the carrier demodulator 60, undergoes correlation operation (multiplication and integration operation) with the spreading code by the spreading demodulator 70, and is decoded by the data decoder 80 so that only desired data is extracted from the multiplexed data. Incidentally, depending on the multiplexing method by the multiplexer 10 in the transmitter as shown in FIG. 2A, the desired data may have already been obtained at the output of the spreading demodulator 70 in the receiver as shown in FIG. 2B. In such a case, the function of the data decoder 80 is included in the spreading demodulator 70.

In addition, although not shown in these figures, controllers are provided for the transmitter as shown in FIG. 2A and for the receiver as shown in FIG. 2B, respectively, for controlling the operation of these blocks.

EMBODIMENT 1

FIG. 1 is a block diagram showing the configuration of the multiplexer 10 of the transmitter as shown in FIG. 2A. In this figure, the reference numeral 100 designates a pilot channel input terminal, 101–104 designate input terminals of low rate data D1–D4, respectively, 105 and 106 designate input terminals of middle rate data D5 and D6, 107 designates an input terminal of high rate data D7, 108 and 109 designate input terminals of high rate data D8, 110 designates a time division multiplexer TDM(A), 121 and 122a–125a designate biorthogonal signal generators (BORTs), 130a designates a code division multiplexer CDM (A), and 140 designates an output terminal.

In a multiplexer 10a as shown in FIG. 1, the numbers of the low rate and middle rate data which undergo time division multiplexing, and the number of the high rate data which does not undergo time division multiplexing can be properly assigned in accordance with communication demand.

Next, its operation will be described.

The low rate data D1–D4 and the middle rate data D5 and D6 undergo time division multiplexing by the time division multiplexer 110 in accordance with their rate, resulting in the data of the same rate as the high rate data D7 and D8. Subsequently, the entire data are converted into biorthogonal signals by the biorthogonal signal generators 121, 122a–125a, and undergo orthogonal code multiplexing by the code division multiplexer 130a, thereby being output from the multiplexer 10a.

FIGS. 3A–3I are diagrams illustrating relationships of the rates of the low rate data D1–D4, middle rate data D5 and D6, and high rate data D7 and D8, which are input to the multiplexer 10a as shown in FIG. 1.

In FIGS. 3A–3I, the low rate is R, the middle rate is 2R and the high rate is 4R, and the high rate data with a transmission rate of 8R which is input to the input terminals 108 and 109 is halved. The ratios of the transmission rates and the numbers of terminals of the input data for respective rates are not fixed, so that they can be properly assigned in accordance with the communication demand.

FIGS. 4A–4E are diagrams illustrating operation of a first time division multiplexer 110, wherein the axis of abscissa corresponds to time, and the axis of ordinate corresponds to the power of data. The low rate data D1–D4, and the middle rate data D5 and D6 are compressed in time in accordance with their rate, thereby having the same rate as the high rate data D7 and D8. Thus, the data of respective rates have the same signal power because they have the same rate after multiplexed. If the rate and power coincide, the transmission power per bit also coincides with each other.

Although not shown in this figure, the transmission power can be varied for individual users or channels in response to the communication states of the users or channels.

Figure 4A:
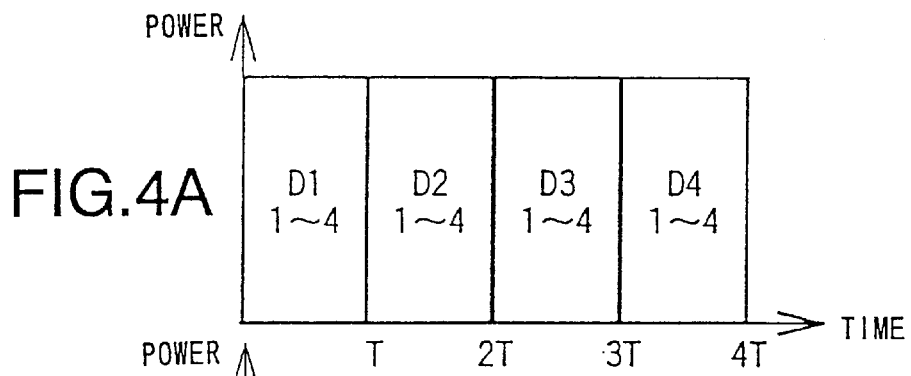
FIGS. 4A–4E are diagrams illustrating an operation of a time division multiplexer in the spread spectrum communication system in accordance with the embodiment 1 of the present invention.
Figure 4B:
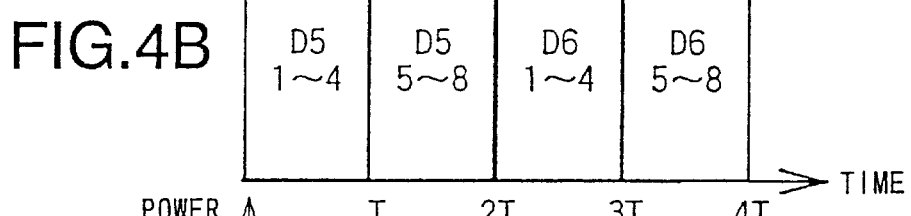
Figure 4C:
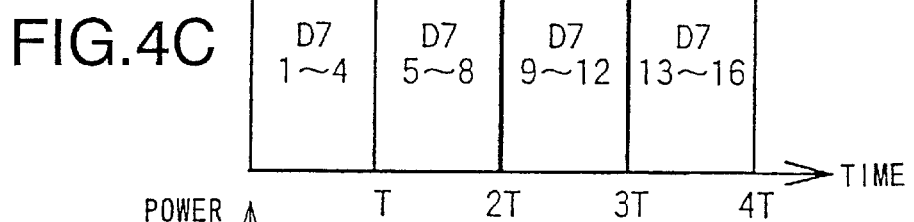
Figure 4D:
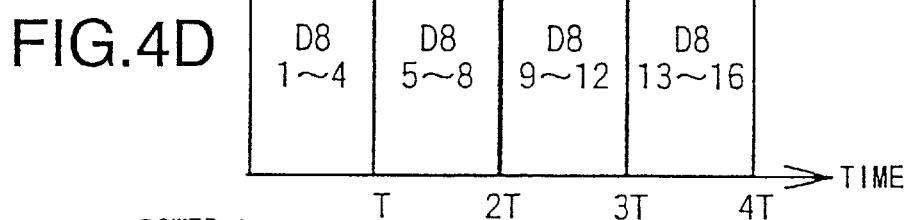
Figure 4E:
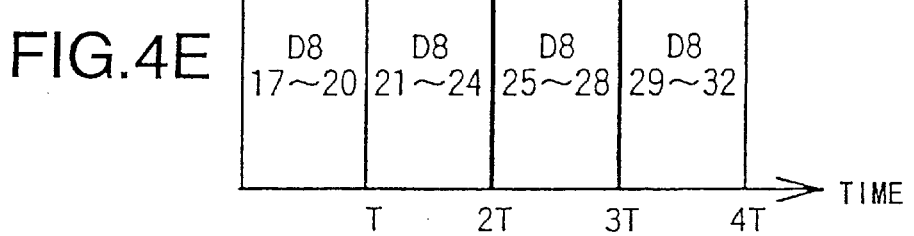
Figure 5A:
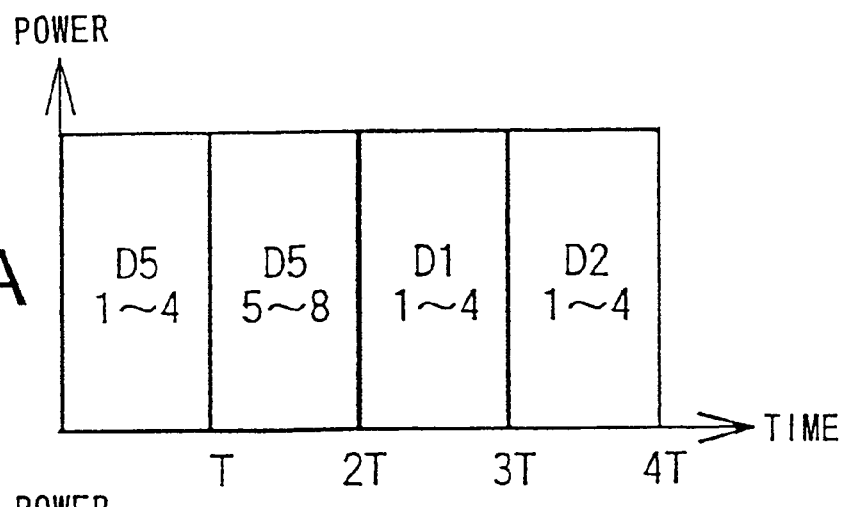
FIGS. 5A and 5B are diagrams illustrating another operation of the time division multiplexer in the spread spectrum communication system in accordance with the embodiment 1 of the present invention.
Figure 5B:
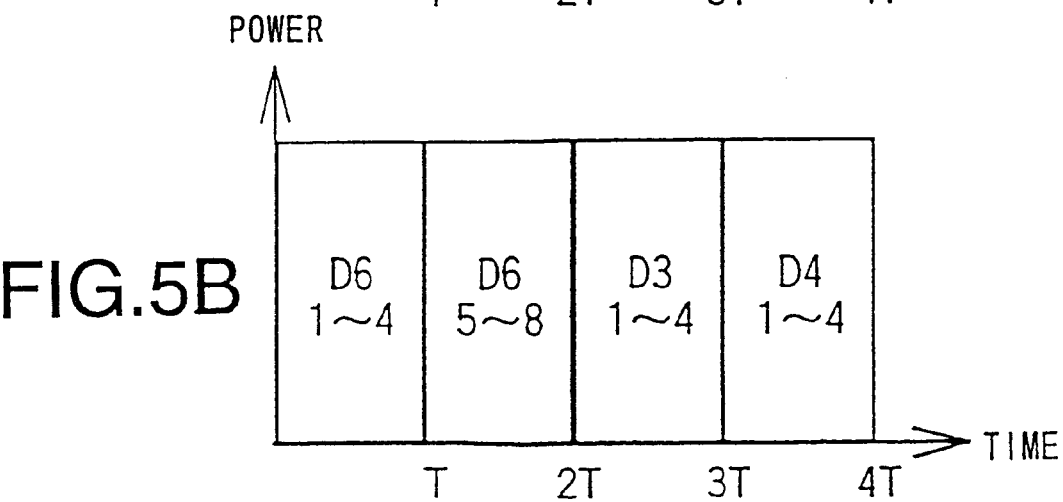

FIGS. 5A and 5B are diagrams illustrating another multiplexing method of the first time division multiplexer 110. Although FIGS. 4A–4G illustrate an example of the time division multiplexing of the same rate data, FIGS. 5A and 5B illustrate a method of time division multiplexing of one of the middle rate data (D5) with two of the low rate data (D1 and D2).

For example, FIG. 5A illustrates a time division multiplexing method of the middle rate data D5 with the low rate data D1 and D2. Since it is enough for the first time division multiplexer 110 to operate such that the rate after the multiplexing coincides with the high rate, combinations other than those as shown in FIGS. 5A and 5B can be allowed.

For example, the following combinations can be taken: (1) a method for outputting two sets of time division multiplexed data by inputting one set of the middle rate data and six sets of the low rate data; (2) a method for outputting two sets of time division multiplexed data by inputting three sets of the middle rate and two sets of the low rate data; (3) a method for outputting two sets of time division multiplexed data by inputting four sets of the middle rate; and (4) a method for outputting two sets of time division multiplexed data by inputting eight sets of low rate data. Thus, since the first time division multiplexer 110 allows proper assignment of various numbers of low rate and middle rate data in accordance with the transmission demand, a flexible system can be configured. In addition, the middle rate and low rate data can be time division multiplexed to the upper limit number allowed in connection with the high rate. This is because the time division multiplexing in the embodiment 1 requires only mapping of data into vacant slots, and the data mapping is achieved by time division multiplexing the data without requiring any complex frequency assignment or two-dimensional assignment of codes or slots.

The data with their rates matched by the first time division multiplexer 110 are led to the corresponding biorthogonal signal generators (BORTs): the low rate data D1–D4 are led to the biorthogonal signal generator 121, the middle rate data D5 and D6 are led to the biorthogonal signal generator 122a, the high rate data D7 are led to the biorthogonal signal generator 123a, and the high rate data D8 is led to the biorthogonal signal generators 124a and 125a. The biorthogonal signal generators 121, 122a–125a generate biorthogonal signals corresponding to the respective input data.

FIGS. 6A–6C show the details of the biorthogonal signal generators 121 and 122a–125a, wherein FIG. 6A is a block diagram of their configuration, FIG. 6B illustrates the relationships between the input information data and the output biorthogonal signals, and FIG. 6C is a detailed block diagram of an orthogonal signal generator 1220 using Walsh functions. Here, an example will be explained in which a biorthogonal signal is generated by every four input bits.

As shown in FIG. 6A, the information data input to the input terminal is converted into 4-bit parallel data (d0, d1, d2 and d3) by a series-to-parallel converter 1210. Subsequently, the orthogonal signal generator 1220 selectively produces one of the eight orthogonal codes by the 3-bit data (d0, d1 and d2), thereby generating an orthogonal signal. A second exclusive OR circuit 1230 carries out exclusive OR operation between individual bits of the orthogonal signal generated by the orthogonal signal generator 1220 and the remaining 1-bit data (d3), thereby producing the biorthogonal signal after polarity operation.

In the case where the Walsh functions are used as the orthogonal codes, the Walsh functions as shown in FIG. 6B are output as the orthogonal signal in response to the contents of the 4-bit parallel data d0–d3. That is, since one of the functions is selected by the three bits (d0, d1 and d2), eight types of Walsh functions with a length of eight are prepared, which are represented, for example, by W8(0)–W8(7) as illustrated in FIG. 6B. W8 refers to the Walsh functions with a length of eight, and the numbers in parentheses represent the function number. The Walsh functions selected as the orthogonal signal is inverted or noninverted in accordance with the content of the remaining 1-bit data (d3), thereby being produced as the biorthogonal signal. Therefore, the biorthogonal signal consists of an 8-bit length code sequence bearing 4-bit information.

The inverting or noninverting operation of the digital values is carried out by an exclusive OR gate if the values take binary values 0 and 1, and by an multiplier if they take +1 and −1. In the following, the sustained duration of the alsh function from its beginning to its end is termed a eriod, the interval between the codes constituting the Walsh functions is called a code interval, and the reciprocal of the code interval is termed a code rate.

When the Walsh functions are employed as the orthogonal signal, the orthogonal signal generator 1220 is implemented as shown in FIG. 6C. The orthogonal signal generator 1220 comprises AND circuits 1224–1226, and an EXOR circuit 1227. The AND circuits 1224–1226 carry out AND operation between input data d0, d1 and d2 and clock signals 1221, 1222 and 1223 whose rates are ½, ¼ and ⅛ of the code rate (=1/Tmc, where Tmc is the code interval), respectively. The EXOR circuit 1227 performs the exclusive OR operation among the outputs of the three AND circuits 1224–1226. The clock signal of the code rate is essential to the hardware configuration, and the clock signals with a rate of ½, ¼ and ⅛ of the code rate can be readily obtained by inputting the fundamental clock signal into a frequency divider such as a counter.

Next, the process will be described of selectively generating the Walsh functions by the orthogonal signal generator 1220 as shown in FIG. 6C. A Walsh function is defined as a row vector of a $2^K \times 2^K$ Hadamard matrix HN which can be extended from [H(N/2), H(N/2)], a repetition of two $2^{K-1} \times 2^{K-1}$ Hadamard matrices H(N/2), and [H(N/2), H*(N/2)], a repetition thereof and its inverse matrix, and thus raising the order. Here, the asterisk denotes an inverse matrix. The primary matrix H1 consists of the first row [0, 0] and the second row [0, 1], which correspond to W2(0) and W2(1), respectively. The matrix H2 can be generated from H1 such as [H1, H1] and [H1, H*1]. This results in four row vectors [0000], [0101], [0011] and [0110], which correspond to W4(0)–W4(3), respectively. The W8(0)–W8(7) generated in such a manner are shown in FIG. 6B.

Comparing W8(0) with W8(1), W8(2) with W8(3), W8(4) with W8(5), and W8(6) with W8(7) show that they are classified depending on whether or not an odd bit and the successive even bit are the same. They are the same in W8(0), W8(2), W8(4) and W8(6), and reverse in W8(1), W8(3), W8(5) and W8(7). This corresponds to the least significant bit d0 of the data shown in FIG. 6B. That is, if the least significant bit d0 is 0, they are the same, whereas if d0 is 1, they are reverse. The reversal of the successive even bit from an odd bit is achieved by the AND circuit 1224 using the clock signal 1221 whose rate is ½ of the code rate, and whether the inversion is adopted or not is determined by the least significant bit d0. When dividing each Walsh function into four pairs of two bits beginning from the least significant bit, and comparing W8(0) with W8(2), W8(1) with W8(3), W8(4) with W8(6), and W8(5) with W8(7), it is found that the same pairs of two successive bits are repeated in W8(0), W8(1), W8(4) and W8(5), whereas reverse pairs of two successive bits are repeated in W8(2), W8(3), W8(6) and W8(7). This depends on the second bit d1 of the data shown in FIG. 6B. That is, if the second bit d1 is 0, they are the same, whereas if the second bit d1 is 1, they are reverse. The reversal on 2-bit basis is implemented by the AND circuit 1225 using the clock signal 1222 whose rate is ¼ of the code rate, and whether the reversal is adopted or not is determined by the second bit d1.

Likewise, the polarity of the third bit d2 determines whether a 4-bit set beginning from the least significant bit is repeated with or without reversal. The reversal on 4-bit basis is implemented by the AND circuit 1226 using the clock signal 1223 whose rate is ⅛ of the code rate, and whether the reversal is adopted or not is determined by the third bit d2.

The Walsh functions which include these effect can be obtained by the outputs of the AND circuits, which are reversed or not reversed on the every three bit intervals by passing through the exclusive OR circuit 1227. Thus, the Walsh functions depending on the input data bits d0, d1 and d2 are output from the exclusive OR circuit 1227.

As described above, since the orthogonal signal generator 1220 in the spread spectrum communication system in accordance with the embodiment 1 can generate a particular orthogonal signal by using only the input data and the clock signals which are easily generated, the hardware in the system can be implemented by a simple configuration.

In addition, since the orthogonal signals are easily generated, the biorthogonal signals are also easily generated. In the receiver, the biorthogonal signal is demodulated by the data decoder 80 shown in FIG. 2B. If the Walsh functions are used as the orthogonal functions at the transmitter side, the demodulation processing can be simplified or the amount of hardware can be reduced by using a fast Hadamard transform called FHT. The FHT is a signal processing method in which the operation is performed of aking correlation between the received input signals and the entire Walsh functions without redundancy.

Although the orthogonal function sequences are generated using the Walsh functions with a length of eight in this embodiment 1, the orthogonal function sequences can be selectively generated with ease with a circuit configuration similar to those of FIGS. 6A–6C in the case where the length is 16 or more. That is, when the length is 16, it is implemented by providing an AND circuit with a clock signal whose rate is 1/16 of the code rate and which enables the reversal on 8-bit basis, and a fifth bit d4 of the input data which designates the repetition with or without reversal, and then by inputting the output of the AND circuit to the EXOR circuit.

Likewise, when the length is 32, it can be easily implemented by using a clock signal whose rate is 1/32 of the code rate, the sixth bit d5 of the input data, an AND circuit, and the EXOR circuit. It can also be implemented in a similar manner even when the length is 64 or more.

FIGS. 7A–7E illustrate the outputs from the biorthogonal signal generators 121 and 122a–125a, in which the axis of abscissa corresponds to time, and the axis of ordinate corresponds to the power of data.

In these figures, the reference character B1 denotes a biorthogonal signal generated from the four bits of the data D1, and B2, B3 and B4 also denote biorthogonal signals generated from the four bits of the data D2, D3 and D4, respectively. Biorthogonal signals B5 are denoted as B5(1) and B5(2) to make it clear that the two biorthogonal signals are generated from the 8-bit data which belong to the data D5. A similar notation is used for biorthogonal signals B6, and for biorthogonal signals B7 and B8 generated from the high rate data D7 and D8.

Figure 8:
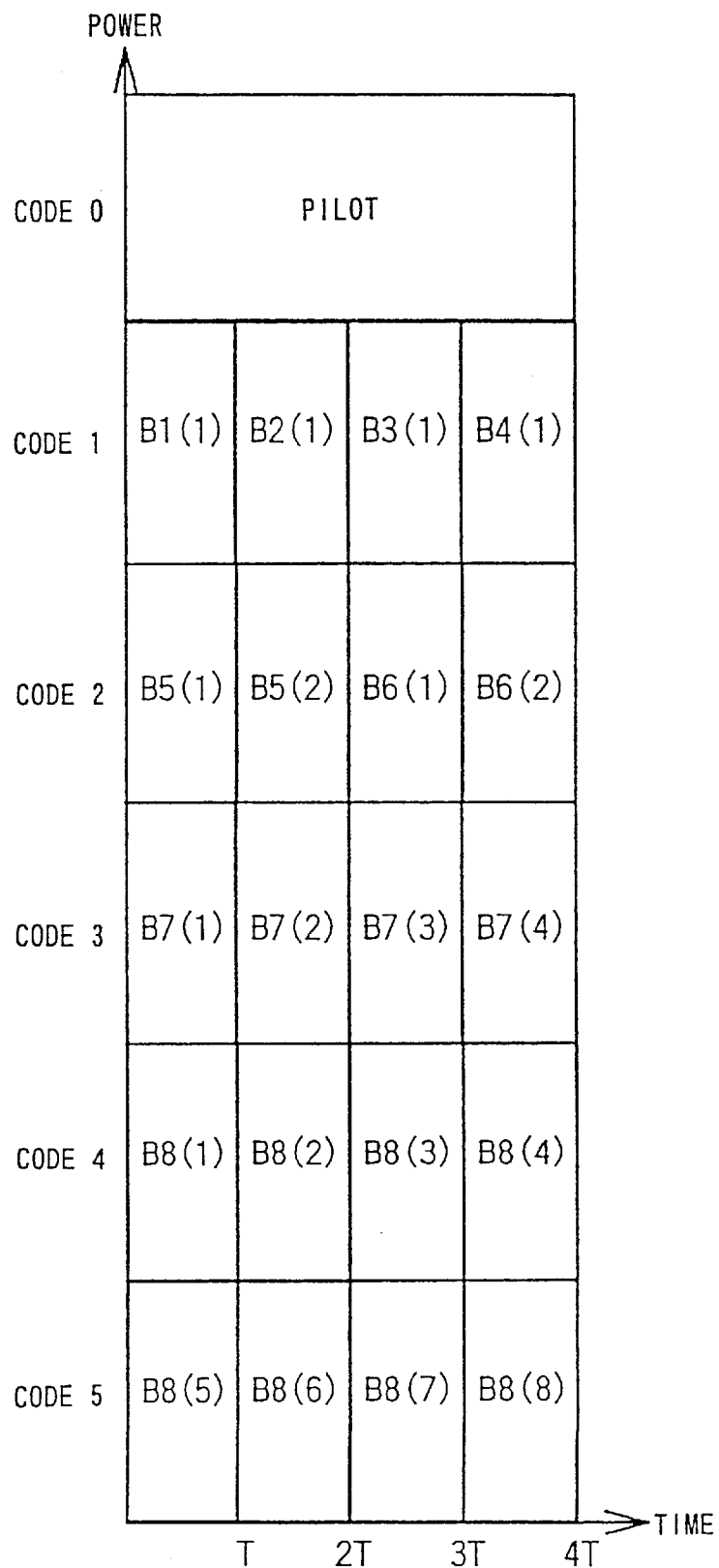
FIG. 8 is a diagram illustrating an operation of a first code division multiplexer in the spread spectrum communication system in accordance with the embodiment 1 of the present invention.

FIG. 8 is a diagram illustrating the multiplexing method by the code division multiplexer 130a shown in FIG. 1. The biorthogonal signals output from the biorthogonal signal generators 121 and 122a–125a and the pilot inserted at the transmitter each undergo code division multiplexing with different orthogonal codes. Since the pilot is used as the reference of the phases in the coherent detection at the receiver side, it does not undergo data modulation.

Figure 9:
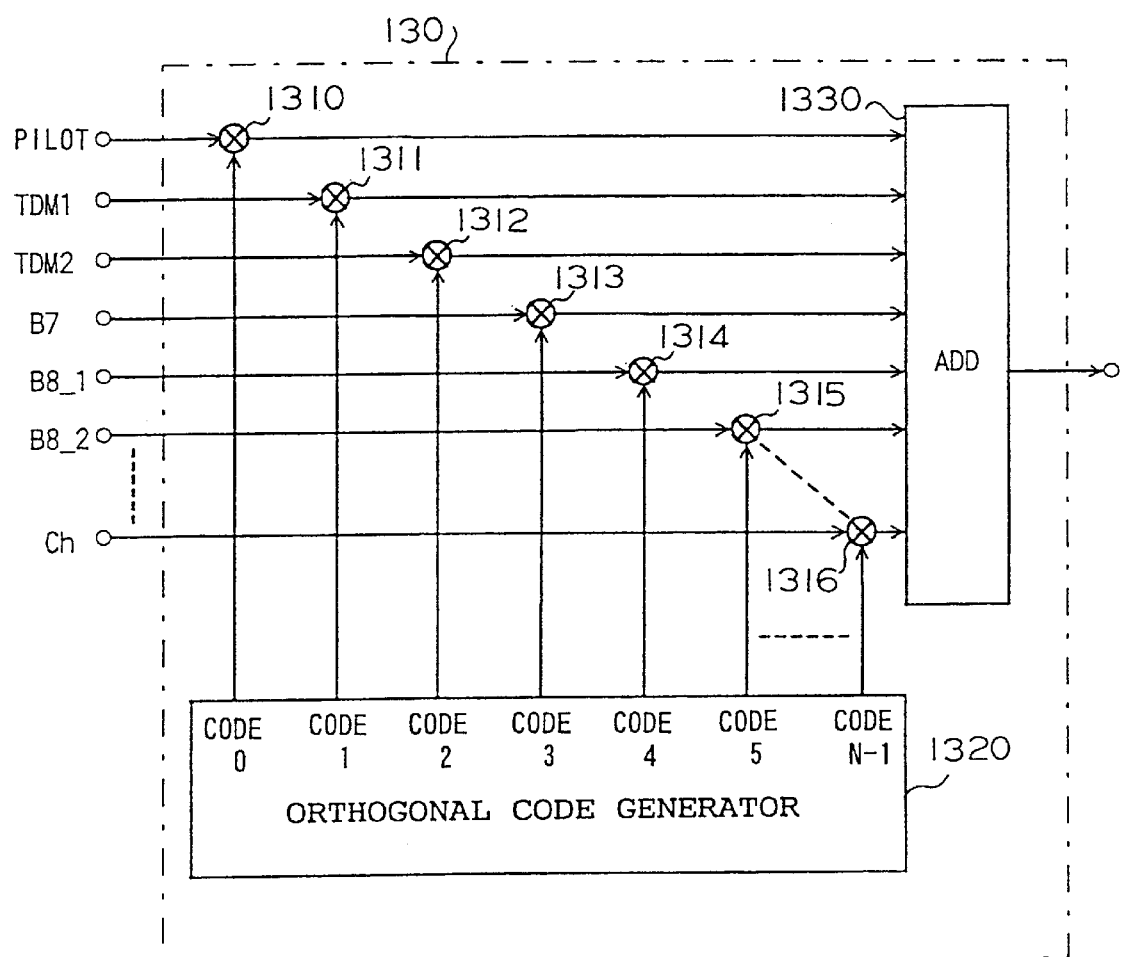
FIG. 9 is a block diagram illustrating a configuration of a first code division multiplexer in the spread spectrum communication systems in accordance with the embodiments 1–3 of the present invention.

FIG. 9 is a block diagram showing the details of the code division multiplexer 130a as shown in FIG. 1. In this figure, TDM1, TDM2, B7, B8-1 and B8-2 correspond to B1(1)–B4(1), B5(1)–B6(2), B7(1)–B7(4), B8(1)–B8(4) and B8(5)–B8(8), respectively. The biorthogonal signals TDM1, TDM2, B7, B8-1 and B8-2 input to the input terminals are multiplied through multipliers 1310–1315 by multiplexing codes Code 1, Code 2, Code 3, Code 4 and Code 5 generated by an orthogonal code generator 1320, and then are summed up by an adder 1330, thereby being produced as an output signal.

Although the code division multiplexer 130a shown in FIG. 9 has six input terminals including one for the pilot, code division multiplexing up to N is possible if the number of the orthogonal codes is N which are assignable in the transmission band. This is illustrated by an example in FIG. 9 in which an input "ch" and a multiplexing code Code "N-1" generated by the orthogonal code generator 1320 are multiplied by a multiplier 1316.

In the example as shown in FIGS. 8 and 9, the biorthogonal signals with the same period are multiplied by orthogonal codes which are orthogonal to each other at every period Tmc, thereby being code multiplexed. Here, Tmc is the code interval as shown in FIG. 6C, and becomes Tmc=T/8 because all the Walsh functions with a length of eight are input to the code division multiplexer 130a at a period T in the spread spectrum communication system of the embodiment 1.

If the number of the channels including the pilot exceeds eight, orthogonal codes with a length exceeding eight must be employed. Since the number of channels is six in this embodiment, the following will be described assuming that the length of the orthogonal codes for the code division multiplexing is eight.

Figure 10A:
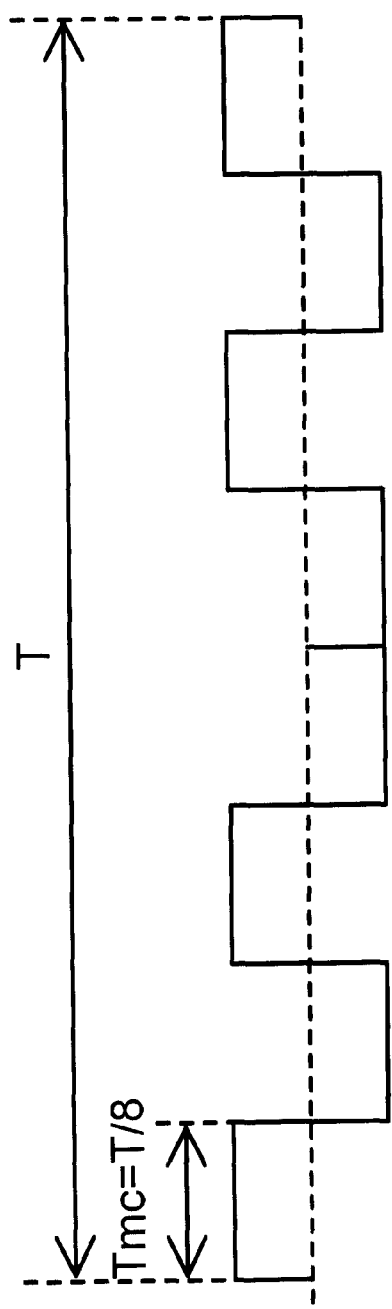
FIGS. 10A–10C are diagrams illustrating an operation of a first code division multiplexer in the spread spectrum communication systems in accordance with the embodiments 1–3 of the present invention.
Figure 10B:
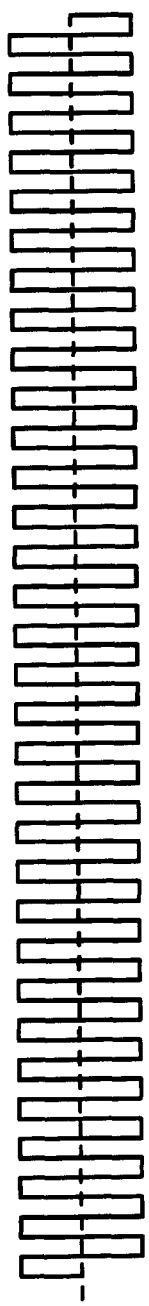
Figure 10C:
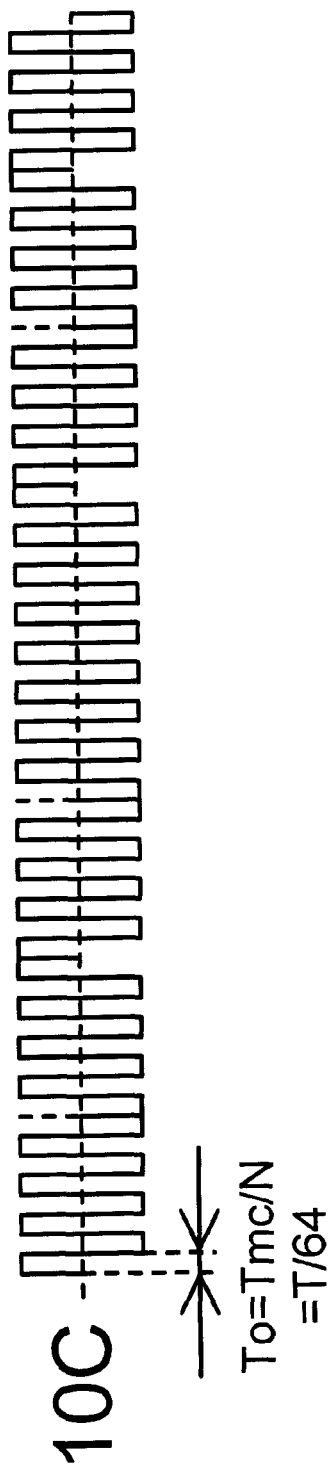

FIGS. 10A–10C are diagrams showing relationships of timings between the signal period T, code interval Tmc and orthogonal codes to be multiplied. The biorthogonal signals which undergo biorthogonal modulation by 4-bit transmitted data as shown in FIG. 10A have a code interval Tmc=T/8 because their period is T and code length is eight.

When performing the code division multiplexing operation, it is necessary to orthogonalize the biorthogonal signals based on at least code interval of these biorthogonal signals. Accordingly, one period of the orthogonal codes with a length of eight is multiplied during the code interval Tmc as shown in FIG. 10B, and hence the biorthogonal signals associated with N=8 channels are code multiplexed independently of the polarity of the codes of the input biorthogonal signals. In this case, the code interval To of the orthogonal code for the multiplexing becomes To=Tmc/N. Since N=8 in this embodiment, To=T/64 in the embodiment 1. FIG. 10C illustrates an example of input to the adder 1330 shown in FIG. 9.

Figure 11:
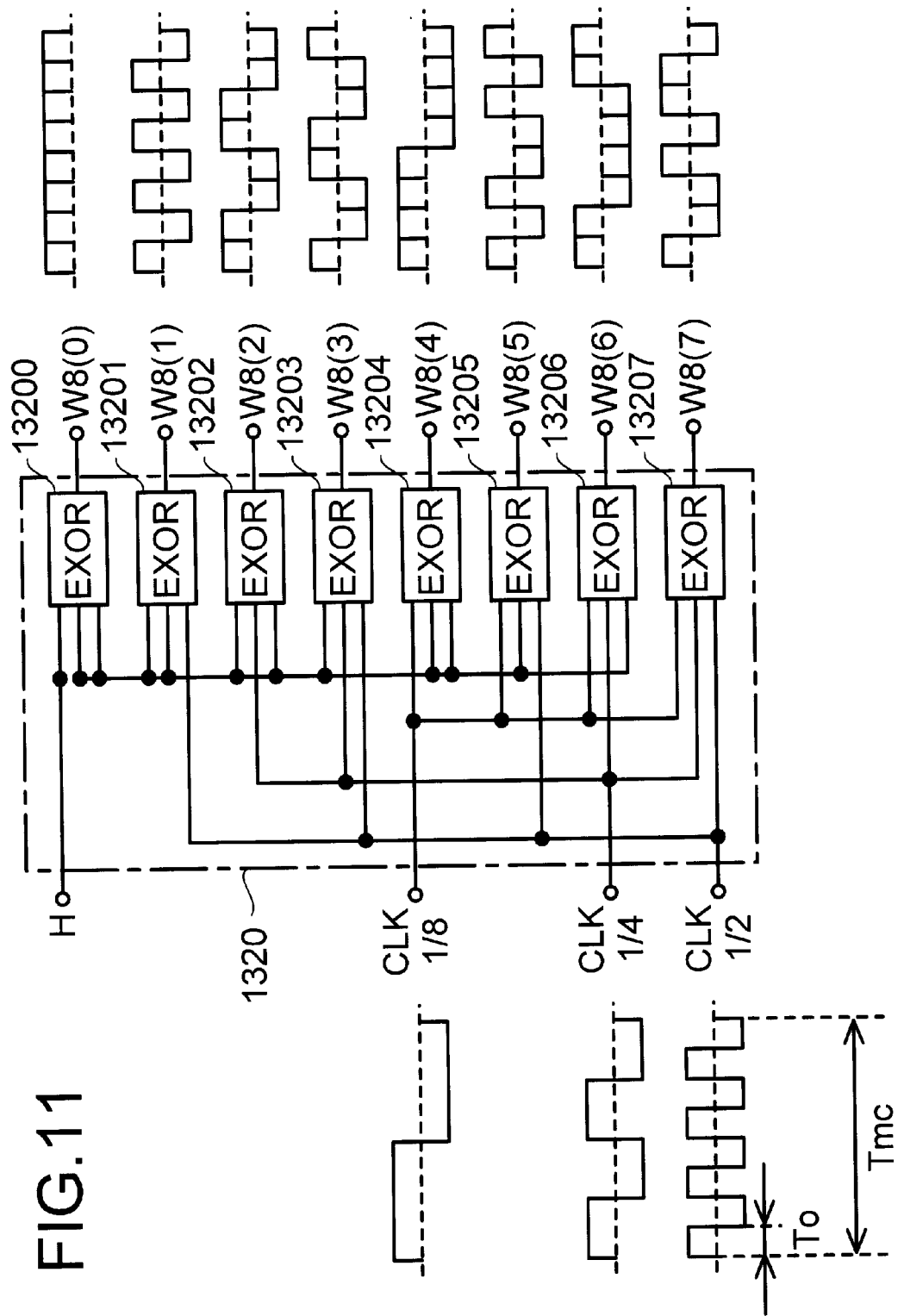
FIG. 11 is a block diagram illustrating an example of an orthogonal code set generator in the first code division multiplexer in the spread spectrum communication systems in accordance with the embodiments 1–3 of the present invention.

If the Walsh functions are used as the orthogonal codes for code division multiplexing (corresponding to Code 0 to Code N-1 in FIGS. 8 and 9), the orthogonal code set generator 1320 is configured as shown in FIG. 11.

The orthogonal code set generator 1320 differs from the orthogonal signal generator 1220 as shown in FIG. 6C in that although the orthogonal signal generator 1220 selectively generates one of the Walsh functions from the input data, the orthogonal code set generator 1320 as shown in FIG. 11 generates the entire Walsh functions at the same time.

Since it is already determined whether consecutive bits in the Walsh functions W8(0)–W8(7), for every one bit, for every two bits, or for every four bits, are identical or reverse, the selecting operation by the AND circuits 1224–1226 in the orthogonal signal generator 1220 as shown in FIG. 6c is unnecessary. The Walsh functions W8(0)–W8(7) can be generated by selecting the inputs to EXOR circuits 13200–13207. The selection depends on the number of Walsh functions as follows: A clock signal of ½ of the code rate (1/To) is input to the EXOR circuits 13200–13207 when the ½ clock signal is supplied, and the H level (that is, logically significant level) is input to the EXOR circuits when the ½ clock signal is not supplied; a clock signal of ¼ of the code rate (1/To) or the H level is input to the EXOR circuits 13200–13207 depending on whether the ¼ clock signal is supplied or not; and a clock signal of ⅛ of the code rate (1/To) or the H level is input to the EXOR circuits 13200–13207 depending on whether the ⅛ clock signal is supplied or not.

As described above, according to the spread spectrum communication system of the embodiment 1, the plurality of orthogonal functions can be easily obtained by using clock signals whose rates are ½, ¼ and ⅛ of the code rate, the H level, and the EXOR circuits.

In addition, the clock signals with their rates ½, ¼ and ⅛ of the code rate can be easily obtained by inputting a clock signal of the clock rate into a frequency divider such as a counter. Furthermore, the orthogonal function generator can be easily put into practice in a similar configuration even if the number of the orthogonal functions is 16 or more.

Figure 12:
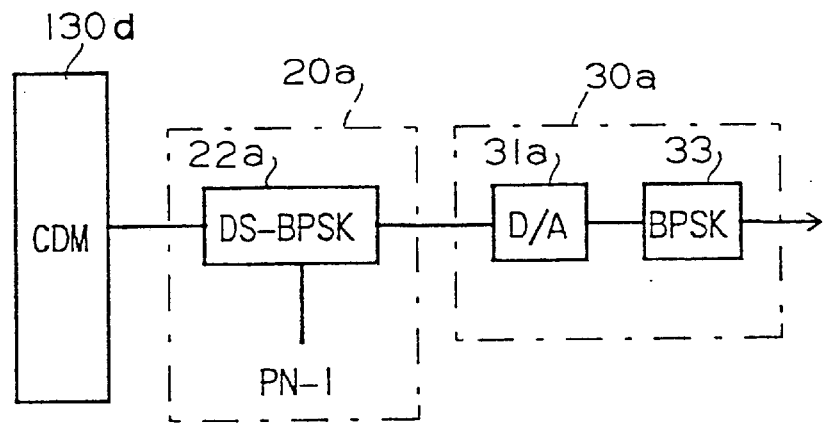
FIG. 12 is a block diagram illustrating an example of a spreading modulator and a carrier modulator in the spread spectrum communication systems in accordance with the embodiments 1–3 of the present invention.

FIG. 12 is a block diagram showing an example of the spreading modulator 20 and the carrier modulator 30 as shown in FIG. 2A. The output signal of a code division multiplexer 130d (which corresponds to the code division multiplexer 130a in the embodiment 1 as shown in FIG. 1) undergoes BPSK spreading modulation by a BPSK spreading modulator 22a in a spreading modulator 20a, is input to a carrier modulator 30a in which it is D/A converted by a D/A converter 31a, and BPSK modulated by a BPSK modulator 33.

The BPSK spreading modulator 22a carries out the BPSK spreading modulation on the code division multiplexed signal output from the code division multiplexer 130d by using a PN code PN-I.

Figure 13:
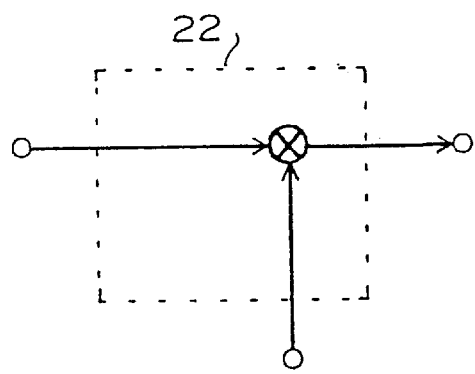
FIG. 13 is a diagram illustrating an example of a BPSK spreading modulator in the spread spectrum communication systems in accordance with the embodiments 1–3 of the present invention.
Figure 14:
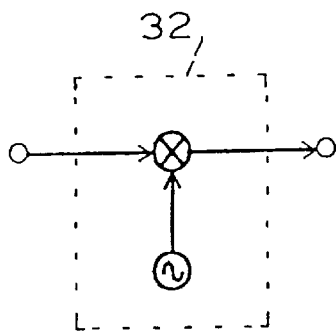
FIG. 14 is a diagram illustrating an example of a BPSK carrier modulator in the spread spectrum communication systems in accordance with the embodiments 1–3 of the present invention.

FIG. 13 illustrates a configuration of the BPSK spreading modulator. Since the spreading modulation is achieved by a simple multiplying operation in the BPSK modulation, the transmitter can be implemented with a simple configuration. It is enough for the receiver, as well, to provide a correlator for demodulating the spread code for one PN code. This makes it possible to reduce the size of the receiver. FIG. 14 illustrates an example of the BPSK carrier modulator 33.

Although not shown in FIG. 12, waveform shaping is carried out in the carrier modulator 30a for band limiting. When the waveform shaping is implemented by the digital processing using a digital filter or the like, it is inserted before the D/A converter 31a, and when implemented using an analog filter such as an SAW filter, it is inserted after the D/A converter 31*a*.

As for the PN code sequence used for the spectrum spreading are random code sequences such as Gold code sequences, M-sequences. Although it is enough that the code rate of the PN sequence for spectrum spreading is equal to or greater than the code rate of the orthogonal codes used in the code division multiplexing, it is preferable that it match the code rate of the orthogonal codes, considering the effective use of the code space of the multiplexing by the orthogonal codes and the biorthogonal signals.

As the PN code sequence, a code with a period much longer than that of the data is used. The reason for this is as follows: When demodulating the code division multiplexed signals at the receiver, demultiplexing is indeed possible if the period of the PN code sequence is longer than that used in the code division multiplexing. Mobile communications, however, is under a special environment called multipath fading. Thus, if the delay times of signals reflected by buildings or the like are equal to or greater than the period of the codes used for the code division multiplexing, distinction between the forward wave and delayed waves becomes impossible. This results in the degradation of the signal transmission characteristics, which is called cochannel interference.

On the contrary, when the PN code sequence with a period longer than the observed delay time is used to be multiplied with the biorthogonal signals as a partial sequence rather than an entire sequence, it seems that different PN sequences are multiplied with the biorthogonal signals. This enables the receiver to easily separate the delay waves, even if there are any delay waves with a delay longer than a critical delay time. Furthermore, in this case, the receiver can introduce a technique called RAKE receiving which utilizes the separated delay wave components as demodulation information, which makes it possible to improve the demodulation characteristics.

Figure 15:
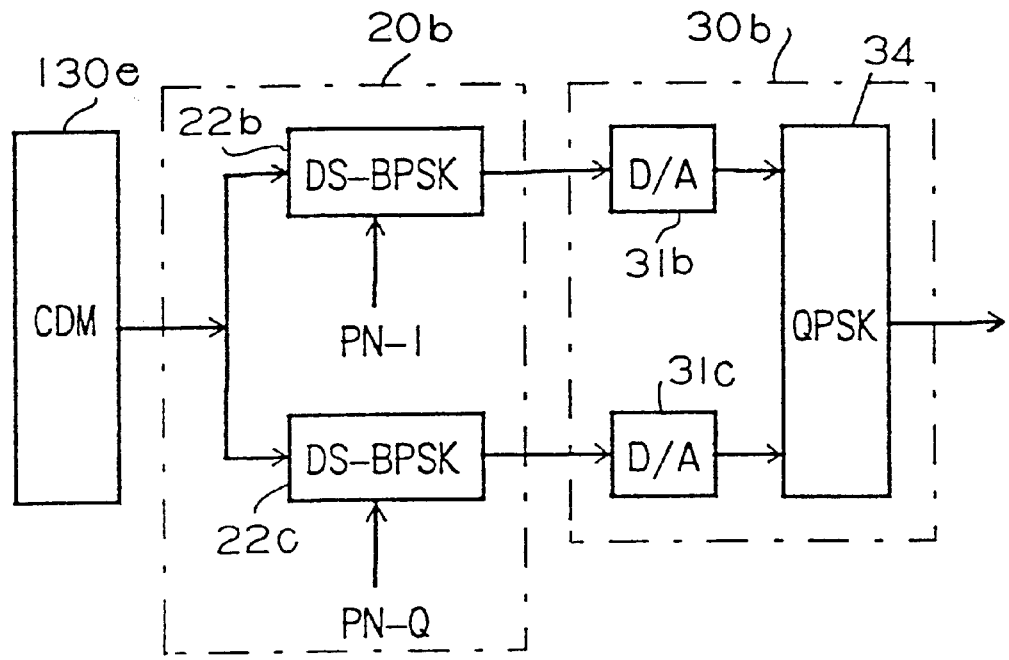
FIG. 15 is a block diagram illustrating another example of the spreading modulator and the carrier modulator in the spread spectrum communication systems in accordance with the embodiments 1–3 of the present invention.
Figure 16:
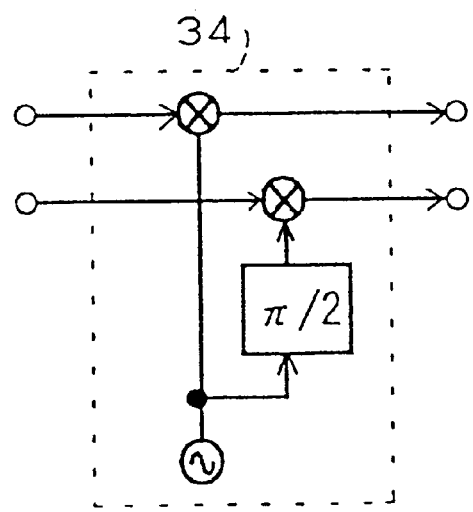
FIG. 16 is a diagram illustrating a configuration of a QPSK carrier modulator in the spread spectrum communication systems in accordance with the embodiments 1–3 of the present invention.

FIG. 15 is a block diagram showing another example of the spreading modulator 20 and carrier modulator 30 as shown in FIG. 2A. The output signal of a code division multiplexer 130*e* (which corresponds to the code division multiplexer 130*a* in the embodiment 1 of FIG. 1) is diverged in a spreading modulator 20*b*. The diverged signals undergo BPSK spreading modulation at the BPSK spreading modulators 22*b* and 22*c* using different PN codes PN-I and PN-Q, respectively. The two outputs of the spreading modulator 20*b* are input to a carrier modulator 30*b*, in which they are D/A converted by the D/A converters 31*b* and 31*c*, and QPSK modulated by a QPSK modulator 34*a*. FIG. 16 shows an example of the QPSK carrier modulator 34*a*.

The spreading codes PN-I and PN-Q used for the spectrum spreading in the BPSK modulators 22*b* and 22*c* as shown in FIG. 15 each have the same property, code rate and period as the spreading code PN-I used in the BPSK spreading modulator 22*a* as shown in FIG. 12. Only difference is that two PN sequences are used in this case.

Performing spreading modulation of the same multiplexed signal by using two PN codes as the spreading modulator 20*b* shown in FIG. 15 enables the interference amount due to the delay waves or the other transmitted signals to be uniform. The reason for this is as follows: When the phase difference between the carrier of the desired signal and those of the delay waves or the other transmitted signals is ±90 degrees, the interference will not occur because their carrier axes are orthogonal to each other. If the phase difference is 0 or 180 degrees, however, the interference will occur.

Since the phase difference is usually random, it will greatly vary the transmission quality of the system. However, using the two PN codes to perform the spreading modulation makes it possible to uniform the interference amount between the desired signal and the interference waves independently of the phase difference.

Figure 17:
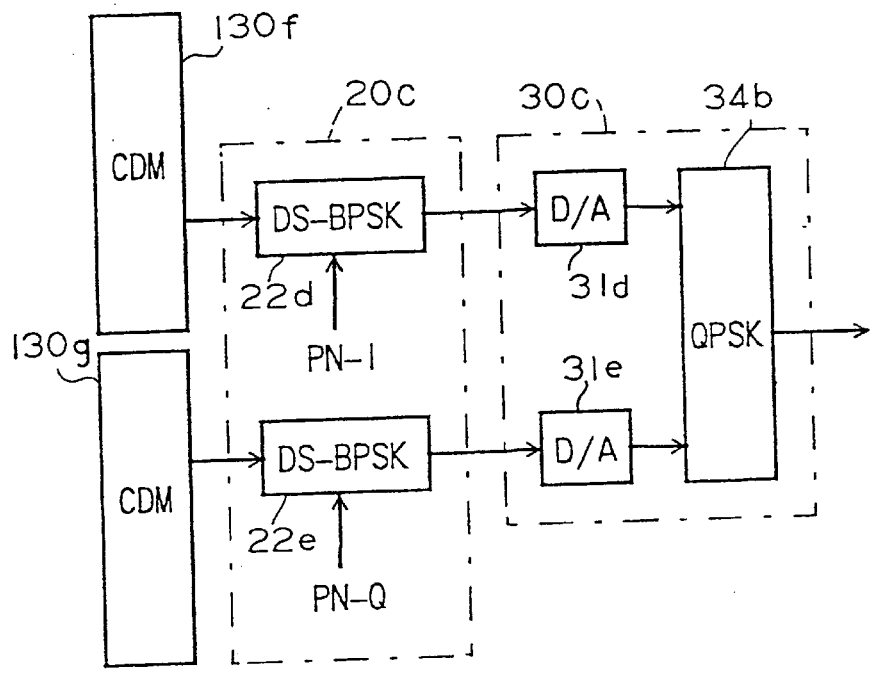
FIG. 17 is a block diagram illustrating still another example of the spreading modulator and the carrier modulator in the spread spectrum communication systems in accordance with the embodiments 1–3 of the present invention.

FIG. 17 is a block diagram showing still another example of the spreading modulator 20 and carrier modulator 30 as shown in FIG. 2A. The code division multiplexed signals output from two code division multiplexers 130*f* and 130*g* (which correspond to the plurality of 130*a*'s in the embodiment 1 of FIG. 1) undergo BPSK spreading modulation in a spreading modulator 20*c* by separate BPSK spreading modulators 22*d* and 22*e* using two PN codes PN-I and PN-Q, respectively. The two outputs of the spreading modulator 20*c* are input to a carrier modulator 30*c*, in which they are D/A converted by D/A converters 31*d* and 31*e*, and QPSK modulated by a QPSK modulator 34*b*.

The foregoing FIGS. 6A–6C show the case in which the biorthogonal signal generators 121, 122*a*–125*a* generate for each 4-bit data one biorthogonal signal with a length eight. If biorthogonal signal generators are used which generate one biorthogonal signal for every 6-bit data, its length will become 32.

That is, one of the 32 sequences are selected by 5-bit data, and the remaining 1-bit data is used to determine the polarity of the sequence. Although using the biorthogonal signals can improve the transmission characteristics as error correcting codes, it will increase the bandwidth required. For example, although the 4-bit data with a length of eight will double (8/4) the bandwidth, the 6-bit data with a length 32 will increase the bandwidth by a factor of about 5.3 (32/6). When the transmission bandwidth is fixed, the increase in the bandwidth will reduce the number of multiplexing by the code division multiplexer 130*a* shown in FIG. 1.

In contrast, if the QPSK is employed for the carrier modulation as shown in FIG. 17, and the outputs of the code division multiplexers 130*f* and 130*g* are input thereto, the maximum number of the multiplexing increases by a factor of 2.

This, however, does not necessarily mean that the number of users simultaneously communicating becomes twice. This is because the increase in the number of independent users lead to an increase in interference power, and this prevents desired transmission quality from being achieved. However, using biorthogonal signals with a long length for the data transmission of the same users keeps constant the transmission energy per bit of the transmission data, even if the sequence length (or the apparent multiplexed number) increases. This will result in achieving high quality transmission characteristics rather than causing an increase in the total interference power. Hence, reduction in the transmission power can be expected.

In addition, in the cases in which the number of data or the biorthogonal signals to be used are equal, a method can be taken in which the multiplexed number is halved so that two multiplexed signals are output to undergo spreading separately. Considering the number of the code division multiplexing, the 4-bit information is converted to a binary sequence by using biorthogonal signals, so that the number of the multi-valued levels can be further reduced due to the code division multiplexing, because of halving the multiplexed number, in addition to the effect, which has already been achieved, that the number of multi-valued levels is reduced as compared with the multiplexing without using them.

Reducing the number of multi-valued levels enables the peak power to be reduced. For example, the average power of the binary sequence (+1, −1) is calculated by dividing the square of the absolute value of the amplitude by two, thus taking a value ½. The total power for transmitting binary sequences bearing independent information through four channels becomes 4×(½)=2. On the other hand, the amplitude of the binary sequences with power of two is (+2, −2). Accordingly, transmission of the biorthogonal signal is carried out using the amplitude levels of (+2, −2). In contrast with this, the amplitude of the binary sequence (+1, −1) in the 4-channel code division multiplexing takes one of the values (+4, +2, 0, −2, −4), because the total amplitude depends on the sequences on respective channel, and is calculated by considering all the cases such as all the amplitudes are +1, or −1, the amplitudes on three channels are +1 and the remainder is −1, and so on. Thus, the amplitude can take zero in which no transmission power is required, or +4 or −4 in which the peak power is eight. Thus, the peak power becomes larger than when the biorthogonal signal is transmitted in which case the power is kept fixed at 2.

Thus limiting the peak power can mitigate the demand for the linearity of amplifiers constituting the analog section, thereby making it possible to reduce the size of the transmitter or save the power consumption.

In FIG. 17, the spreading codes used for the spectrum spreading are the same as those in FIG. 15. In other words, random code sequences such as Gold code sequences, M-sequences are used as the PN code sequences for the spectrum spreading. Although it is enough that the code rate of the PN sequences is equal to or greater than the code rate of the orthogonal codes used for the code division multiplexing, it is preferable that it approximately match the code rate of the orthogonal codes, considering the effective use of the code space of the multiplexing by the orthogonal codes and the biorthogonal signals. In addition, the PN codes are used which have much longer period than the data.

Figure 18:
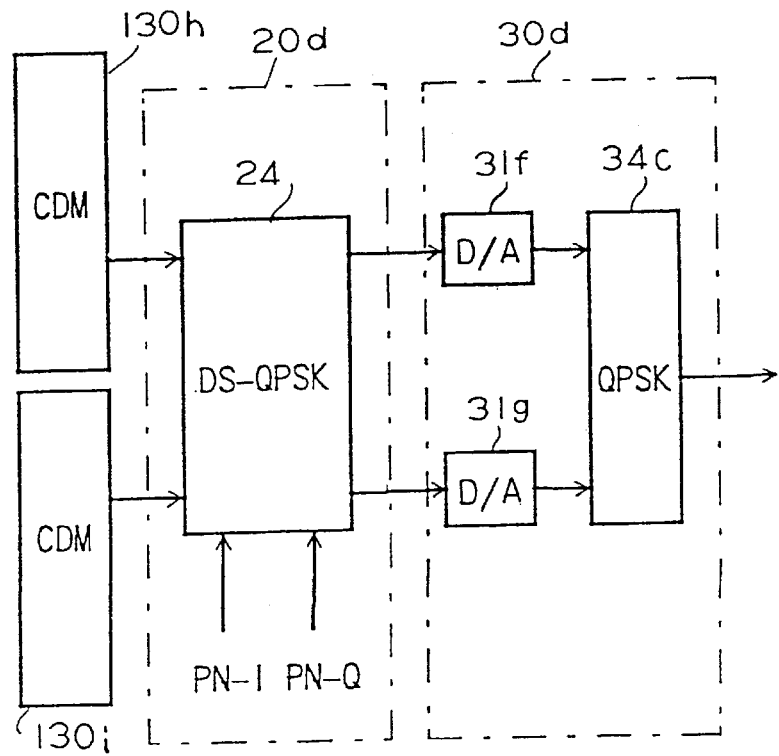
FIG. 18 is a block diagram illustrating another example of the spreading modulator and the carrier modulator in the spread spectrum communication systems in accordance with the embodiments 1–3 of the present invention.

FIG. 18 is a block diagram showing still another example of the spreading modulator 20 and the carrier modulator 30 as shown in FIG. 2A. The code division multiplexed signals output from two code division multiplexers 130*h* and 130*i* (each corresponds to the code division multiplexer 130*a* in the embodiment 1 of FIG. 1) undergo QPSK spreading modulation in a spreading modulator 20*d* by a QPSK spreading modulator 24 using two PN codes PN-I and PN-Q, respectively. The two outputs of the spreading modulator 20*d* are input to a carrier modulator 30*d*, in which they are D/A converted by D/A converters 31*f* and 31*g*, and QPSK modulated by a QPSK modulator 34*c*.

Figure 19:
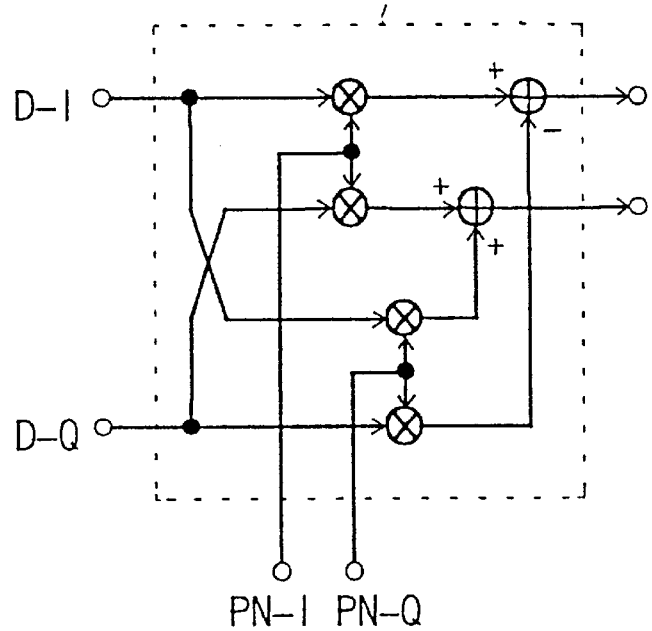
FIG. 19 is a diagram illustrating a configuration of a QPSK spreading modulator in the spread spectrum communication systems in accordance with the embodiments 1–3 of the present invention.

FIG. 19 illustrates a configuration of the QPSK spreading modulator 24. Two code division multiplexed signals D-I and D-Q are combined with the two spreading codes PN-I and PN-Q as shown in FIG. 19 to be multiplied and summed up, thereby being produced as two outputs. Denoting the D-I signal and D-Q signal by dI and dQ, and the two spreading codes PN-I and PN-Q by PNI and PNQ, respectively, the input signal can be represented by the complex signal notation as dI+jdQ. The QPSK spreading modulation multiplies the input signal by PNI+jPNQ, and then outputs the real part as the in-phase axial component, and the imaginary part as the quadrature axial component. That is, the following calculation is carried out:

$$(dI+jdQ) \times (PNI+jPNQ) = (dI \times PNI - dQ \times PNQ) + j(dI \times PNQ + dQ \times PNI)$$

FIG. 19 illustrates the combination of the multiplication and the addition of the products.

In the case where the QPSK spreading modulation is carried out on the two multiplexed data as illustrated in FIG. 18, the interference amount can be uniformed as in FIG. 15. More that is, when the BPSK is used to carry out the spreading modulation of the individual multiplexed signals as shown in FIG. 17, it will sometimes occur that the interference component will have much greater effect on one of the two multiplexed signals than the other because the two multiplexed signals are independent. On the contrary, the effect due to the phase difference of the interference component can be uniformed in the spreading modulation which uses two spreading codes as shown in FIG. 18. In addition, generating the two code division multiplexed signals as shown in FIG. 18 has the same effect as the arrangement shown in FIG. 17. That is, when QPSK is employed for the carrier modulation, and the outputs of the code division multiplexers 130*h* and 130*i* are input thereto, the maximum multiplexed number increases by a factor of 2. Although this does not necessarily mean that the number of simultaneous users doubles, the transmission power can be reduced. Furthermore, since the number of multi-valued levels due to the code division multiplexing can be further reduced, the peak power can be reduced. This will mitigate the demand for the linearity of amplifiers constituting the analog section, thereby making it possible to reduce the size of the transmitter or save the power consumption.

EMBODIMENT 2

Figure 20:
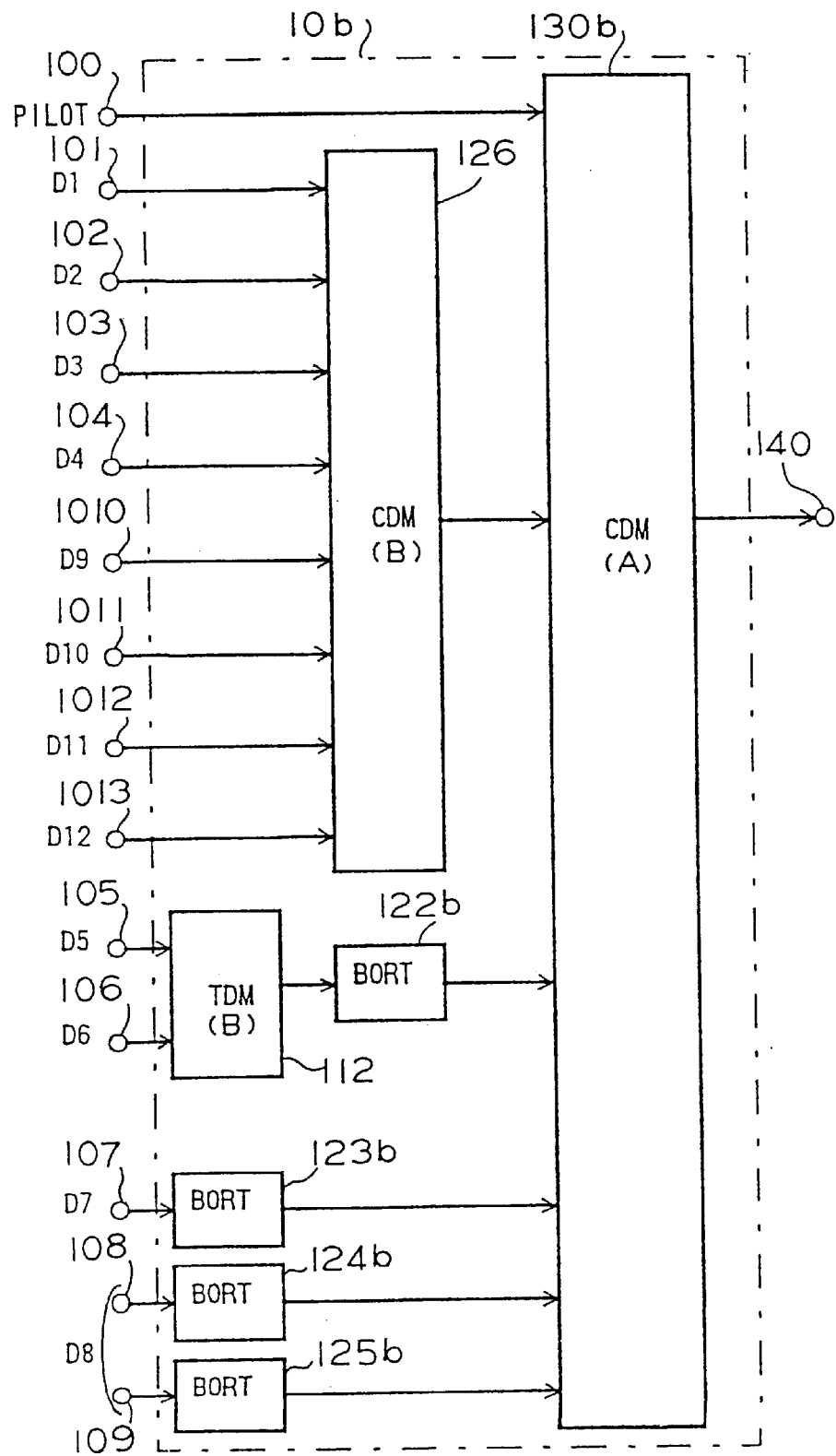
FIG. 20 is a block diagram showing a configuration of a multiplexer in the spread spectrum communication system in accordance with the embodiment 2 of the present invention.

FIG. 20 is a block diagram showing another configuration of the multiplexer 10 as shown in FIG. 2A, a multiplexer in a spread spectrum communication system according to an embodiment 2 of the present invention. In this figure, the reference numeral 10*b* designates a multiplexer, 100 denotes the input terminal of the pilot, 101–104 denote the input terminals of low rate data D1–D4, 105 and 106 denote the input terminals of middle rate data, 107 denotes the input terminal of high rate data, 108 and 109 denote the input terminals of high rate data, 112 denotes a second time division multiplexer TDM(B), 122*b*, 123*b*, 124*b* and 125*b* denote biorthogonal signal generators BORTs, 126 denotes a second code division multiplexer CDM(B), 130*b* denotes a code division multiplexer CDM(A), 140 denotes an output terminal, and 1010–1013 denote the input terminals of low rate data D9–D12. In the multiplexer 10*b* as shown in FIG. 20, the number of data can be properly assigned in response to communication demand, where the number of data includes, for example, the number of the middle rate data which undergo biorthogonal modulation after the time division multiplexing, the number of the high rate data which undergo biorthogonal modulation without the time division multiplexing, and the number of the low rate data which undergo two step code division multiplexing.

Next, the operation will now be described.

The middle rate data D5 and D6 are time division multiplexed by the second time division multiplexer 112 to have the same rate as the high rate data (D7 and D8). The middle and high rate data are converted into biorthogonal signals through the biorthogonal signal generators 122*b*–125*b*, and then input to the code division multiplexer 130*b*. The second time division multiplexer 112 differs from the first time division multiplexer 110 in the spread spectrum communication system in the embodiment 1 as shown in FIG. 1 in that only the middle rate data (D5 and D6) are input thereto.

On the other hand, the low rate data D1–D4 and D9–D12 are not converted into biorthogonal signals, but are code division multiplexed through the second code division multiplexer 126 in advance such that their code rate becomes identical to the code rate of the biorthogonal signals. Subsequently, they are input to the code division multiplexer 130b in which they are code division multiplexed with the middle rate data D5 and D6 which have been converted into the biorthogonal signal after the time division multiplexing, and the high rate data D7 and D8 which have been directly converted into the biorthogonal signals.

The relationships between rates of the low rate data D1–D4, the middle rate data D5 and D6 and the high rate data D7 and D8, which are input to the multiplexer 10b are the same as those illustrated in FIGS. 3A–3I.

In the spread spectrum communication system of the embodiment 2, the rate of the low rate data D9–D12 which are input to the new terminals 1010–1013 are identical to that of the low rate data D1–D4. That is, the relationships between the rates are the same as those of FIGS. 3A–3D.

The time division multiplexing method in the second time division multiplexer 112 for the middle rate data is the same as that of FIG. 4B. In other words, the middle rate data D5 and D6 are compressed in time such that their rate becomes identical to that of the high rate data D7 and D8.

The configuration and operation of the biorthogonal signal generators 122b–125b are the same as those of FIGS. 6A–6C. Their outputs are the same as those shown in FIGS. 7B–7E. In other words, since the biorthogonal signals of binary sequences are generated from the 4-bit data, they can be easily generated, making it possible to reduce the size of the hardware.

Figure 21:
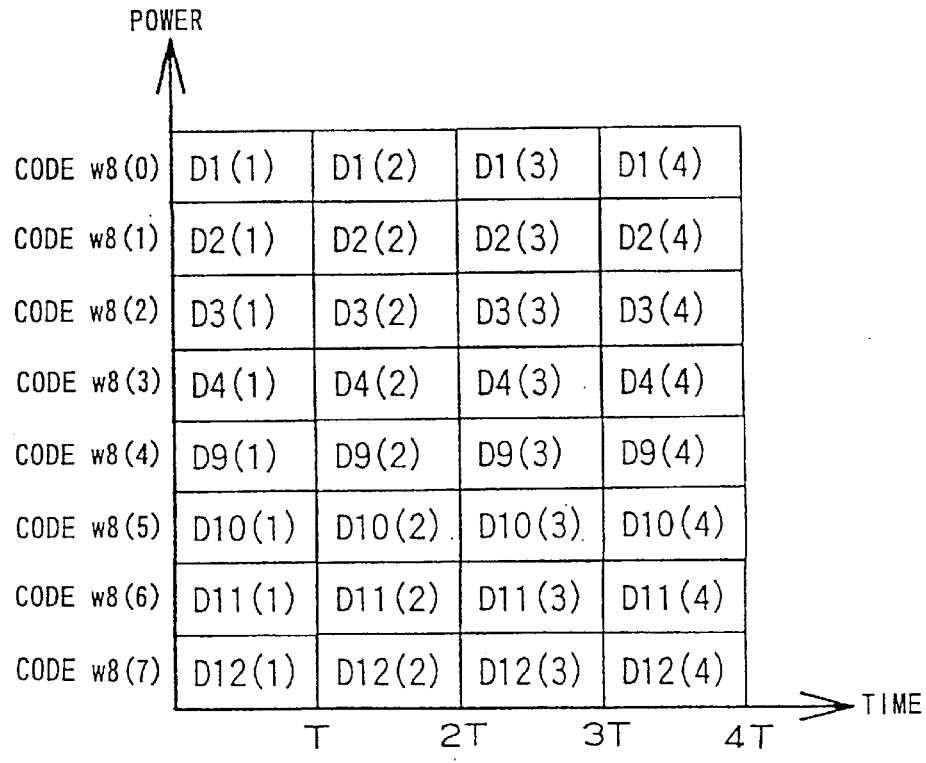
FIG. 21 is a diagram illustrating an operation of a second code division multiplexer in the spread spectrum communication system in accordance with the embodiment 2 of the present invention.

FIG. 21 shows a method for multiplexing the low rate data D1–D4 and D9–D12 by the second code division multiplexer 126. To the low rate data D1–D4 and D9–D12, codes for multiplexing are assigned which consist of Code w8(0), Code w8(1), Code w8(2), Code w8(3), Code w8(4), Code w8(5), Code w8(6) and Code w8(7), and are multiplied by the input data followed by summation. The duration of each data is T since they are low rate data.

Figure 22:
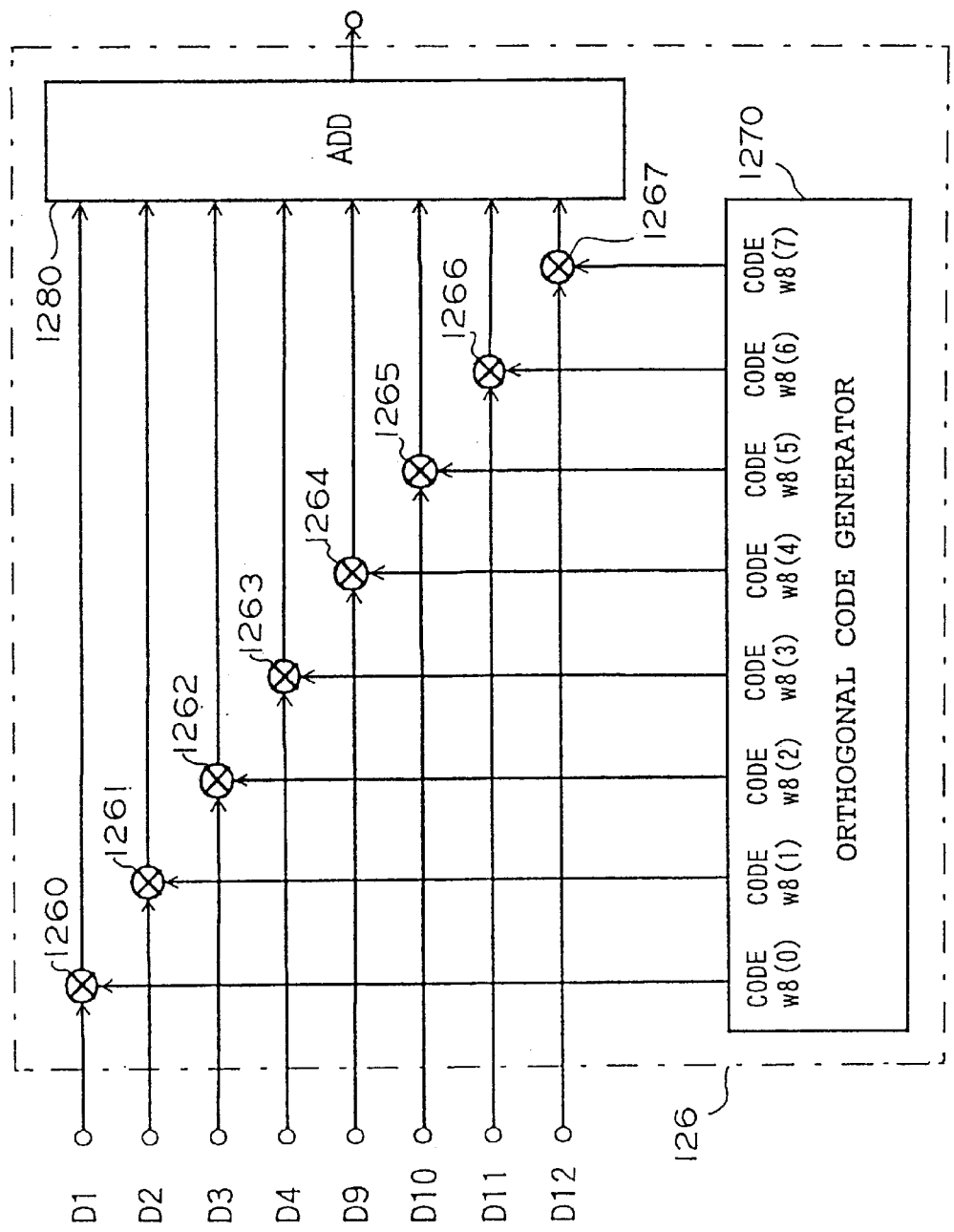
FIG. 22 is a block diagram illustrating a configuration of an orthogonal signal generator in the second code division multiplexer in the spread spectrum communication system in accordance with the embodiment 2 of the present invention.

FIG. 22 illustrates a configuration of the code division multiplexer 126. It is basically the same as the code division multiplexer 130a shown in FIG. 9. That is, the low rate data D1–D4 and D9–D12 are multiplexed by the Code w8(0), Code w8(1), Code w8(2), Code w8(3), Code w8(4), Code w8(5), Code w8(6) and Code w8(7) through multiplexers 1260–1267, respectively, and the products are summed up by an adder 1280.

The upper limit of the number of multiplexing in the second code division multiplexer 126 is the same as the code sequence number of the biorthogonal signals used in the biorthogonal signal generators 122b–125b. In the example as shown in FIGS. 6A–6C, the codes with a length of eight are used as the orthogonal codes. The second code division multiplexer 126 in accordance with the embodiment 2 as shown in FIG. 20 can also use codes with a length up to eight, and hence the upper limit of the number of multiplexing becomes eight.

Thus, eight types of the orthogonal codes are prepared to be used for multiplexing, and their code rate is 8/T. Actually, multiplexing of any number equal to or less than the upper limit of eight is performed in accordance with the communication demand. The upper limit of the multiplexing number (which corresponds to the length of the biorthogonal signal) varies with the variation of the length of codes used as the biorthogonal signals.

FIG. 22 shows the configuration of the second code division multiplexer 126 in the spread spectrum communication system in accordance with the embodiment 2 as shown in FIG. 20. The basic configuration of the second code division multiplexer 126 is the same as the code division multiplexer 130a in the spread spectrum communication system of the embodiment 1 as shown in FIG. 9, except for the types of the input data, operation speed and restriction on the upper limit of the multiplexing number.

It is preferable that an orthogonal code generator 1270 use the Walsh functions because this simplifies the configuration. Thus, a method using the Walsh functions will now be described in this embodiment 2.

The basic configuration of the orthogonal code generator for generating the Walsh functions is the same as the orthogonal code set generator 1320 as shown in FIG. 11. The rate of the input clock, however, differs since the operation speed is different. The fundamental code rate is (8/T) which equals (1/Tmc). Accordingly, the rates of three clock signals are ½, ¼ and ⅛ of (1/Tmc). Since the operation speed is different, the Walsh functions are denoted by w8(0)–w8(7) in FIGS. 21 and 22 so that they are distinguished from the Walsh functions W8(0)–W8(7) used in the code division multiplexer 130b.

Figure 23:
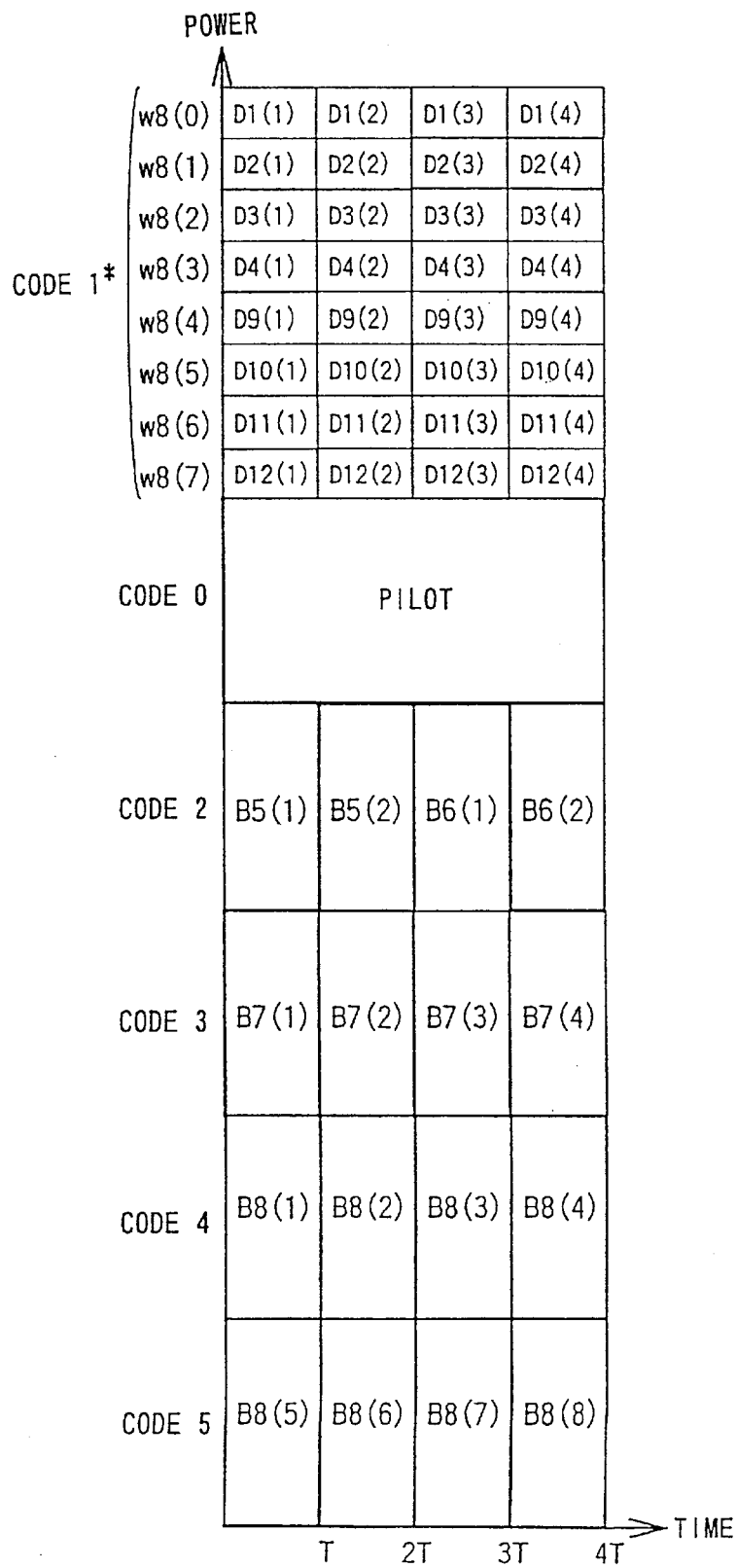
FIG. 23 is a diagram illustrating an operation of the first code division multiplexer in the spread spectrum communication system in accordance with the embodiment 2 of the present invention.

FIG. 23 illustrates the multiplexing method by the code division multiplexer 130b of the embodiment 2 as shown in FIG. 20.

The multiplexing method of the middle rate data B5 and B6, and the high rate data B7 and B8 are the same as that of the code division multiplexer 130a of the embodiment 1 as shown in FIG. 8. The configuration of the multiplexer 130b is the same as that of the first code division multiplexer 130a of the embodiment 1 as shown in FIG. 9, except that the signal corresponding to TDM1 in FIG. 9, which is obtained by the conversion to the biorthogonal signal following the time division multiplexing, is replaced by the low rate signals multiplexed by the second code division multiplexer 126.

FIGS. 24A–24E show the relationships of timings between the second code division multiplexer 126 and code division multiplexer 130b, which constitute the multiplexer 10b. Although the same Walsh functions are used in the code division multiplexer 130b and the second code division multiplexer 126, their multiplexing operations are achieved without confusion because of the different operation speeds.

Figure 24:
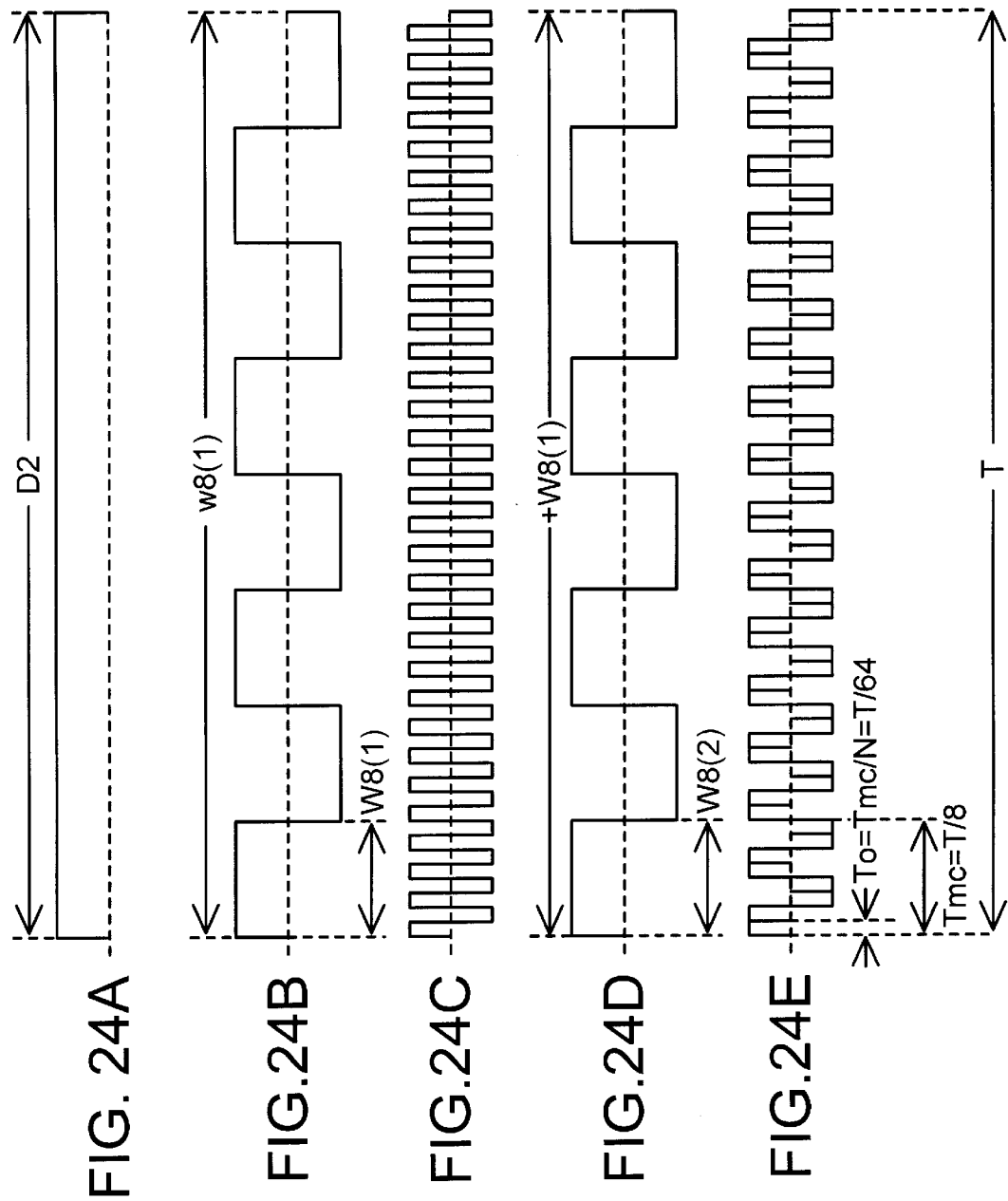
FIGS. 24A–24E are diagrams illustrating relationships of timings of the second code division multiplexer and the first code division multiplexer in the spread spectrum communication system in accordance with the embodiment 2 of the present invention.

In FIGS. 24A–24E, FIG. 24A shows a single bit of the low rate data D2, where D2=+1. FIG. 24B shows a multiplexing code used by the second multiplexer 126 for multiplexing the low rate data D2. As shown in this figure, the multiplexing code assigned to the data D2 is w8(1) whose length is eight, period is T and code interval is T/8 (=Tmc).

FIG. 24C shows an orthogonal code assigned in the first code division multiplexer 130b to the multiplexed signal output from the second code division multiplexer 126. For a low rate data item including D2 which has already been processed in the code division multiplex process, W8(1) (corresponding to Code 1 in FIG. 23) is assigned whose length is eight, period is T/8 (=Tmc) and code interval is To (=Tmc/8).

FIG. 24D illustrates an example of the biorthogonal signal generated by the biorthogonal signal generator 122b. This figure illustrates a biorthogonal signal to be multiplexed by the Code 2 in FIG. 23. It represents the biorthogonal signal (+W8(1)) whose length is eight, period is T and code interval is Tmc (=T/8). The biorthogonal signal (+W8(1)) is output when the input data (d3, d2, d1, d0) is (0, 0, 0, 1)=(+1, +1, +1, −1).

FIG. 24E illustrates an orthogonal code assigned to the signal as shown in FIG. 24D in the code division multiplexer 130b. This orthogonal code is Code 2 (corresponding to W8(2)) in FIG. 23, whose period is Tmc (=T/8), length is eight, and code interval is To (=Tmc/8=T/64).

The code division multiplexer 130b carries out multiplexing in the manner as described in connection with FIGS. 8, 9 and 10A–10C: For example, it multiplies the signals as shown in FIGS. 24B and 24D by the orthogonal codes as shown in FIGS. 24C and 24E, which are orthogonal in the period Tmc, respectively, and sums up the resultant products, thereby achieving the multiplexing.

In this case, the output signals of the second code division multiplexer 126 are multiplied in common by the code as shown in FIG. 24C. Hence, the signals multiplexed by the second code division multiplexer 126 cannot be identified by the code as shown in FIG. 24C.

However, since each of the signals multiplexed by the second code division multiplexer 126 has been multiplied by one of the multiplexing codes w8(0)–w8(7) of a period T, although it cannot be identified during the period Tmc, it can be identified by observing it over the period T, thereby enabling the code division multiplexing.

The multiplexer 10b as shown in FIG. 20 differs from the multiplexer 10a as shown in FIG. 1 in that it does not covert the low rate data into a biorthogonal signal.

In data communications, voice data belong to rather low rate data, and it is said that its error rate required in connection with transmission quality is about $10^{-3}$ after error correction. On the other hand, image or computer data are rather high rate, and it is said that their error rate required is about $10^{-5}$ after error correction. Thus, demand for the low rate data in terms of the transmission characteristics is mitigated as compared with the high rate data.

The multiplexer 10b as shown in FIG. 20 can apply the biorthogonal signal transmission to the middle rate data as well as to the high rate data, as the multiplexer 10a as shown in FIG. 1. This makes it possible to carry out high quality data transmission flexibly, and to provide the transmission quality matching the data rate in the above-mentioned environment. In addition, since the low rate data with mitigated transmission characteristics are not converted into biorthogonal signals, the higher number of multiplexing can be achieved.

Furthermore, it is possible to keep the multiplexed number of the low rate data at the same number as that of the multiplexer 10a as shown in FIG. 1, so as to utilize the remaining assignable orthogonal codes used for the code division multiplexing, for generating biorthogonal signals to improve the quality of the data transmission.

With regard to the configuration of the spreading modulator 20 and the carrier modulator 30, those of FIGS. 12, 15, 17 and 18 can also be used as when the multiplexer 10a shown in FIG. 1 is used.

For example, according to the configuration as shown in FIG. 12, the output of the code division multiplexer 130b undergoes the BPSK spreading modulation, followed by the BPSK carrier modulation.

According to the configuration as shown in FIG. 15, the output of the code division multiplexer 130b undergoes the BPSK spreading modulation using the two PN codes PN-I and PN-Q, followed by the QPSK carrier modulation.

According to the configuration as shown in FIG. 17, the two outputs of the code division multiplexer 130b undergo the BPSK spreading modulation using the two PN codes PN-I and PN-Q, followed by the QPSK carrier modulation.

According to the configuration as shown in FIG. 18, the two outputs of the code division multiplexer 130b undergo the QPSK spreading modulation using the two PN codes PN-I and PN-Q, followed by the QPSK carrier modulation.

The multiplexer 10b as shown in FIG. 20 has an advantage, besides the advantages achieved by combining the abovementioned configurations with the multiplexer 10a as shown in FIG. 1, that desirable numbers of data can be properly assigned in accordance with the communication demand, the data including the middle rate data which undergo biorthogonal modulation after the time division multiplexing, the high rate data which undergo biorthogonal modulation without the time division multiplexing, and the low rate data which undergo two step code division multiplexing.

EMBODIMENT 3

Figure 25:
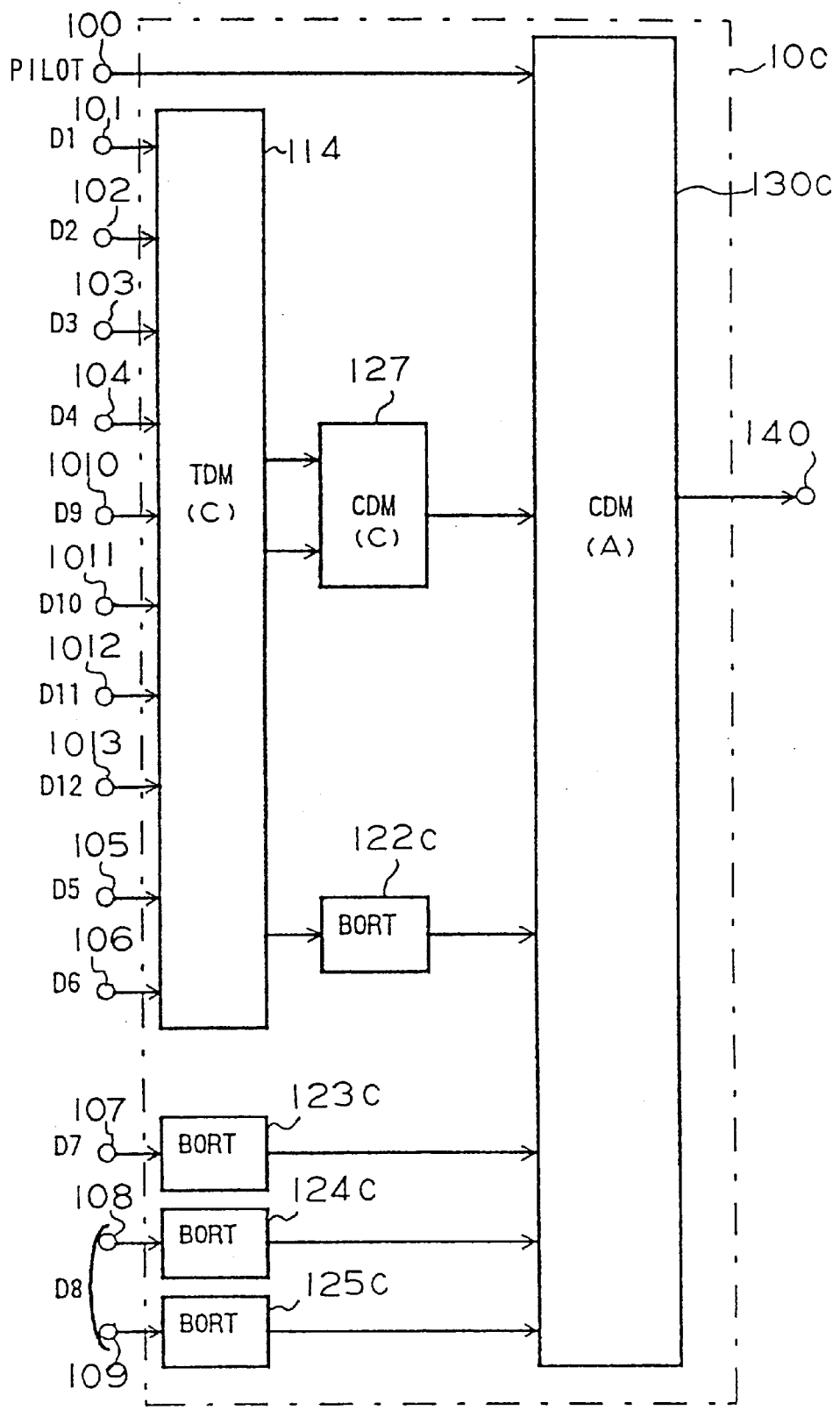
FIG. 25 is a block diagram showing a configuration of the multiplexer in the spread spectrum communication system in accordance with the embodiment 3 of the present invention.

FIG. 25 is a block diagram showing a multiplexer 10c in a spread spectrum communication system according to the embodiment 3 of the present invention, which corresponds to the multiplexer 10 as shown in FIG. 2A. In this figure, the reference numeral 10c designates the multiplexer, 100 denotes the input terminal of the pilot, 101–104 denote the input terminals of low rate data D1–D4, 1010–1013 denote the input terminals of low rate data D9–D12, 105 and 106 denote the input terminals of middle rate data D5 and D6, 107 denotes the input terminal of high rate data D7, 108 and 109 denote the input terminals of high rate data D8, 114 denotes a time division multiplexer TDM(C), 122c, 123c, 124c and 125c denote biorthogonal signal generators BORTs, 127 denotes a third code division multiplexer CDM (C), 130c denotes a first code division multiplexer CDM(A), and 140 denotes an output terminal.

The arrangement of the input terminals 100–104, 1010–1013, and 105–109 in the multiplexer 10c as shown in FIG. 25 is the same as that of the multiplexer 10b as shown in FIG. 20.

In the multiplexer 10c as shown in FIG. 25, the number of data assigned to channels can be properly selected, in response to communication demand, in the number of the middle rate data which undergo biorthogonal modulation after the time division multiplexing, the number of the high rate data which undergo biorthogonal modulation without time division multiplexing, and the number of the low rate data which undergo two step code division multiplexing after the time division multiplexing.

Next, the operation will now be described.

The low rate data D1–D4 and D9–D12, and the middle rate data D5 and D6 are input to the third time division multiplexer 114, in which they are time division multiplexed for each rate to have the same rate as the high rate data D7 and D8. The third time division multiplexer 114 differs from the first time division multiplexer 110 as shown in FIG. 1 in that although the first time division multiplexer 110 allows the middle rate data D5 and D6 to be time division multiplexed with the low rate data D1–D4, the third time division multiplexer 114 does not allow the middle rate data D5 and D6 to be time division multiplexed with the low rate data D1–D4 and D9–D12.

The middle rate data which have been time division multiplexed and the high rate data which are not time division multiplexed are converted into biorthogonal signals through the biorthogonal signal generators 122c–125c. The low rate data, on the other hand, are code division multiplexed by the third code division multiplexer 127 after the time division multiplexed. The third code division multiplexer 127 differs from the second code division multiplexer 126 as shown in FIG. 20 in the number of multiplexing.

While the upper limit of the maximum multiplexing number equals the code sequence number of the biorthogonal signals used by the biorthogonal signal generators 122b–125b in the second code division multiplexer 126, it becomes the code sequence number of the biorthogonal signals divided by the multiplexing number in the third time division multiplexer 114.

In the embodiment 3, the apparent rate of the low rate data equals the high rate 4R after the time division multiplexing. That is, since the multiplexed number of the low rate data is four, the upper limit of the code division multiplexing in the third code division multiplexer 127 becomes two (=8/4).

The multiplexing process in the third code division multiplexer 127 is basically the same as that shown in FIGS. 22 and 24A–24E.

It differs in that since the multiplexing number is two, the generated orthogonal codes consists of two orthogonal codes whose length is 2, period is T/4, and code interval is T/8.

Figure 26A:
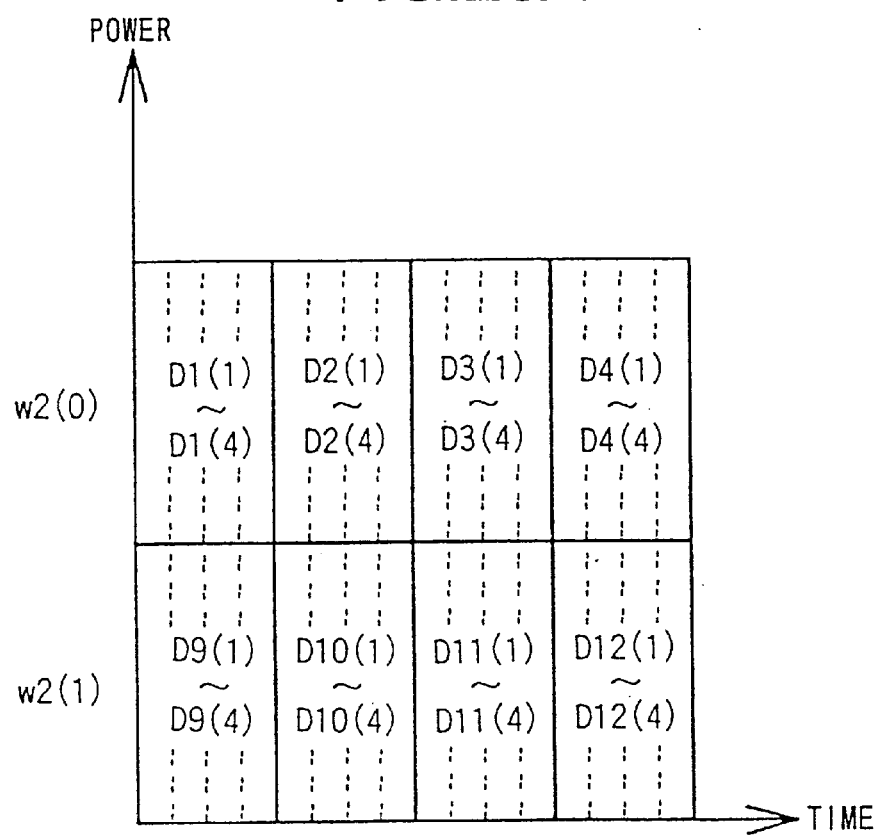
FIGS. 26A and 26B are diagrams illustrating an operation of a third time division multiplexer and that of a third code division multiplexer in the spread spectrum communication system in accordance with the embodiment 3 of the present invention.

FIG. 26A is a diagram illustrating the multiplexing process in the third code division multiplexer 127.

Figure 26B:
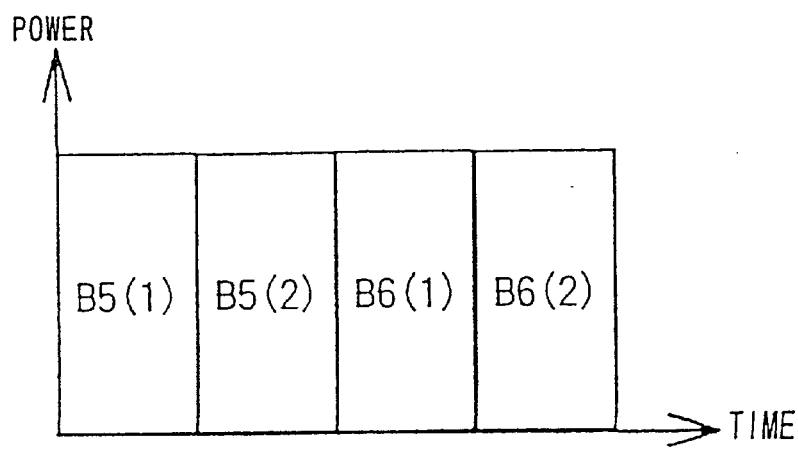

FIG. 26B shows the output of the biorthogonal signal generator 122c for comparison.

Figure 27:
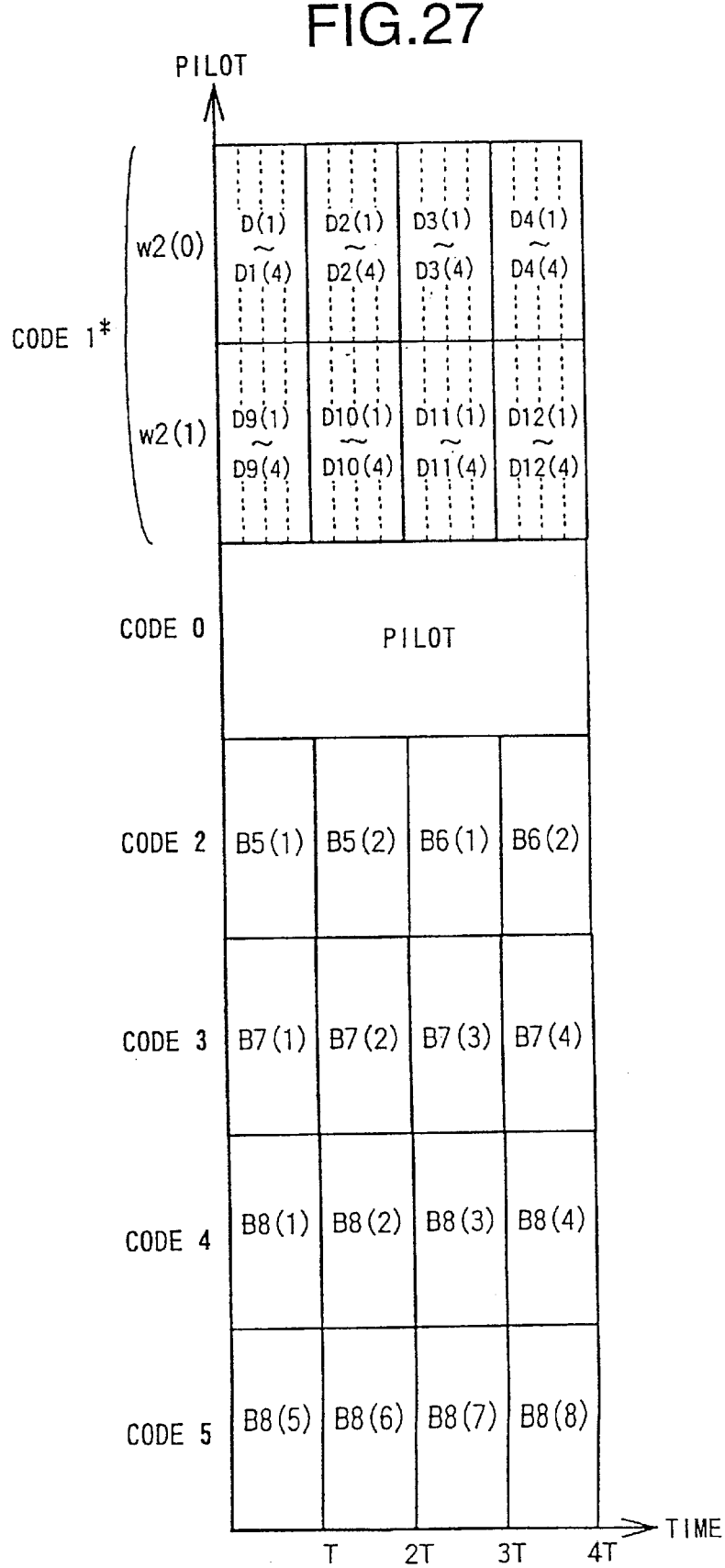
FIG. 27 is a diagram illustrating an operation of a first code division multiplexer in the spread spectrum communication system in accordance with the embodiment 3 of the present invention.
Figure 28:
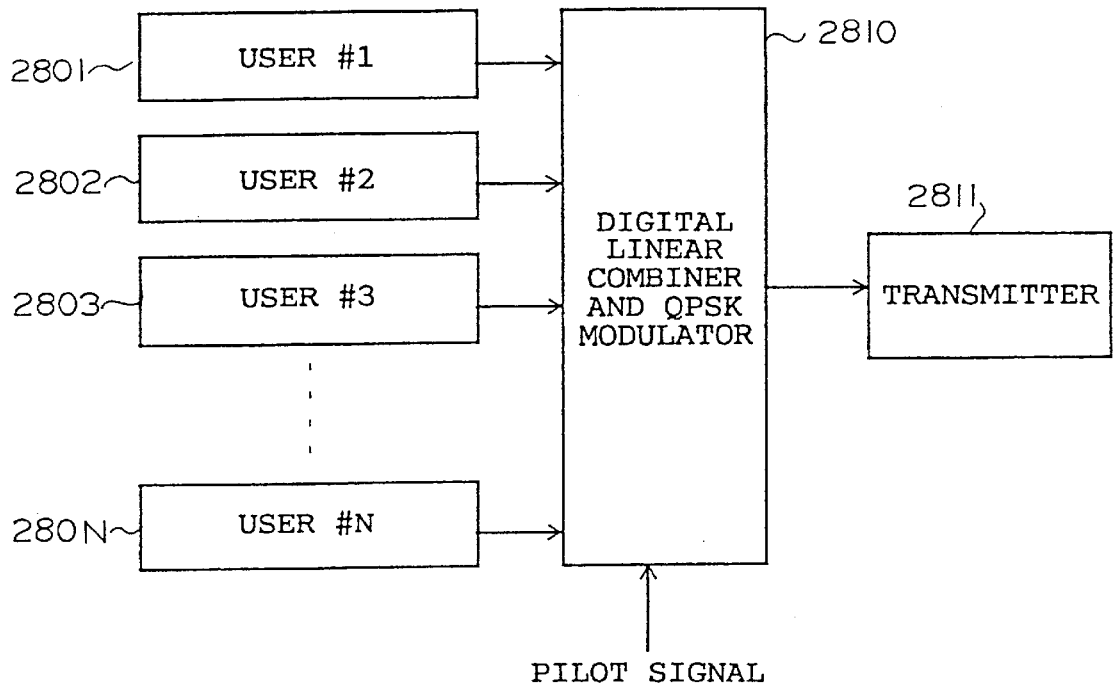
FIG. 28 is a block diagram showing an example of a transmitter of a base station in a conventional mobile communication system.
Figure 31:
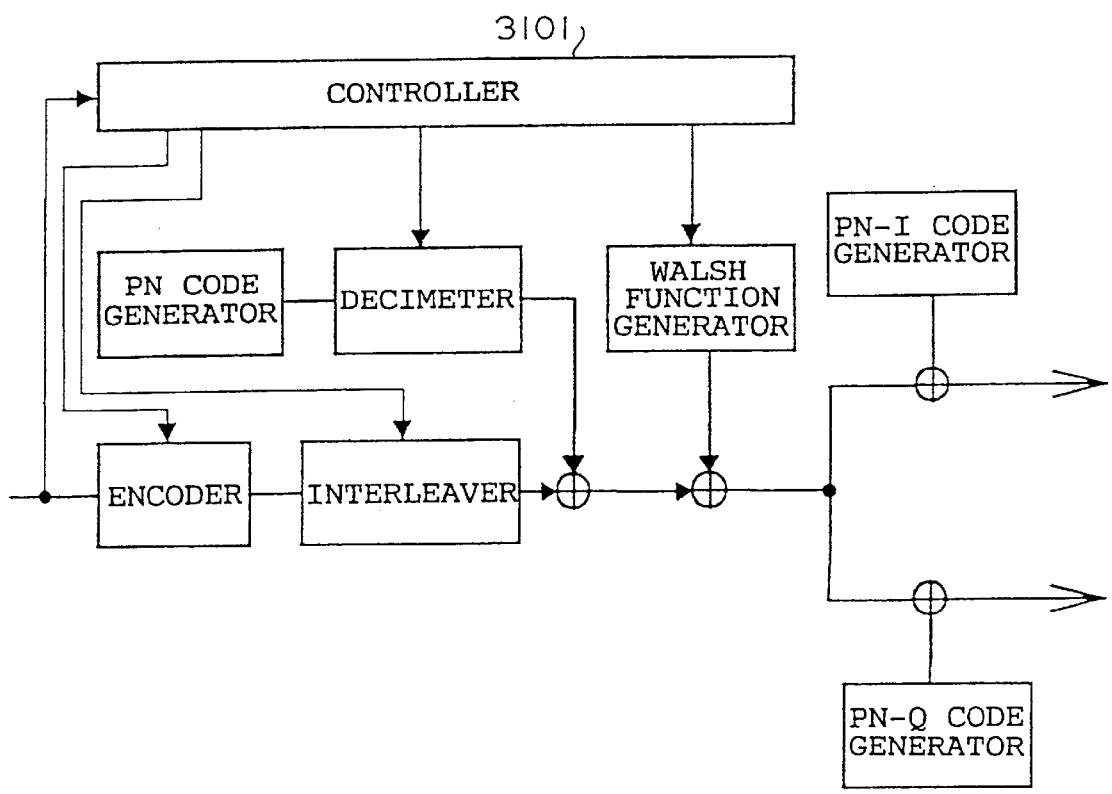
FIG. 31 is a block diagram showing an example of a conventional spread spectrum communication system.
Figure 29:
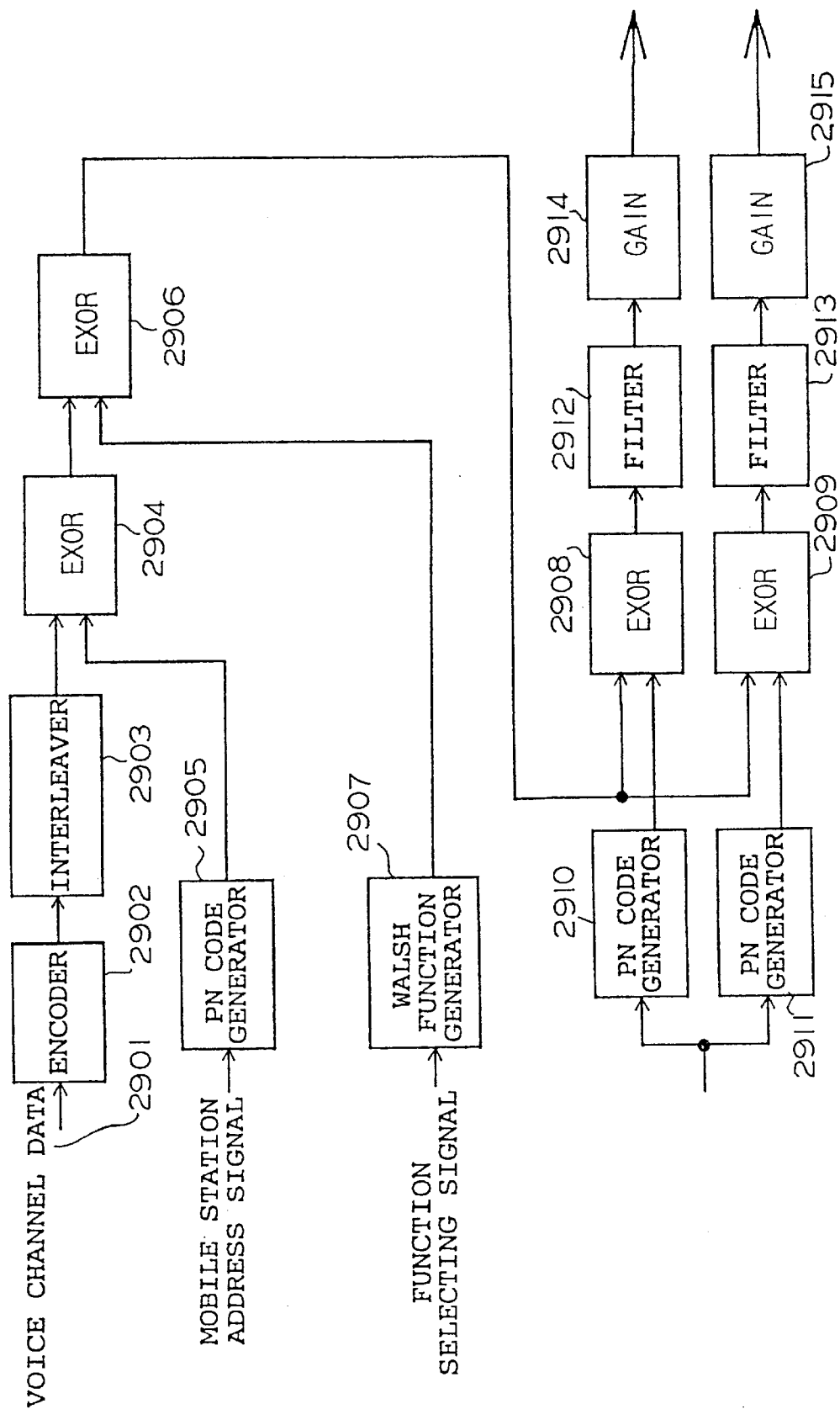
FIG. 29 is a block diagram showing another (a first other) example of a transmitter of a base station in a conventional mobile communication system.
Figure 30:
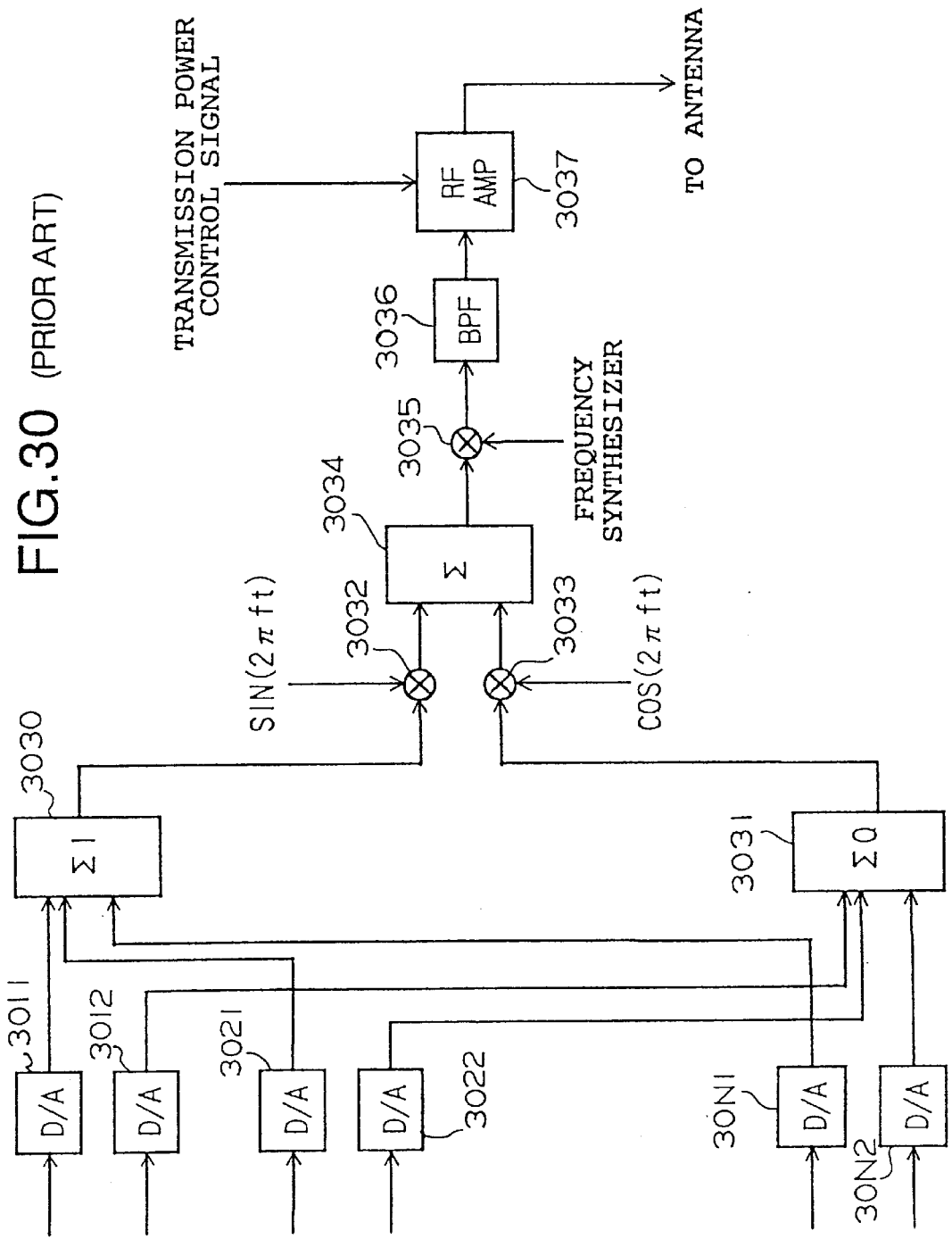
FIG. 30 is a block diagram showing another (a second other) example of a transmitter of a base station in a conventional mobile communication system.
Figure 32:
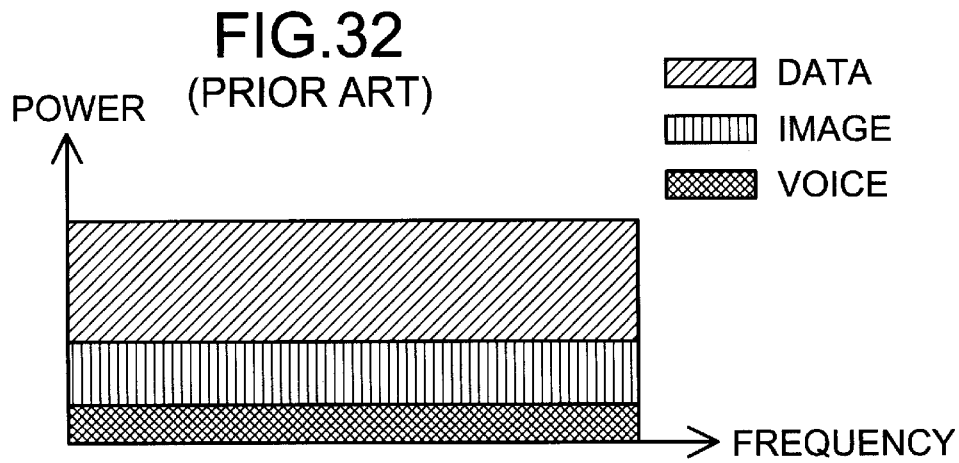
FIG. 32 is a diagram illustrating a conventional method for spreading signals of different data rates to the entire assigned frequency band.
Figure 33:
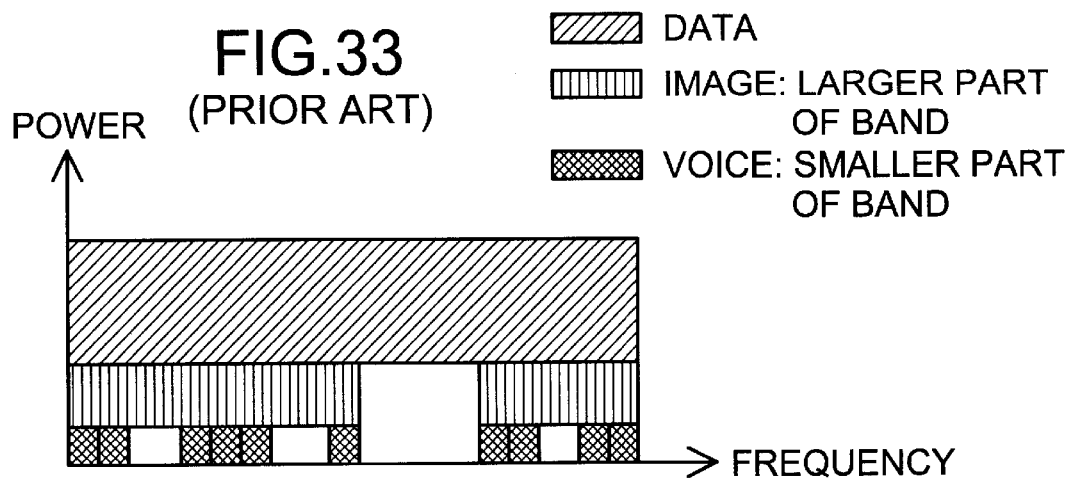
FIG. 33 is a diagram illustrating a conventional method for dividing the entire frequency band into sub-bands of different width.
Figure 34:
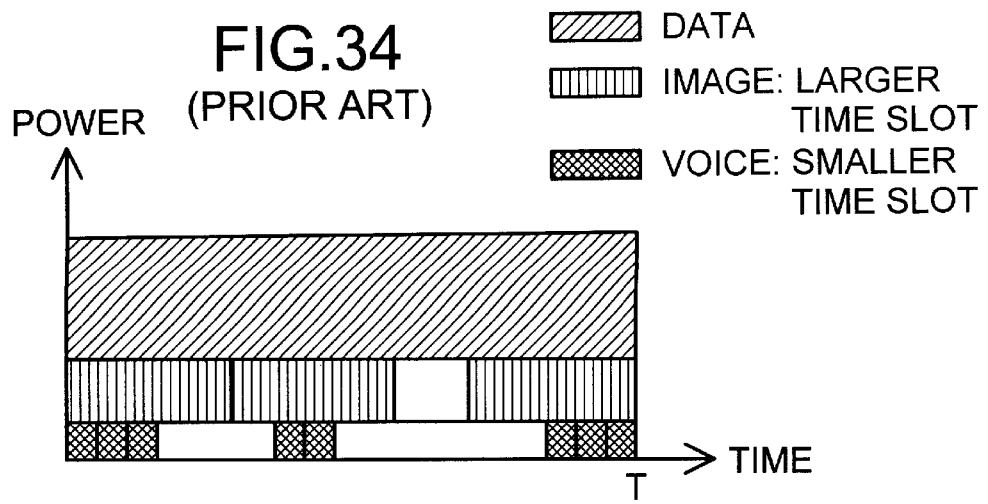
FIG. 34 is a diagram illustrating a conventional method for dividing a time frame into partial slots of different length.
Figure 35:
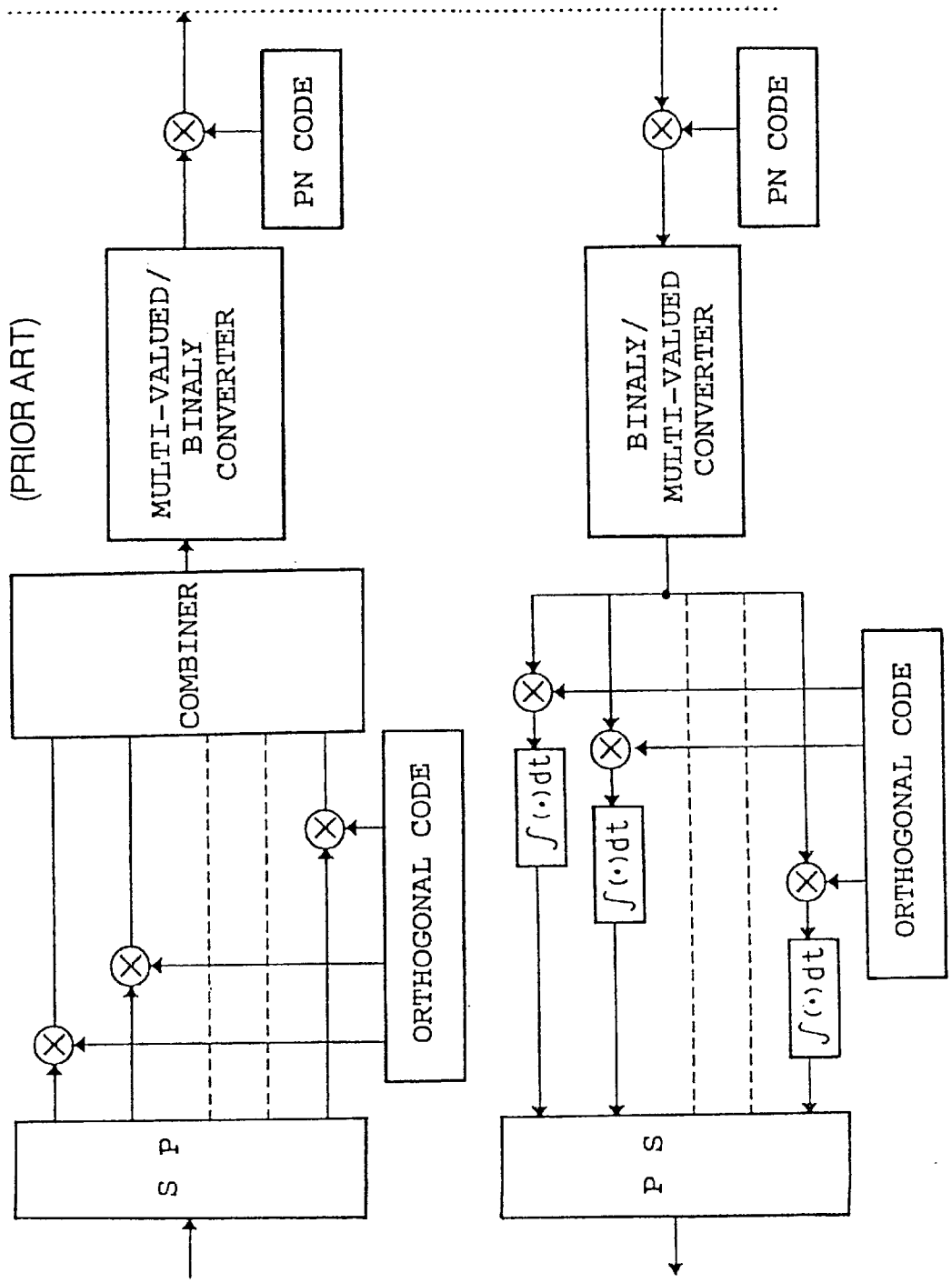
FIG. 35 is a block diagram illustrating a conventional multicode method in which a plurality of spreading codes are assigned to signals of different rate.
Figure 36:
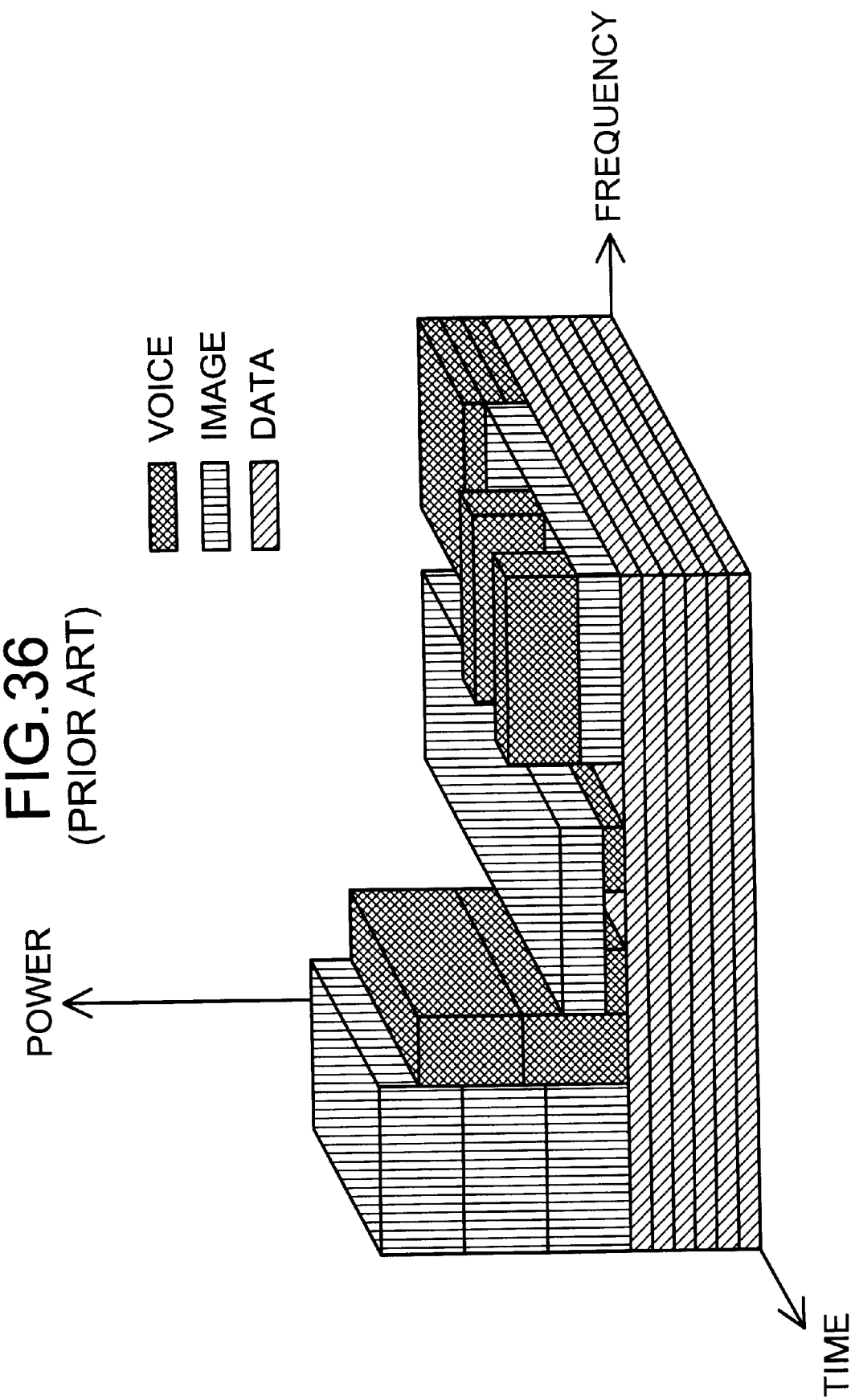
FIG. 36 is a schematic diagram illustrating a complex method incorporating the conventional methods as shown in FIGS. 32–35.
Figures 39, 40:
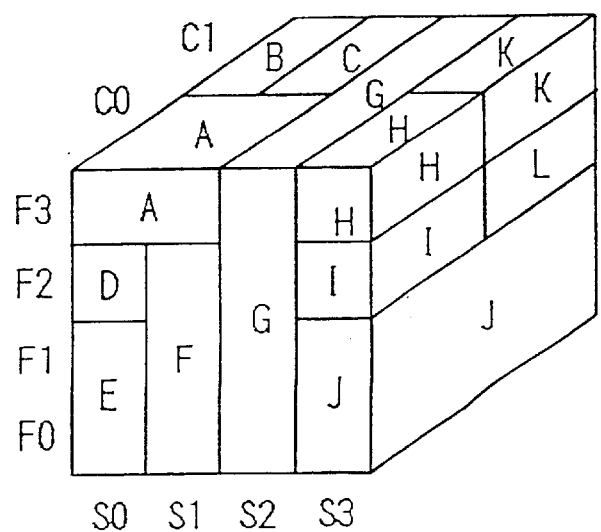
FIG. 39 is a diagram illustrating a conventional method for assigning both slots and codes to users of different rate.
FIG. 40 illustrates a conventional method for optimally combining the slots, frequency bands and codes as shown in FIGS. 37–39 so as to obtain the most suitable assignment.
Figure 41:
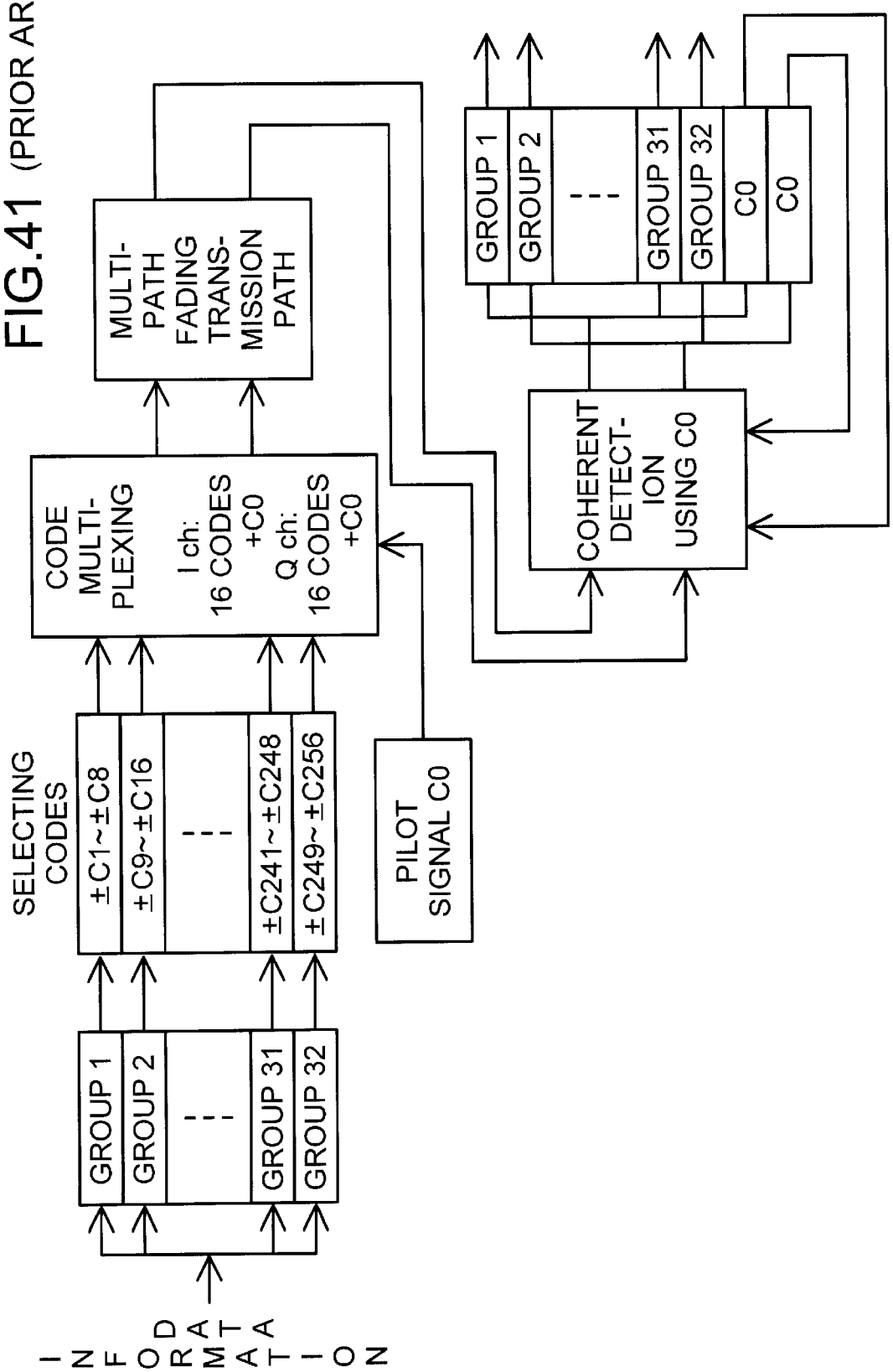
FIG. 41 is a system block diagram showing a conventional parallel combination system.

FIG. 27 illustrates the multiplexing process in the code division multiplexer 130c shown as in FIG. 25.

The middle rate data B5 and B6 and the high rate data B7 and B8, that is, the data except for the low rate data D1–D4 and D9–D12 passed through the third time division multiplexer 114 and the third code division multiplexer 127, are handled as shown in FIG. 23 illustrating the multiplexing process in the code division multiplexer 130b shown in FIG. 20. Although the same code (Code 1) is assigned in common to signals multiplexed in the third code division multiplexer 127 for carrying out multiplexing in the code division multiplexer 130c, these signals can be identified by orthogonal codes w2(0) and w2(1) with a period T/4.

The multiplexer 10c shown in FIG. 25 differs from the multiplexer 10b shown in FIG. 20 in that in the multiplexer 10c, the input sequences to the code division multiplexer 130c have the same amplitude because the third time division multiplexer 114 matches the rates of the entire data with the high rate. That is, when comparing FIGS. 23 with FIG. 27, it is seen that although eight low rate data with small power are multiplexed in FIG. 23, two low rate data with large power identical to the biorthogonal signals are multiplexed in FIG. 27.

Although the total power is the same, the variance of the peak power after the multiplexing increases with the number of multiplexing. Thus, adding the multiplexer in FIG. 25 has the advantage, besides the advantage of adding the third code division multiplexer 127 as shown in FIG. 20, that the demand for the linearity of an amplifier is moderated, thereby making it possible to reduce the size and the power consumption of the transmitter.

With regard to the configuration of the spreading modulator 20 and the carrier modulator 30, those of FIGS. 12, 15, 17 and 18 can also be used as when the multiplexer 10b shown in FIG. 20 is used.

That is, according to the configuration of the spreading modulator and carrier modulator as shown in FIG. 12, the output of the code division multiplexer 130c undergoes the BPSK spreading modulation, followed by the BPSK carrier modulation.

According to the configuration of the spreading modulator and carrier modulator as shown in FIG. 15, the output of the code division multiplexer 130c undergoes the BPSK spreading modulation using two PN codes PN-I and PN-Q, followed by the QPSK carrier modulation.

According to the configuration of the spreading modulator and the carrier modulator as shown in FIG. 17, the two outputs of the code division multiplexer 130c undergo the BPSK spreading modulation using the two PN codes PN-I and PN-Q, followed by the QPSK carrier modulation.

According to the configuration of the spreading modulator and the carrier modulator as shown in FIG. 18, the two outputs of the code division multiplexer 130c undergo the QPSK spreading modulation using the two PN codes PN-I and PN-Q, followed by the QPSK carrier modulation.

The multiplexer 10c as shown in FIG. 25 combined with these arrangements has the following advantage, in addition to the advantage achieved by the multiplexer 10b as shown in FIG. 20 that desirable numbers of data can be properly assigned in accordance with the communication demand, the data including the middle rate data which undergo biorthogonal modulation after the time division multiplexing, the high rate data which undergo biorthogonal modulation without the time division multiplexing, and the low rate data which undergo two step code division multiplexing. The new advantage particular to the multiplexer 10c as shown in FIG. 25 is that the number of data assignable to channels can be properly selected, while the channels are divided into middle rate, high rate and low rate channels in accordance with the communication demand, wherein the middle rate data are converted into the biorthogonal signals after the time division multiplexing, the high rate data are converted into the biorthogonal signals without time division multiplexing, and the low rate data undergo two step code division multiplexing after the time division multiplexing.

As described above, according to the present invention, a spread spectrum communication system, which multiplexes first data signals, spreading modulates the multiplexed signals using spreading code sequences, and transmits the spreading modulated signal after carrier modulation, comprises first time division multiplexing means for time division multiplexing low rate data and middle rate data, biorthogonal signal generating means for converting the time division multiplexed data and high rate data without being time division multiplexed into biorthogonal signals, and first code division multiplexing means for code division multiplexing the biorthogonal signals. This makes it possible to apply the biorthogonal signal transmission not only to the high rate data, but also to the middle rate data and the low rate data, and provides an advantage of achieving flexible, high quality data transmission.

According to the present invention, a spread spectrum communication system, which multiplexes data signals, spreading modulates the multiplexed signals using spreading code sequences, and transmits the spreading modulated signal after carrier modulation, comprises second code division multiplexing means for code division multiplexing low rate data, second time division multiplexing means for time division multiplexing middle rate data, biorthogonal signal generating means for converting the time division multiplexed data and high rate data into biorthogonal signals, and first code division multiplexing means for code division multiplexing the code division multiplexed signal and the biorthogonal signals. This makes it possible to apply the biorthogonal signal transmission not only to the high rate data, but also to the middle rate data, and provides an advantage of achieving flexible data transmission that can satisfy desired quality in accordance with the rates.

According to the present invention, a spread spectrum communication system, which multiplexes data signals, spreading modulates the multiplexed signals using spreading code sequences, and transmits the spreading modulated signal after carrier modulation, comprises third time division multiplexing means for time division multiplexing low rate data and middle rate data for each rate, third code division multiplexing means for code division multiplexing the time division multiplexed low rate data, biorthogonal signal generating means for converting the time division multiplexed middle rate data and high rate data without being time division multiplexed into biorthogonal signals, and first code division multiplexing means for code division multiplexing the code division multiplexed signal and the biorthogonal signals. This makes it possible to apply the biorthogonal signal transmission not only to the high rate data, but also to the middle rate data, and provides an advantage of achieving flexible data transmission that can satisfy desired quality in accordance with the rates.

In addition, according to the present invention, the biorthogonal signal generating means is configured to use Walsh functions as orthogonal signals. This makes it possible to readily generate the orthogonal codes for multiplexing, thereby providing an advantage of reducing the size of hardware.

According to the present invention, the first code division multiplexing means and the second code division multiplexing means use Walsh functions as the orthogonal codes for multiplexing. Hence, the orthogonal codes for multiplexing can be readily generated, and this serves to reduce the size of hardware.

Furthermore, according to the present invention, the biorthogonal signal generating means employs Walsh functions as the orthogonal signals, and the first code division multiplexing means use the Walsh functions as the orthogonal codes for multiplexing. Hence, the orthogonal codes for multiplexing can be readily generated, and this serves to reduce the size of hardware.

According to the present invention, the spreading code sequences used for the spreading modulation have a code period much longer than a data period. This offers an advantage of improving discrimination performance between the forward wave and the delayed waves.

According to the present invention, the spreading modulation is achieved by the binary phase modulation of the multiplexed signal, and the carrier modulation employs the binary phase modulation. This enables the spreading modulation and carrier modulation to be achieved by only multiplying operation, thereby offering an advantage of implementing the transmitter and receiver with a simple configuration.

According to the present invention, the spreading modulation is achieved by the quadrature phase modulation of the multiplexed signal, and the carrier modulation employs the quadrature phase modulation. This enables the interference amount due to delay waves or other transmitted signals to be uniform, thereby improving the transmission quality.

According to the present invention, the spreading modulation is achieved by performing the binary phase modulation on two multiplexed signals, and the carrier modulation employs the quadrature phase modulation. This provides an advantage of implementing the transmitter and receiver with a simple configuration, and of improving the transmission quality or transmission efficiency. In addition, this offers an advantage of reducing the size of the system and the power consumption because the peak power can be reduced.

According to the present invention, the spreading modulation is achieved by performing the quadrature phase modulation on two multiplexed signals, and the carrier modulation employs the quadrature phase modulation. This enables the interference amount due to delay waves or other transmitted signals to be uniform, thereby improving the transmission quality or transmission efficiency. In addition, this offers an advantage of reducing the size of the system and the power consumption because the peak power can be reduced.

According to the present invention, an orthogonal signal generator, which generates an orthogonal signal by selecting one of orthogonal functions in response to input data, comprises a plurality of AND circuits for performing AND operation of input data bits and clock signals obtained by halving stepwise a clock signal corresponding to the code rate of the orthogonal function, and a first exclusive OR circuit for performing exclusive OR operation of the outputs of the AND circuits and outputting the result as the orthogonal signal. This makes it possible to generate the desired orthogonal signal from only the input data and the clock signals which are easily generated, thereby providing an advantage of simplifying hardware structure.

Furthermore, according to the present invention, a biorthogonal signal generator, which generates a biorthogonal signal by performing polar operation on an orthogonal sicoal, comprises a plurality of AND circuits for performing AND operation of input data bits and clock signals obtained by halving stepwise a clock signal corresponding to the code rate of the orthogonal signal, a first exclusive OR circuit for performing exclusive OR operation of the outputs of the AND circuits and outputting the result as the orthogonal signal, and a second exclusive OR circuit for performing exclusive OR operation of one of the data bits and the orthogonal signal output from the first exclusive OR circuit and outputting the biorthogonal signal. This makes it possible to generate the desired biorthogonal signal from only the input data and the clock signals which are easily generated, thereby providing an advantage of simplifying hardware structure.

Moreover, according to the present invention, an orthogonal code generator, which simultaneously outputs a plurality of different orthogonal codes, comprises a plurality of exclusive OR circuits for performing exclusive OR operation of one of the different combinations composed of a logically significant level and a plurality of clock signals obtained by halving stepwise a clock signal corresponding to the code rate of the orthogonal code. This makes it possible to generate the plurality of orthogonal codes that are orthogonal to each other from only the input data and the clock signals which are easily generated, thereby providing an advantage of simplifying hardware structure.

The invention being thus described, it will be obvious that the same may be varied in many ways. Such variations are not to be reguarded as departure from the sprit and scope of the invention, and all such modifications as would as would be obvious to one skilled in the art are intended to be included within the scope of the following claims.

What is claimed is:

1. A spread spectrum communication system comprising:
   first time division multiplexing means for time division multiplexing low rate data and middle rate data;
   biorthogonal signal generating means for converting into biorthogonal signals time division multiplexed data and high rate data which have not been time division multiplexed;
   first code division multiplexing means for code division multiplexing said biorthogonal signals;

spreading modulation means for performing spreading modulation of a multiplexed signal obtained by said first code division multiplexing means using a spreading code sequence; and carrier modulation means for performing carrier modulation by using a spreading modulated signal by said spreading modulation means.

2. The spread spectrum communication system according to claim 1, wherein said biorthogonal signal generating means uses Walsh functions as orthogonal signals, or said first code division multiplexing means uses Walsh functions as multiplexing orthogonal codes.

3. The spread spectrum communication system according to claim 1, wherein said biorthogonal signal generating means uses Walsh functions as orthogonal signals, and said first code division multiplexing means uses Walsh functions as multiplexing orthogonal codes.

4. The spread spectrum communication system according claim 1, wherein said spreading code sequence used in the spreading modulation performed by said spreading modulation means has a code period much longer than a data period of said low, middle and high rate data.

5. The spread spectrum communication system according to claim 1, wherein the spreading modulation performed by said spreading modulation means is either binary phase modulation or quadrature phase modulation onto said multiplexed signal, and the carrier modulation performed by said carrier modulating means is binary phase modulation or quadrature phase modulation.

6. The spread spectrum communication system according to claim 1, wherein the spreading modulation performed by said spreading modulation means is either binary phase modulation or quadrature phase modulation onto two multiplexed signals, and the carrier modulation performed by said carrier modulating means is quadrature phase modulation.

7. A spread spectrum communication system comprising:

second code division multiplexing means for code division multiplexing low rate data;

time division multiplexing means for time division multiplexing middle rate data;

biorthogonal signal generating means for converting time division multiplexed data and high rate data into biorthogonal signals;

first code division multiplexing means for code division multiplexing the code division multiplexed signal and the biorthogonal signals;

spreading modulation means for performing spreading modulation, by using a spreading code sequence, of a multiplexed signal obtained by said first code division multiplexing means; and carrier modulation means for performing carrier modulation by using a spreading modulated signal from said spreading modulation means.

8. The spread spectrum communication system according to claim 7, wherein said biorthogonal signal generating means uses Walsh functions as orthogonal signals, or said first and second code division multiplexing means use Walsh functions as multiplexing orthogonal codes.

9. The spread spectrum communication system according to claim 7, wherein said biorthogonal signal generating means uses Walsh functions as orthogonal signals, and said first and second code division multiplexing means use Walsh functions as multiplexing orthogonal codes.

10. The spread spectrum communication system according claim 7, wherein said spreading code sequence used in the spreading modulation performed by said spreading modulation means has a code period much longer than a data period of said low, middle and high rate data.

11. The spread spectrum communication system according to claim 7, wherein the spreading modulation performed by said spreading modulation means is either binary phase modulation or quadrature phase modulation onto said multiplexed signal, and the carrier modulation performed by said carrier modulating means is binary phase modulation or quadrature phase modulation.

12. The spread spectrum communication system according to claim 7, wherein the spreading modulation performed by said spreading modulation means is either binary phase modulation or quadrature phase modulation onto said multiplexed signal, and the carrier modulation performed by said carrier modulating means is quadrature phase modulation.

13. A spread spectrum communication system comprising:

time division multiplexing means for time division multiplexing low rate data and middle rate data independently in accordance with their rates;

second code division multiplexing means for code division multiplexing the time division multiplexed low rate data;

biorthogonal signal generating means for converting into biorthogonal signals the time division multiplexed middle rate data and high rate data which have not been time division multiplexed;

first code division multiplexing means for code division multiplexing the code division multiplexed signals and said biorthogonal signals;

spreading modulation means for performing spreading modulation, by using a spreading code sequence, of a multiplexed signal obtained from said first code division multiplexing means; and carrier modulation means for performing carrier modulation by using a spreading modulated signal from said spreading modulation means.

14. The spread spectrum communication system according to claim 13, wherein said biorthogonal signal generating means uses Walsh functions as orthogonal signals, or said first code division multiplexing means use Walsh functions as multiplexing orthogonal codes.

15. The spread spectrum communication system according to claim 13, wherein said biorthogonal signal generating means uses Walsh functions as orthogonal signals, and said first code division multiplexing means use Walsh functions as multiplexing orthogonal codes.

16. The spread spectrum communication system according claim 13, wherein said spreading code sequence used in the spreading modulation performed by said spreading modulation means has a code period much longer than a data period of said low, middle and high rate data.

17. The spread spectrum communication system according to claim 13, wherein the spreading modulation performed by said spreading modulation means is either binary phase modulation or quadrature phase modulation onto said multiplexed signal, and the carrier modulation performed by said carrier modulating means is binary phase modulation or quadrature phase modulation.

18. The spread spectrum communication system according to claim 13, wherein the spreading modulation performed by said spreading modulation means is either binary phase modulation or quadrature phase modulation onto said multiplexed signal, and the carrier modulation performed by said carrier modulating means is quadrature phase modulation.

19. The spread spectrum communication system according to claim 1 or 7 or 13, wherein said biorthogonal signal generating means comprises a plurality of AND circuits each for performing AND operation between a bit of input data and a clock signal obtained by stepwise halving a clock signal whose code rate corresponds to orthogonal functions; a first exclusive OR circuit inputting a plurality of outputs of said plurality of AND circuits for performing exclusive OR operation of them to output its result as an orthogonal signal; and a second exclusive OR circuit for performing exclusive OR operation between a further one bit of said input data and the orthogonal signal output from said first exclusive OR circuit to output a biorthogonal signal, wherein said biorthogonal signal generating means performs polarity operation on the orthogonal signal and outputs said biorthogonal signal.

20. The spread spectrum communication system according to claim 1 or 7 or 13, wherein said first or second code division multiplexing means comprises a plurality of exclusive OR circuits each for performing exclusive OR operation of one of all possible combinations of a logically significant level and a plurality of clock signals obtained by stepwise halving a clock signal whose code rate corresponds to orthogonal codes, wherein said first code division multiplexing means outputs simultaneously an orthogonal code set, respective elements of which are orthogonal to each other.

21. A spread spectrum communication method comprising the steps of:
   time division multiplexing low rate data and middle rate data;
   converting into biorthogonal signals the time division multiplexed data and high rate data which have not been time division multiplexed;
   code division multiplexing the biorthogonal signals;
   performing spreading modulation of a multiplexed signal obtained by said code division multiplexing step using a spreading code sequence; and
   performing carrier modulation by using a spreading modulated signal from said spreading modulation step.

22. The spread modulation communication method according to claim 21,
   said biorthogonal converting step utilizing Walsh functions as orthogonal signals, and
   said code division multiplexing step utilizing Walsh functions as multiplexing orthogonal codes.

23. The spread modulation communication method according to claim 21, wherein the spreading code utilized by said spreading modulation step has a code period much longer than a data period of the low, middle, and high rate data.

24. The spread modulation communication method according to claim 21,
   said spreading modulation step performing either binary phase or quadrature phase modulation onto the multiplexed signal, and
   said carrier modulation step performing either binary or quadrature phase modulation.

25. A spread spectrum communication method comprising the steps of:
   a second code division multiplexing step for code division multiplexing low rate data and outputting a code division multiplexed signal;
   time division multiplexing middle rate data;
   converting time division multiplexed data and high rate data into biorthogonal signals;
   a first code division multiplexing step for code division multiplexing the code division multiplexed signal and the biorthogonal signals;
   performing spreading modulation, by using a spreading code sequence, of a multiplexed signal obtained from said first code division multiplexing step; and
   performing carrier modulation by using a spreading modulated signal from said spreading modulation step.

26. The spread modulation communication method according to claim 25,
   said biorthogonal converting step utilizing Walsh functions as orthogonal signals,
   said first and second code division multiplexing steps utilizing Walsh functions as multiplexing orthogonal codes.

27. The spread modulation communication method according to claim 25, wherein the spreading code utilized by said spreading modulation step has a code period much longer than a data period of the low, middle, and high rate data.

28. The spread modulation communication method according to claim 25, wherein said spreading modulation step performs either binary phase or quadrature phase modulation onto the multiplexed signal, and said carrier modulation step performs quadrature phase modulation.

29. A spread spectrum communication method comprising the steps of:
   time division multiplexing low rate data and middle rate data independently in accordance with their rates;
   a second code division multiplexing step for code division multiplexing the time division multiplexed low rate data;
   converting into biorthogonal signals time division multiplexed middle rate data and high rate data which have not been time division multiplexed;
   first code division multiplexing step for code division multiplexing the code division multiplexed signals and the biorthogonal signals;
   performing spreading modulation, by using a spreading code sequence, of a multiplexed signal obtained from said first code division multiplexing step; and
   performing carrier modulation by using a spreading modulated signal from said spreading modulation step.

30. The spread modulation communication method according to claim 29,
   said biorthogonal converting step utilizing Walsh functions as orthogonal signals,
   said first code division multiplexing step utilizing Walsh functions as multiplexing orthogonal codes.

31. The spread modulation communication method according to claim 29, wherein the spreading code utilized by said spreading modulation step has a code period much longer than a data period of the low, middle, and high rate data.

32. The spread modulation communication method according to claim 29, wherein said spreading modulation step performs either binary phase or quadrature phase modulation onto the multiplexed signal, and the carrier modulation step performs binary or quadrature phase modulation.

33. A spread spectrum communication system comprising:
   a first time division multiplexer connected to low and middle rate data input ports, said first time division multiplexer outputting time division multiplexed low and middle rate data;

a first biorthogonal signal generator connected to said first time division multiplexer so as to receive the time division multiplexed low and middle rate data, said first biorthogonal signal generator outputting first biorthogonal signals;

a second biorthogonal signal generator connected to high rate data input ports, said second biorthogonal signal generator outputting second biorthogonal signals;

a first code division multiplexer connected to said first biorthogonal signal generator and said second biorthogonal signal generator;

a spreading modulator connected to said first code division multiplexer; and a carrier modulator connected to said spreading modulator.

34. The spread modulation communication system according to claim 33, said first and second biorthogonal signal generators utilizing Walsh functions as orthogonal signals, and said code division multiplexer utilizing Walsh functions as multiplexing orthogonal codes.

35. The spread modulation communication system according to claim 33, wherein the spreading code utilized by said spreading modulator has a code period much longer than a data period of the low, middle, and high rate data.

36. The spread modulation communication system according to claim 33, said spreading modulator utilizing either binary phase or quadrature phase modulation, and said carrier modulator utilizing either binary or quadrature phase modulation.

37. The spread modulation communication system according to claim 33, wherein each of said first and second biorthogonal generators include:

a plurality of AND circuits each of which is respectively connected to a bit of input data and a clock signal input, wherein the clock signal is obtained by stepwise halving a reference clock signal whose code rate corresponds to orthogonal functions;

a first EXOR circuit connected to said AND circuits; and a second EXOR circuit connected to further bit of the input data and to said first EXOR circuit.

38. A spread spectrum communication system comprising:

a second code division multiplexer connected to low data rate input ports, said first code division multiplexer outputting code division multiplexed low rate data;

a time division multiplexer connected to middle data rate input ports, said time division multiplexer outputting time division multiplexed middle rate data;

a first biorthogonal signal generator connected to said time division multiplexer;

a second biorthogonal signal generator connected to high data rate input ports;

a first code division multiplexer connected to said second code division multiplexer and to said first and second biorthogonal signal generators;

a spreading modulator connected to said first code division multiplexer; and a carrier modulator connected to said spreading modulator.

39. The spread modulation communication system according to claim 38, said first and second biorthogonal signal generators utilizing Walsh functions as orthogonal signals, said first and second code division multiplexers utilizing Walsh functions as multiplexing orthogonal codes.

40. The spread modulation communication system according to claim 38, wherein the spreading code utilized by said spreading modulator has a code period much longer than a data period of the low, middle, and high rate data.

41. The spread modulation communication system according to claim 38, wherein said spreading modulator performs either binary phase or quadrature phase modulation onto the multiplexed signal, and said carrier modulator performs quadrature phase modulation.

42. The spread modulation communication system according to claim 38, wherein each of said first and second biorthogonal generators include:

a plurality of AND circuits each of which is respectively connected to a bit of input data and a clock signal input, wherein the clock signal is obtained by stepwise halving a reference clock signal whose code rate corresponds to orthogonal functions;

a first EXOR circuit connected to said AND circuits; and a second EXOR circuit connected to further bit of the input data and to said first EXOR circuit.

43. A spread spectrum communication system comprising:

a time division multiplexer connected to low and middle rate data input ports;

a second code division multiplexer connected to said time division multiplexer and receiving the time division multiplexed low rate data;

a first biorthogonal signal generator connected to said time division multiplexer and receiving the time division multiplexed middle rate data;

a second biorthogonal signal generator connected to high rate data input ports:

a first code division multiplexer connected to said second code division multiplexer and to said first and second biorthogonal signal generators;

a spreading modulator connected to said first code division multiplexer; and a carrier modulator connected to said spreading modulator.

44. The spread modulation communication system according to claim 43, said first and second biorthogonal signal generators utilizing Walsh functions as orthogonal signals, and said first code division multiplexer utilizing Walsh functions as multiplexing orthogonal codes.

45. The spread modulation communication system according to claim 43, wherein the spreading code utilized by said spreading modulator has a code period much longer than a data period of the low, middle, and high rate data.

46. The spread modulation communication system according to claim 43, wherein said spreading modulator performs either binary phase or quadrature phase modulation onto the multiplexed signal, and said carrier modulator performs binary or quadrature phase modulation.

47. The spread modulation communication system according to claim 43, wherein each of said first and second biorthogonal generators include:

a plurality of AND circuits each of which is respectively connected to a bit of input data and a clock signal input, wherein the clock signal is obtained by stepwise halving a reference clock signal whose code rate corresponds to orthogonal functions;

a first EXOR circuit connected to said AND circuits; and a second EXOR circuit connected to further bit of the input data and to said first EXOR circuit.

* * * * *